(12) United States Patent
Tiramani et al.

(10) Patent No.: US 11,136,950 B2
(45) Date of Patent: Oct. 5, 2021

(54) INTAKE AIR SYSTEMS AND COMPONENTS

(71) Applicant: Auto IP LLC, Las Vegas, NV (US)

(72) Inventors: Paolo Tiramani, Las Vegas, NV (US); Kyle Denman, North Las Vegas, NV (US)

(73) Assignee: Auto IP LLC, Las Vegas, NV (US)

(*) Notice: Subject to any disclaimer, the term of this patent is extended or adjusted under 35 U.S.C. 154(b) by 1 day.

(21) Appl. No.: 16/446,355

(22) Filed: Jun. 19, 2019

(65) Prior Publication Data

US 2019/0360438 A1 Nov. 28, 2019

Related U.S. Application Data

(63) Continuation-in-part of application No. 16/168,984, filed on Oct. 24, 2018, now Pat. No. 10,760,538.

(60) Provisional application No. 62/697,072, filed on Jul. 12, 2018, provisional application No. 62/687,461, filed on Jun. 20, 2018, provisional application No. 62/678,460, filed on May 31, 2018, provisional application No. 62/616,601, filed on Jan. 12, 2018, provisional application No. 62/598,045, filed on Dec. 13, 2017, provisional application No. 62/577,965, filed on Oct. 27, 2017, provisional application No. 62/577,423, filed on Oct. 26, 2017.

(51) Int. Cl.
| | |
|---|---|
| *F02M 35/10* | (2006.01) |
| *F02M 35/104* | (2006.01) |
| *F02B 39/04* | (2006.01) |
| *F02M 35/02* | (2006.01) |

(52) U.S. Cl.
CPC ....... *F02M 35/10354* (2013.01); *F02B 39/04* (2013.01); *F02M 35/0201* (2013.01); *F02M 35/104* (2013.01); *F02M 35/10039* (2013.01)

(58) Field of Classification Search
CPC . F02B 29/0462; F02B 39/04; F02M 35/0201; F02M 35/10039; F02M 35/10354; F02M 35/104; F02M 35/116
See application file for complete search history.

(56) References Cited

U.S. PATENT DOCUMENTS

| | | |
|---|---|---|
| 3,831,566 A | 8/1974 | Thomas |
| 4,279,224 A | 7/1981 | Szabo et al. |
| (Continued) | | |

OTHER PUBLICATIONS

NPL-1 Picture from https://www.anguil.com/energy-recovery/, believed available by Oct. 25, 2016.
(Continued)

*Primary Examiner* — Phutthiwat Wongwian
*Assistant Examiner* — Diem T Tran
(74) *Attorney, Agent, or Firm* — McCarter & English, LLP

(57) ABSTRACT

Piston engine updraft and downdraft air intake systems, having a heat exchanger core and first and second intercooler flange structures having the same pattern of bolt apertures. The updraft air intake system has an air inlet component with an air inlet flange bolted to and having the same pattern of bolt apertures as the first intercooler flange structure, with the assembly configured to be mounted over the engine intake manifold with the air inlet component below the heat exchanger core. The downdraft air intake system has an air distribution tray with distribution channels, and an air passage closure tray that mates with the air distribution tray to form air conduits with outlet ports configured to be connected to cylinder air intake ports, and an air tray distribution flange bolted to and having the same pattern of bolt apertures as the second intercooler flange structure.

12 Claims, 48 Drawing Sheets

(56) References Cited

U.S. PATENT DOCUMENTS

| | | | | |
|---|---|---|---|---|
| 4,425,881 | A | * | 1/1984 | Lyndhurst .............. F02B 75/22 123/184.34 |
| 4,440,120 | A | | 4/1984 | Butler |
| 5,003,933 | A | | 4/1991 | Rush, II et al. |
| 5,094,194 | A | | 3/1992 | Rush, II et al. |
| 5,273,010 | A | | 12/1993 | Elder |
| 5,636,605 | A | | 6/1997 | Nomizo et al. |
| 6,092,498 | A | | 7/2000 | Lohr et al. |
| 6,161,513 | A | | 12/2000 | Lohr et al. |
| 6,227,179 | B1 | * | 5/2001 | Eiermann .............. F02B 75/22 123/563 |
| 6,234,131 | B1 | | 5/2001 | Brassell et al. |
| 6,293,264 | B1 | | 9/2001 | Middlebrook |
| 6,679,215 | B2 | | 1/2004 | Benson et al. |
| 7,021,263 | B1 | | 4/2006 | Agnew et al. |
| 7,086,365 | B1 | | 8/2006 | Teeter |
| 8,286,615 | B2 | * | 10/2012 | Dehnen .............. F02B 29/0462 123/542 |
| 8,567,366 | B2 | | 10/2013 | Reese et al. |
| 8,695,574 | B2 | * | 4/2014 | Nguyen .............. F28D 7/0025 123/540 |
| 9,038,610 | B2 | * | 5/2015 | Meshenky .............. F28D 9/0043 123/563 |
| 2004/0194750 | A1 | | 10/2004 | Tanikawa et al. |
| 2005/0279310 | A1 | | 12/2005 | Kondo et al. |
| 2006/0060163 | A1 | | 3/2006 | Vanderveen et al. |
| 2006/0278377 | A1 | | 12/2006 | Martins et al. |
| 2009/0014153 | A1 | | 1/2009 | Pimentel et al. |
| 2012/0167860 | A1 | * | 7/2012 | Wong .............. F02M 35/116 123/542 |

OTHER PUBLICATIONS

NPL-2 http://plateandfinheatexchanger.sell.gimpguru.org/iz65ef385-plate-frame-air-compressor-air-cooled-heat-exchanger-for-industrial-images.html (2 pages).
NPL-3 https://www.coloradospeed.com/intake-manifolds-c-2902_2557_2576/fast-lsxr-102mm-high-hp-intake-manifold-gm-ls3-p-36357.html . (5 pages).
NPL-4 Picture FAST_LSXRT_HP_Intake_Manifold_1.jpg.
NPL-5 "Billet Beauty: Frankenstein Engineering Dynamics Billet Intakes" from https://www.dragzine.com/news/billet-beauty-frankestein-engineering-dynamics-billet-intakes/ . (12 pages).
NPL-6 https://www.briantooleyracing.com/ls-intake-manifolds.html . (96 pages).
NPL-7 https://www.topspeed.com/cars/car-news/the-ssc-tuatara-s-twin-turbo-v-8-is-a-work-of-art-ar182191.html . (13 pages).
NPL-8 Intake Pictures. (3 pages).
U.S. Appl. No. 16/168,971, filed Oct. 24, 2018, Paolo Tiramani et al.
U.S. Appl. No. 16/168,999, filed Oct. 24, 2018, Paolo Tiramani et al.
U.S. Appl. No. 16/168,957, filed Oct. 24, 2018, Paolo Tiramani et al.
U.S. Appl. No. 16/168,978, filed Oct. 24, 2018, Paolo Tiramani et al.
U.S. Appl. No. 16/168,984, filed Oct. 24, 2018, Paolo Tiramani et al.
International Search Report and Written Opinion dated Oct. 22, 2019, in International Application No. PCT/US2019/038026.
NPL 1—Picture from web page https://www.anguil.com/energy-recovery/ believed available by Oct. 25, 2016.
NPL 2—http://plateandfinheatexchanger.sell.gimpguru.org/iz65ef385-plate-frame-air-compressor-air-cooled-heat-exchanger-for-industrial-images.html.
NPL 3—https://www.coloradospeed.com/intake-manifolds-c-2902_2557_2576/fast-lsxr-102mm-high-hp-intake-manifold-gm-ls3-p-36357.html.
NPL 5—"Billet Beauty: Frankenstein Engineering Dynamics Billet Intakes" from https://www.dragzine.com/news/billet-beauty-frankenstein-engineering-dynamics-billet-intakes/.
NPL 6—https://www.briantooleyracing.com/ls-intake-manifolds.html.
NPL 7—https://www.topspeed.com/cars/car-news/the-ssc-tuatara-s-twin-turbo-v-8-is-a-work-of-art-ar182191.html.
NPL 8—Intake Pictures.

* cited by examiner

INTAKE AIR SYSTEMS AND COMPONENTS

CROSS-REFERENCES TO RELATED APPLICATIONS

This application is a continuation-in-part application of U.S. patent application Ser. No. 16/168,984, filed Oct. 24, 2018, which claims the benefit of U.S. Provisional Application No. 62/687,461, filed Jun. 20, 2018, U.S. Provisional Application No. 62/697,072, filed Jul. 12, 2018, U.S. Provisional Application No. 62/678,460, filed May 31, 2018, U.S. Provisional Application No. 62/616,601, filed Jan. 12, 2018, U.S. Provisional Application No. 62/598,045, filed Dec. 13, 2017, U.S. Provisional Application No. 62/577,965, filed Oct. 27, 2017, and U.S. Provisional Application No. 62/577,423, filed Oct. 26, 2017.

BACKGROUND OF THE INVENTION

Field of the Invention

This invention relates to components, and systems arranged from such components, for introducing outside air to an internal combustion engine.

Description of the Related Art

The guidance and conditioning of ambient air from the atmosphere to the combustion regions or chambers of an internal combustion engine can be carried out in different ways, often with the goal of influencing engine performance characteristics. For example, some internal combustion engines compress the intake air prior to introduction to the combustion regions or chambers. In the case of internal combustion engines having components that reciprocate in cylindrical spaces to convert energy released in combustion to rotational torque, this is done to increase the amount of air in the cylinders on combustion, which can yield increased pressure on the power stroke relative to the case where the engine is naturally aspirated, and can in turn increase engine power and engine thermal efficiency. The process of compressing the intake air of internal combustion engines is sometimes referred to as supercharging, in the case where crankshaft mechanical power is utilized to run an air compressor, or turbocharging, in the case where exhaust gas is fed to a gas turbine that is coupled to run an air compressor.

Whether supercharging or turbocharging is used, compressing the intake air can cause the air to rise in temperature. For a given air pressure, such a rise in temperature will reduce air density per unit volume of air. As a result, the amount of air introduced to a cylinder, while greater than if natural aspiration were relied upon, is less than would be the case were the intake air at a lower temperature.

To cool the compressed air prior to introduction to the cylinder, a heat exchanger is sometimes placed in the intake air stream between the air compressor and the intake manifold. While desirably reducing intake air temperature, placement of a heat exchanger can be a challenge in the limited space of a vehicle engine compartment, as can be the routing of the necessary air ducts and cooling fluid circuits. Thus the introduction of a heat exchanger, sometimes referred to as an intercooler, can result in complex plumbing arrangements that can make service difficult, be costly and cause frictional losses.

Also in an effort to affect engine performance characteristics, the shape and length of the air passage leading to the cylinders are varied. Such design changes can be relatively difficult to implement, particularly on an aftermarket basis.

SUMMARY OF THE INVENTION

The present invention features plural inter-cooperative intake air system components that can be assembled and interchanged with relative ease to yield such varying engine performance characteristics as the user may choose.

In particular, the intake air system of the present invention includes an intercooler design that is compact and modular, allowing the simple utilization of air inlets and air outlets of different design, in accordance with engine configuration. The compactness of the intercooler design disclosed herein additionally offers the potential to substantially increase the volume of cooling capacity through the optional use of multiple intercoolers, which can be positioned in a relatively small space in the engine compartment or even appurtenant to the engine itself, to thereby further improve engine performance.

Thus in one aspect, the present invention is directed to an intercooler that comprises a rectangular heat exchanger core for cooling air with a liquid, the heat exchanger core having a first face for entry of uncooled air and a second opposing face for exit of cooled air. A first rectangular intercooler mounting flange structure is secured to the periphery of the first face of the heat exchanger core and a second intercooler rectangular mounting flange structure is secured to the periphery of the second face of the heat exchanger core, where the first rectangular intercooler mounting flange structure and the second rectangular intercooler mounting flange structure have approximately the same size and geometry, and the first rectangular intercooler mounting flange structure and the second rectangular intercooler mounting flange structure have substantially identical plural spaced-apart symmetrically distributed bolt apertures. The first rectangular intercooler mounting flange structure comprises a first L-shaped core mounting flange and a second L-shaped core mounting flange, the second rectangular intercooler mounting flange structure comprises a third L-shaped core mounting flange and a fourth L-shaped core mounting flange, and the first L-shaped core mounting flange, the second L-shaped mounting flange, the third L-shaped mounting flange and the fourth L-shaped core mounting flange all have approximately the same size and geometry.

In another aspect, the present invention is directed to an air distribution system for an internal combustion piston engine having a first row of at least two cylinders inclined relative to a vertical plane, a second row of at least two cylinders inclined relative to the vertical plane, and where the two rows of cylinders form a V configuration with the vertical plane being approximately equidistant between the two rows. The air distribution system includes an air distribution tray adapted for mounting to the engine between the first and second row of cylinders, where the air distribution tray has a planar perimeter defining a horizontal plane and plural outlet ports, the plural outlet ports are disposed in an alternating staggered relationship about a longitudinal plane perpendicular to the horizontal plane, each of the plural outlet ports is adapted for connection to a respective air intake port of the cylinders of the internal combustion engine, and the air distribution tray is configured so that the planar perimeter of the air distribution tray is above both the engine and the outlet ports when the air distribution system is mounted to the engine and the plural outlet ports are connected to the air intake ports of the cylinders. The air distribution tray includes plural distribution channels configured to be below the planar perimeter when the air distribution tray is mounted to the engine, where each distribution channel generally is concavely curved about a longitudinal axis located in the longitudinal plane and is bounded by a first end and a second end, with the first end of each of the plural distribution channels coupled to a respective one of the plural outlet ports and the second end being longitudinally offset from the first end, and with the distribution channel shaped to trace approximately a serpentine path in the horizontal plane along its length between the first end and the second end.

The air distribution system additionally includes an air passage closure tray fitted in a mating relationship with the air distribution tray, where the air passage closure tray includes plural closure channels, each of which is equal to or shorter in length than, and concavely curved and shaped to engage in a mating relationship with, a respective one of the plural distribution channels, to form plural concavely curved closed air conduits that are configured to be below the planar perimeter when the air distribution system is mounted to the engine. Each of the plural closure channels has a third end terminating in a conduit inlet port and a fourth end communicating with a respective outlet port of the air distribution tray, and each of the plural closed air conduits is adapted to draw air from a common air region above the conduit inlet ports when the air distribution system is mounted to the engine, with adjacent pairs of the plural closed air conduits configured to provide alternating opposing air flow paths from their respective conduit inlet ports to the respective outlet ports with which they communicate.

These and other aspects of the present invention are described in the drawings annexed hereto, and in the description of the preferred embodiments and claims set forth below.

DETAILED DESCRIPTION OF THE PREFERRED EMBODIMENTS

The components of the present invention are preferably utilized in conjunction with V-style reciprocating internal combustion engines; i.e., engines having two cylinder banks of at least two cylinders each, each bank arranged in a row inclined from the vertical so as to form a "V", including V-4 engines, V-6 engines, V-8 engines, V-12 engines, V-16 engines, etc.

The components of the present invention can be selected and arranged to provide an upward flow (i.e., updraft) air intake configuration, or a downward flow (i.e., downdraft) air intake configuration. In an upward flow/updraft air intake configuration, intake air that has been compressed (preferably by one or more turbochargers) is drawn into the intake system upwardly, away from the engine, through one or more intercoolers 300 and then redirected to an engine intake manifold, for distribution to the cylinders. In a downward flow/downdraft air intake configuration, ambient or compressed intake air is drawn into the intake system downwardly, toward the engine, optionally through one or more intercoolers 300, and then directed through a particular air distribution system described herein (air distribution tray 720, described below), for distribution to the cylinders. Exhaust manifolds and associated components, turbochargers, exhaust gas routing circuits, and turbocharger exhaust and air circuits that can be utilized in conjunction with the intake air systems and components of the present invention are described in U.S. patent application Ser. No. 16/168,984, entitled "Customizable Engine Air Intake/Exhaust Systems," filed on Oct. 24, 2018 and having the same inventors as the subject application. The contents of U.S. patent application Ser. No. 16/168,984 are hereby incorporated by reference as if fully set forth herein, including descriptions of the aforementioned exhaust manifolds and associated components, turbochargers, exhaust gas routing circuits, and turbocharger exhaust and air circuits, found for example at paragraphs 55-71, 77-122 and 179-186, and FIGS. 1-12 and 33, among others, of U.S. patent application Ser. No. 16/168,984.

Figure 1:
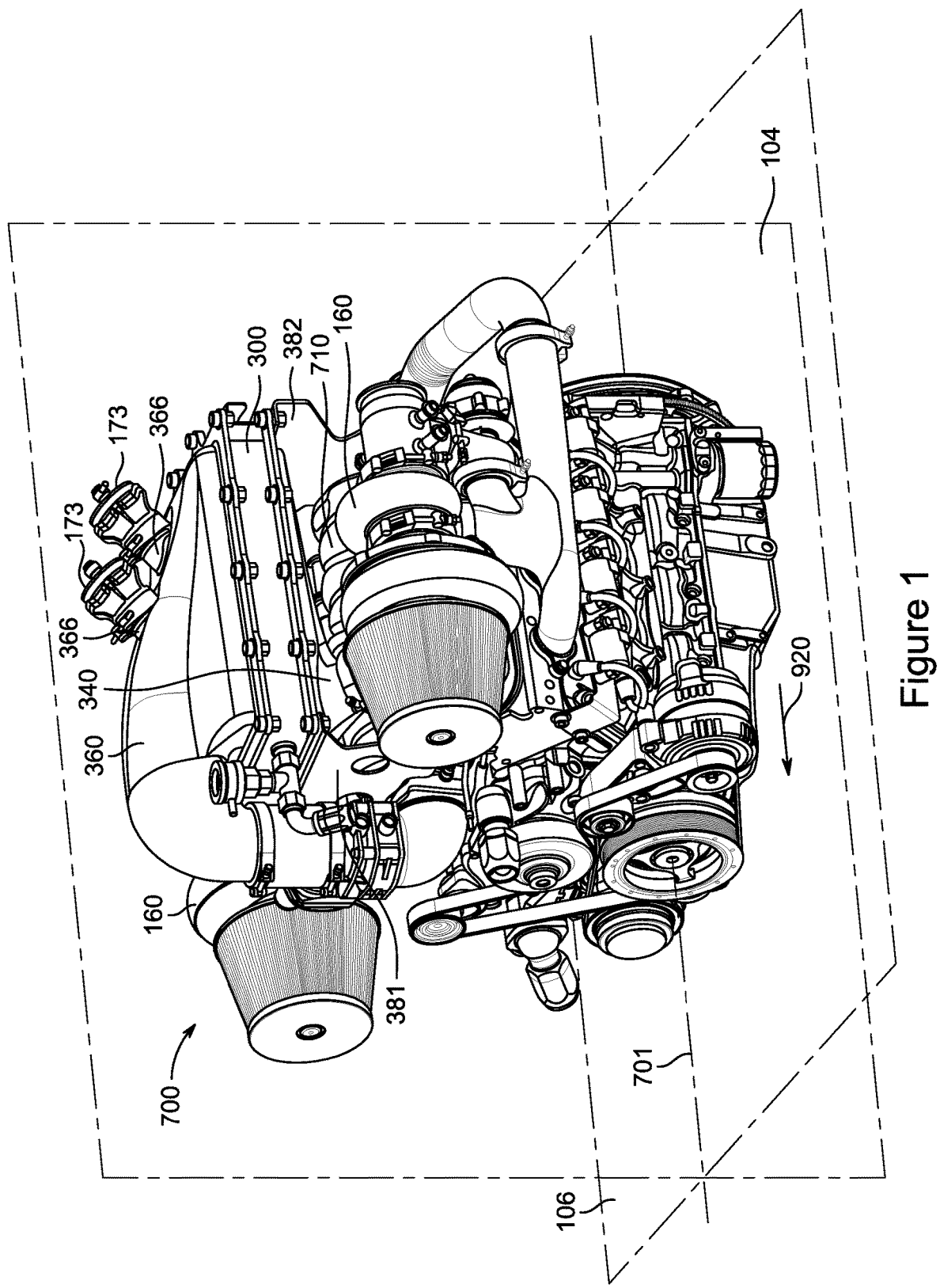
FIG. 1 is a perspective view of an engine utilizing an upward flow air intake arrangement in accordance with the present invention.
Figure 2:
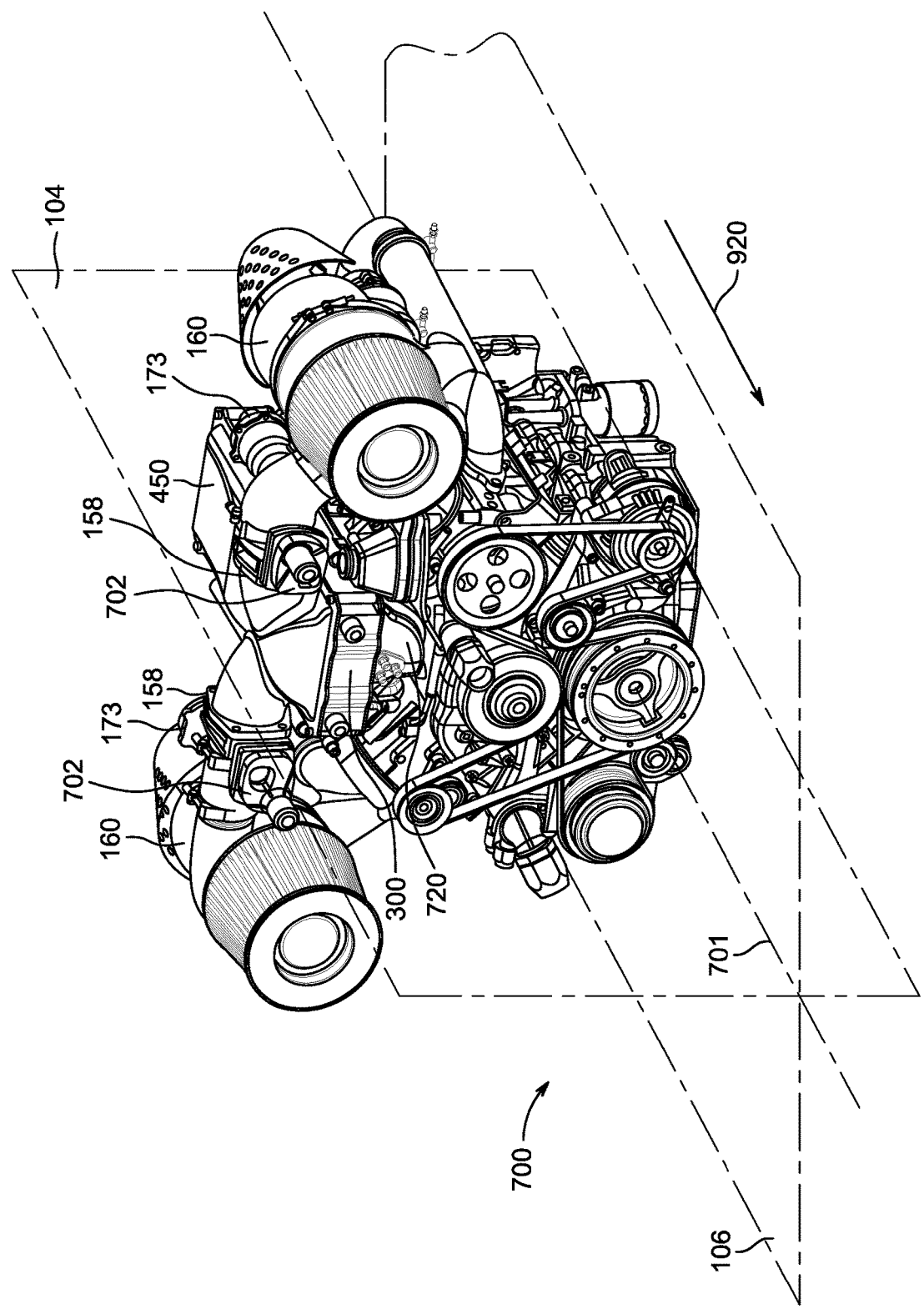
FIG. 2 is a perspective view of an engine utilizing a downward flow air intake arrangement in accordance with the present invention.

FIG. 1 depicts an exemplary engine 700 utilizing air intake system components of the present invention selected and arranged to provide an upward flow configuration, and FIG. 2 depicts an exemplary engine 700 utilizing air intake system components of the present invention selected and arranged to provide a downward flow configuration. The components of the present invention, when selected and arranged to define an upward flow configuration, lend themselves to use in conjunction with either the stock engine intake manifold or aftermarket intake manifolds. Alternatively, an air distribution tray 720 as described herein can be utilized in lieu of stock engine intake manifolds or aftermarket intake manifolds, in which case the components of the present invention can be selected and arranged to provide a downward flow configuration. The downward flow configuration is characterized by a lower overall engine height, and even greater customization options, than are available with the components of the present invention selected and arranged in an upward flow configuration. The particular engine 700 shown in FIGS. 1 and 2 is an LS3 model 6.2 liter displacement small block V-8 engine, with fuel injection (marketed by General Motors Company).

FIGS. 1 and 2 as well as other figures depict a reference arrow 920. Where arrow 920 is presented in a figure showing a component or components in isolation from engine 700, it is assumed that the orientation of that component or those components when secured to engine 700 is with their respective arrows 920 aligned and pointing in the same direction, unless stated otherwise. Also in FIGS. 1 and 2, the ground is parallel to a horizontal plane 106 that intersects a vertical reference plane 104 along crankshaft centerline 701. In the case of V-8 engines mounted in a conventional upright orientation, as depicted in FIGS. 1 and 2, vertical reference plane 104 is equidistant between the cylinder banks. Any horizontal line contained in this vertical reference plane 104 that is also oriented parallel to the ground defines the longitudinal direction in FIGS. 1 and 2. A geometrical plane (not shown in FIG. 1 or 2) perpendicular to vertical reference plane 104 and orthogonal to crankshaft centerline 701 may be referred to as a transverse plane, and any horizontally-oriented direction in a transverse plane may be referred to as a transverse direction.

Upward Flow Configuration

The principal components of an air intake system of the present invention utilizing an upward flow (updraft) configuration are intercooler 300, single channel air inlet 320 or dual channel air inlet 340 (depending on whether one turbocharger or two turbochargers are used) and air outlet 360, each described below. Specifics regarding intercooler 300, single channel air inlet 320, dual channel air inlet 340 and air outlet 360 are described in U.S. patent application Ser. No. 16/168,984, entitled "Customizable Engine Air Intake/Exhaust Systems," filed on Oct. 24, 2018 and having the same inventors as the subject application. The contents of U.S. patent application Ser. No. 16/168,984 are hereby incorporated by reference as if fully set forth herein, including descriptions of the aforementioned intercooler 300, single channel air inlet 320, dual channel air inlet 340 and air outlet 360, found for example at paragraphs 130-153, 155 and 166-174, and FIGS. 14-25 and 28-33, among others, of U.S. patent application Ser. No. 16/168,984.

Intercooler (300)

Figure 3:
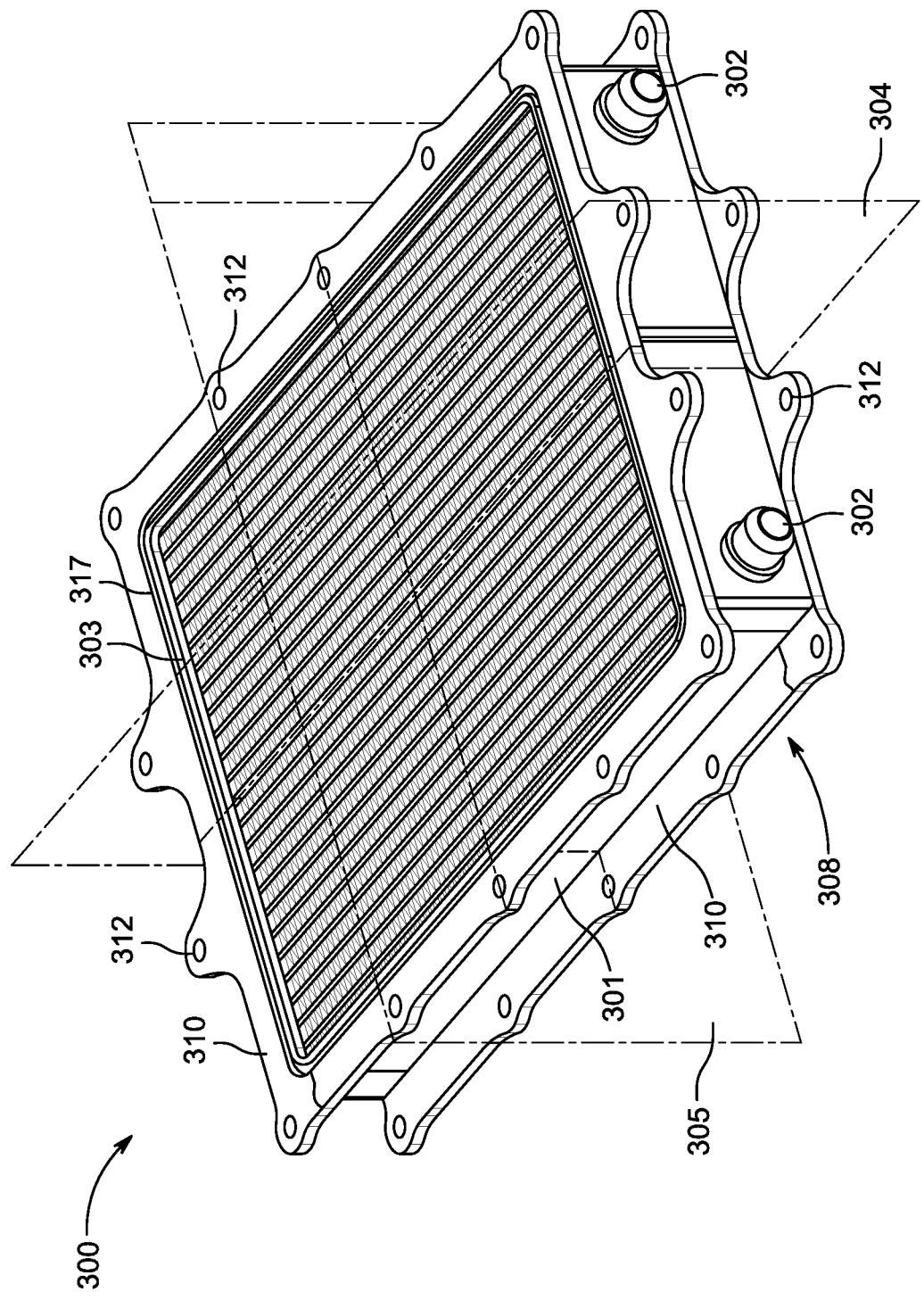
FIG. 3 is a perspective view of the intercooler utilized in the present invention.
Figure 4:
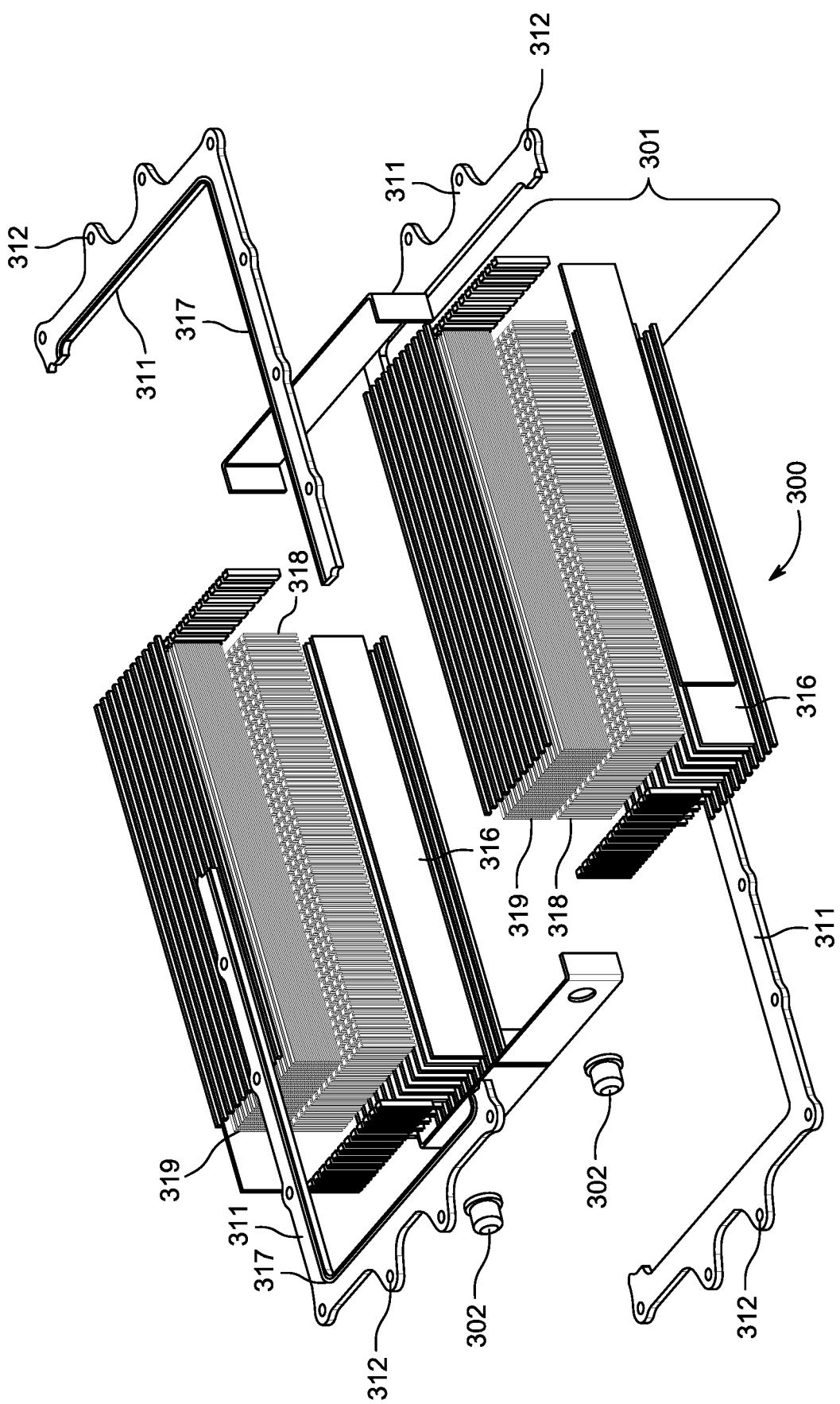
FIG. 4 is an exploded perspective view of the intercooler utilized in the present invention.

FIGS. 3 and 4 show an intercooler 300 in accordance with the present invention. Intercooler 300 is particularly adapted for use in conjunction with components for delivering compressed air to intercooler 300 from a compressor, and for receiving from intercooler 300 cooled air and delivering it, in the case of an upward flow configuration, to a stock engine intake manifold (710 in FIG. 1) or an aftermarket engine intake manifold. Notably however, although intercooler 300 is described herein in the context of an upward flow configuration, it can be employed with equal facility in a downward flow configuration, as is described below in this disclosure.

In general, intercooler 300 in the preferred embodiment is a rectangular cuboid, with two opposing faces and four sides (in this disclosure, "rectangular" includes square shapes). In FIG. 3, there is a geometric plane 304, which evenly divides intercooler 300 in one direction (referred to as the longitudinal direction for convenience of reference), and a geometric plane 305, which evenly divides intercooler 300 in a second direction, perpendicular to the longitudinal direction (referred to as the transverse direction herein for convenience of reference). The intersection of these two planes from time to time may be referred to herein as the vertical direction for convenience of reference.

There is additionally a third geometric plane 306 (not shown in FIGS. 3 and 4), which is perpendicular to planes 304 and 305, and may be referred to from time to time herein as the horizontal plane for convenience of reference. In this disclosure, the plan view of intercooler 300 refers to a view parallel to this horizontal geometric plane 306. In the case where intercooler 300 is not square in plan view (i.e., one side is longer than an adjacent side), for reference purposes in this disclosure the longer side will be deemed to lie in the longitudinal direction, and the shorter side in the transverse direction. The aspect ratio, AR, of intercooler 300 is the ratio of the overall longitudinal dimension of intercooler 300 in plan view, divided by the overall transverse dimension of intercooler 300 in plan view. The longitudinal, transverse and vertical directions of FIG. 3 are generally coincident with the correspondingly-identified directions referenced in relation to FIGS. 1 and 2.

Intercooler 300 includes a heat exchanger core 301 and two rectangular mounting flange structures, namely intercooler flange assemblies 310, one of which is secured to a first face 303 of intercooler core 301 about its periphery, and the other of which is secured to the second opposing face 308 (not visible in FIG. 3) of intercooler core 301 about its periphery. Faces 303, 308 generally are parallel to each other. Two fittings 302 are also provided for the ingress and egress of coolant.

The air to be cooled flows through the intercooler 300, entering through one face 303 or 308 of intercooler 300 and exiting through the other opposing face 303 or 308 of intercooler 300. The coolant flows generally in a plane perpendicular to the air flow, entering intercooler core 301 through one of fittings 302, passing between the faces 303, 308 of intercooler 300 to cool the air, and exiting intercooler core 301 through the other of fittings 302. The coolant preferably is liquid, and more preferably water, with or without an additive to increase the liquid state temperature range, such as ethylene glycol.

The heat exchanger core 301 utilizes a plate and bar structure, shown in exploded form in FIG. 4. In particular, the heat exchanger core 301 has a multi-layer structure of plural air fin sections 318 interleaved with plural water fins 319, where the individual air fins and water fins are separated by flow isolation sheets 316 interposed between them. Heat exchanger core 301 preferably is fabricated from aluminum or like material of relatively high thermal conductivity. Intercooler 300 and its heat exchanger core 301 present a relatively thin, pancake appearance, owing to the thickness of core 301 (vertical direction in FIG. 3) being substantially less than the longitudinal and transverse dimensions of core 301, which in turn is a consequence of the difference in heat capacitance of the preferred liquid coolant as compared to air, even compressed air. The flow of air through core 301 can be in either direction with no change in heat transfer characteristics; i.e., air can enter either through face 303 or face 308 of intercooler 300 without preference.

It is preferred that each of the intercooler flange assemblies 310 secured about the periphery of faces 303, 308 be substantially identical in design to the other. It is further preferred that each intercooler flange assembly 310 comprises two intercooler flange L-components 311. Referring to FIG. 4, each intercooler flange L-component 311 is L-shaped, and preferably is identical in size and geometry to the other L-components, so that when one L-component 311 is paired with another such L-component 311, they together form an intercooler flange assembly 310 in the form of a rectangular peripheral frame, which is joined to a face (303 or 308) of heat exchanger core 301 about its periphery.

The intercooler flange assemblies 310 can be fabricated from aluminum plate stock or the like, and are fastened by brazing, welding or the like to the opposing faces 303, 308 of a heat exchanger core 301, about their peripheries, to form an intercooler 300. Splitting each intercooler flange assembly 310 into two L-components 311 yields fabrication economies; i.e., multiple intercooler flange L-components 311 can be laid out, one against the other, and cut from one sheet, whereas cutting an intercooler flange assembly 310 as a one piece component leaves a large central cut-out, which may uneconomically need to be discarded. Further, any L-component 311 can be used on any of the four possible positions bounding the heat exchanger core 301.

Each intercooler flange assembly 310 preferably has plural spaced-apart bolt apertures 312 for receiving threaded bolts 314. It is additionally preferred that the bolt pattern for the intercooler flange assembly 310 affixed about the periphery of face 303 have the same bolt pattern as the intercooler flange assembly 310 affixed about the periphery of face 308.

It is additionally preferred that the bolt apertures 312 be symmetrically arranged about intercooler flange assembly 310. That is, referring to FIG. 3, it is preferred that the bolt pattern be symmetrically arranged to each side of longitudinal plane 304, and additionally be symmetrically arranged to each side of transverse plane 305. With these symmetric relationships, if the intercooler has a rectangular configuration in plan view (AR≠1), the bolt pattern presented in plan view is the same whether the intercooler is in its original orientation, or is rotated 180 degrees, or is flipped over. Likewise, if the intercooler has a square configuration (AR≈1), the bolt pattern presented in plan view with symmetrically arranged bolt apertures is the same whether the intercooler is in its original orientation, or is rotated 90 degrees, or is flipped over. A square configuration expands the potential applications to which the intercooler disclosed herein can be put, opening up use with an even greater variety of air routing arrangements, turbochargers, engine systems and vehicles.

Single Channel Air Inlet (320)

Figure 5:
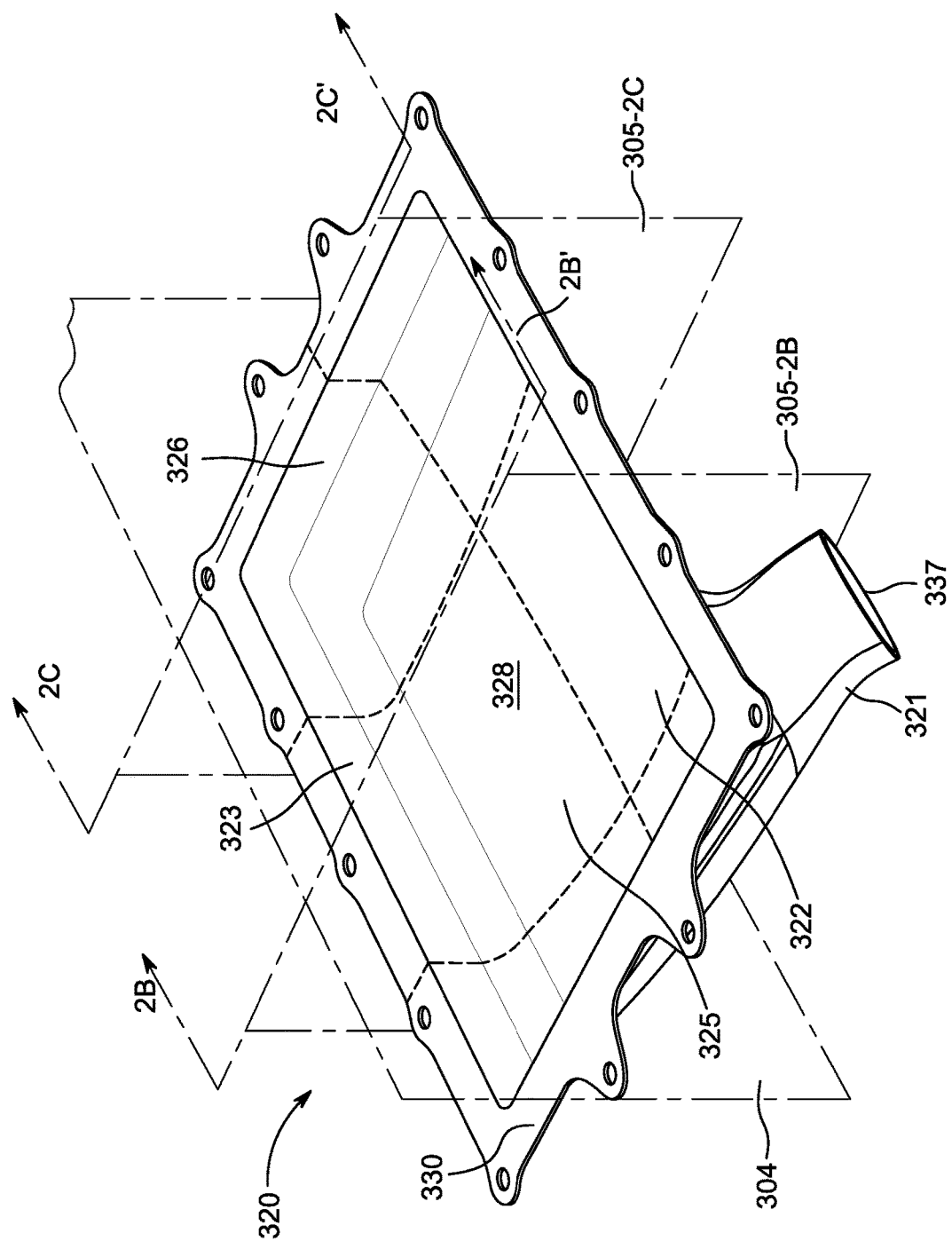
FIG. 5 is a perspective view of a single channel air inlet utilized in the upward flow configuration of the present invention.
Figure 6:
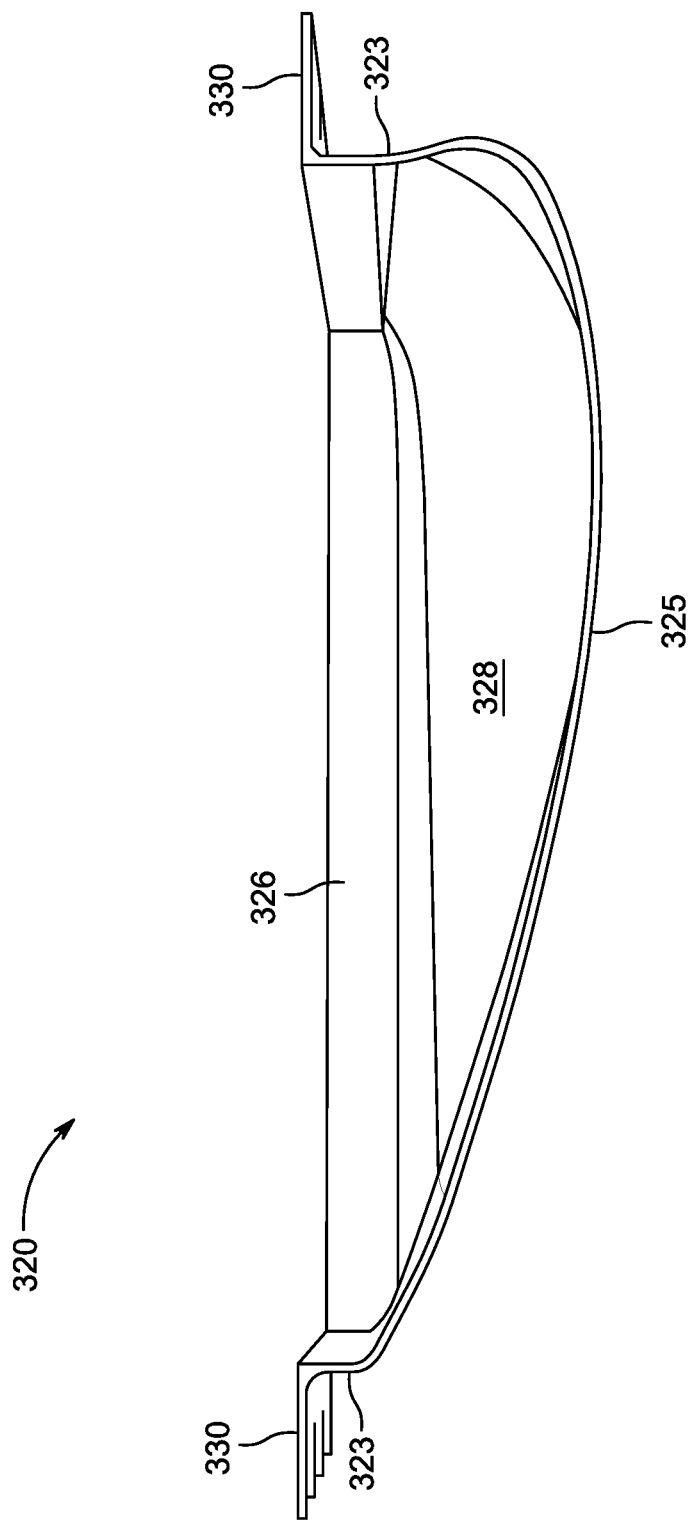
FIG. 6 is a view of the single channel air inlet shown in FIG. 5 which is sectioned on geometrical plane 305-2B and viewed as shown by section line 2B-2B'.
Figure 7:
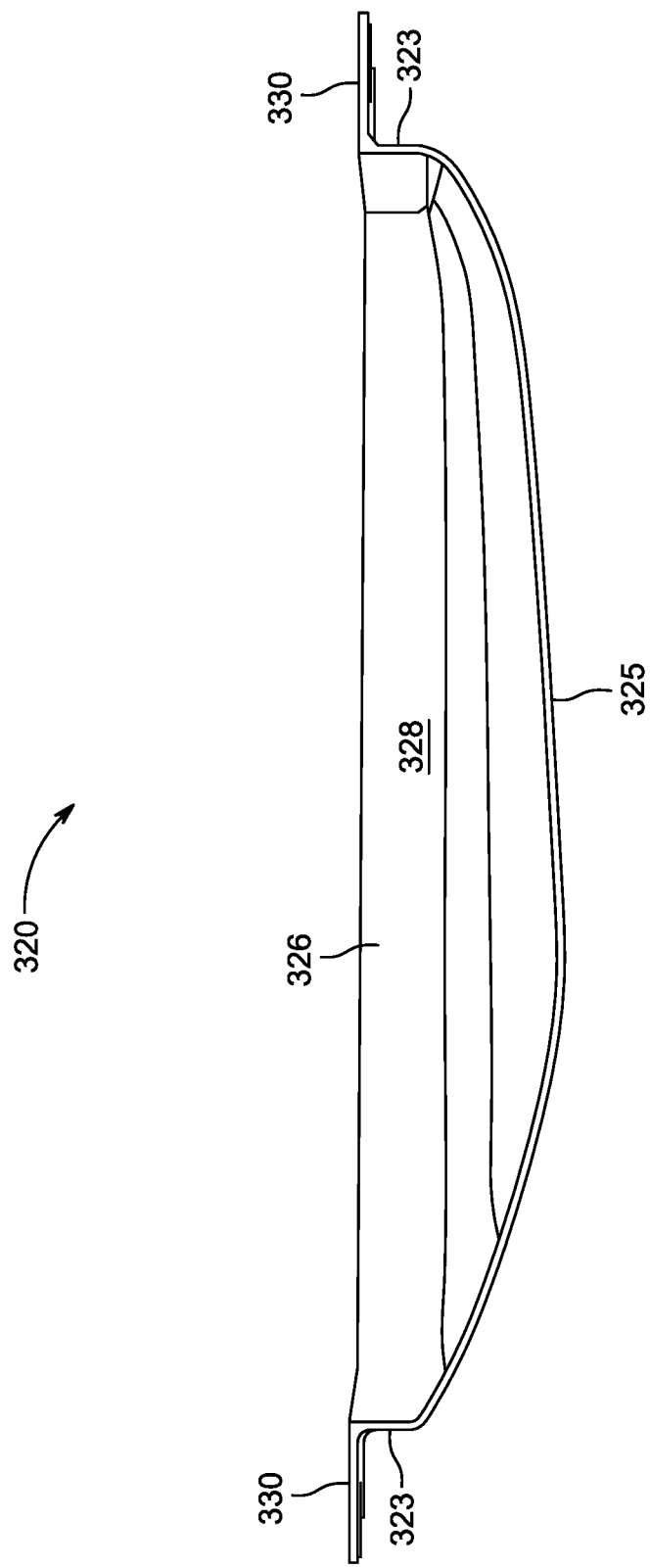
FIG. 7 is a view of the single channel air inlet shown in FIG. 5 which is sectioned on geometrical plane 305-2C and viewed as shown by section line 2C-2C'.

FIG. 5 shows a single channel air inlet 320 for delivery of compressed air through a single channel, conduit or pipe, such as for example from a single air compressor, to an intercooler 300. Single channel air inlet 320 includes an air inlet pipe 321, an air inlet plenum 322 and an air inlet flange 330. Single channel air inlet 320 is adapted to be joined to intercooler 300 to form a unitary assembly, as described below.

Single channel air inlet 320 is configured to deliver air across one face (303 or 308) of intercooler 300. In the preferred embodiment, longitudinal plane 304 in FIG. 5 evenly divides air inlet 320 in plan view, and is coplanar with longitudinal plane 304 in FIG. 3 that evenly divides intercooler 300. The intercooler 300/single channel air inlet 320 assembly in the preferred embodiment is particularly adapted to be mounted over the intake manifold of a V-8 engine, with longitudinal plane 304 passing through the crankshaft axis, and with intercooler 300 positioned over single channel air inlet 320, so that inlet 320 delivers an upward flow of intake air through intercooler 300. For this mounting position, it is preferred that air inlet 320 be configured so that longitudinal plane 304 does not evenly divide inlet pipe 321; rather, as shown for example in FIG. 9, inlet pipe 321 is positioned to one side of longitudinal plane 304 (shown on edge in FIG. 9). Such side positioning allows inlet pipe 321 to be closer, in an appropriately configured system, to the air compressor air outlet, thereby yielding a tighter and more compact engine accessory package. For the same reason, the centerline of inlet pipe 321 is generally transversely oriented, so that its inlet aperture 337 is positioned to one side of air inlet 320. Air flows in a generally transverse direction through inlet pipe 321 into plenum 322.

Plenum 322 is internally contoured to transition the transverse air flow from inlet pipe 321 to flow across the receiving face (303 or 308) of intercooler 300. Plenum 322 comprises four sidewalls (two longitudinal sidewalls 323, two transverse sidewalls 326), which are joined by a glacis 325. Sidewalls 323, 326 and glacis 325 together define an inlet plenum cavity 328 whose transverse cross-sectional area is greatest proximate to inlet pipe 321, least distal from inlet pipe 321, and which smoothly decreases between these two regions, as can be seen from FIGS. 5, 6 and 7. The transverse cross-section of inlet plenum cavity 328 at any longitudinal point is generally not symmetric about longitudinal plane 304, as is exemplified by FIGS. 6 and 7, but rather is shaped with the goal of inducing the air to be distributed across the receiving face (303 or 308) of intercooler 300 more evenly, minimizing or even eliminating areas of low air flow through the receiving face, while at the same time accommodating the particular shape and positioning of inlet pipe 321 and more generally maintaining the intercooler 300/single channel air inlet 320 assembly as a compact package. In general, plenum cavity is deeper adjacent inlet pipe 321 than distal from inlet pipe 321.

It is preferred that air inlet flange 330 of single channel air inlet 320 be substantially identical in size and geometry to intercooler flange assembly 310, and have the same pattern of bolt apertures as intercooler flange assembly 310. Accordingly, air inlet flange 330 can be bolted to either of the two intercooler flange assemblies 310 of an intercooler 300.

Figure 8:
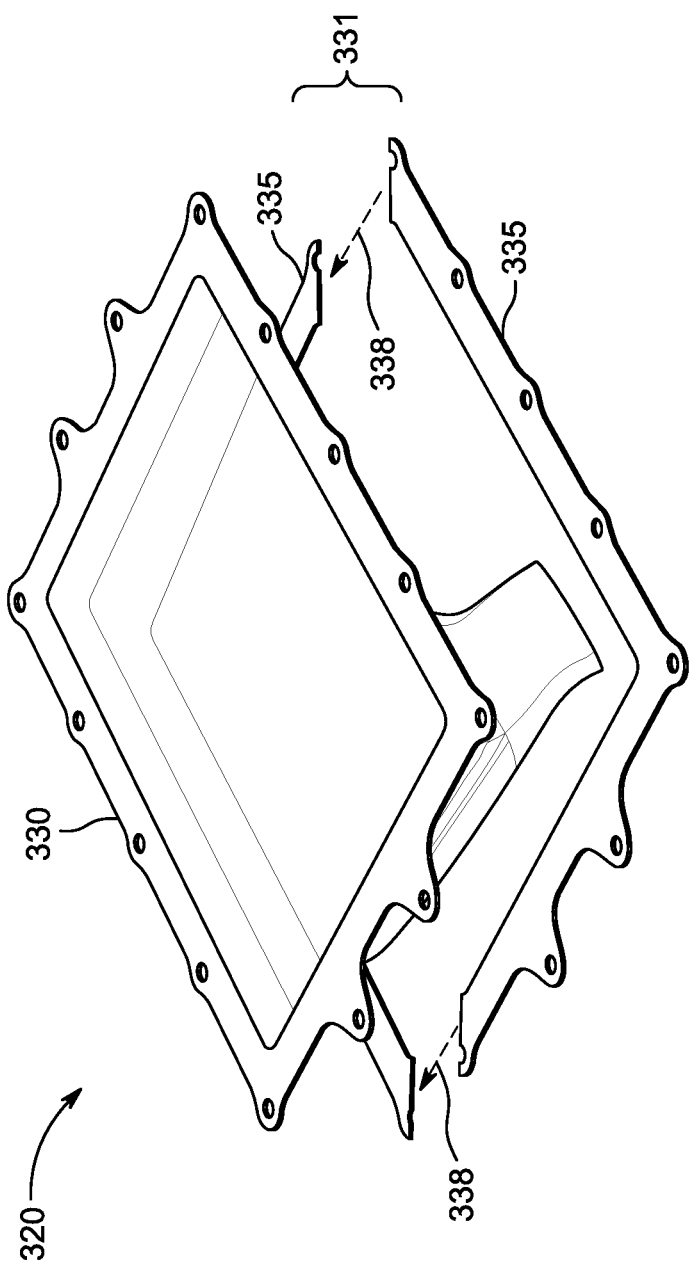
FIG. 8 is a perspective view of the single channel air inlet shown in FIG. 5 and its inlet seal assembly.
Figure 9:
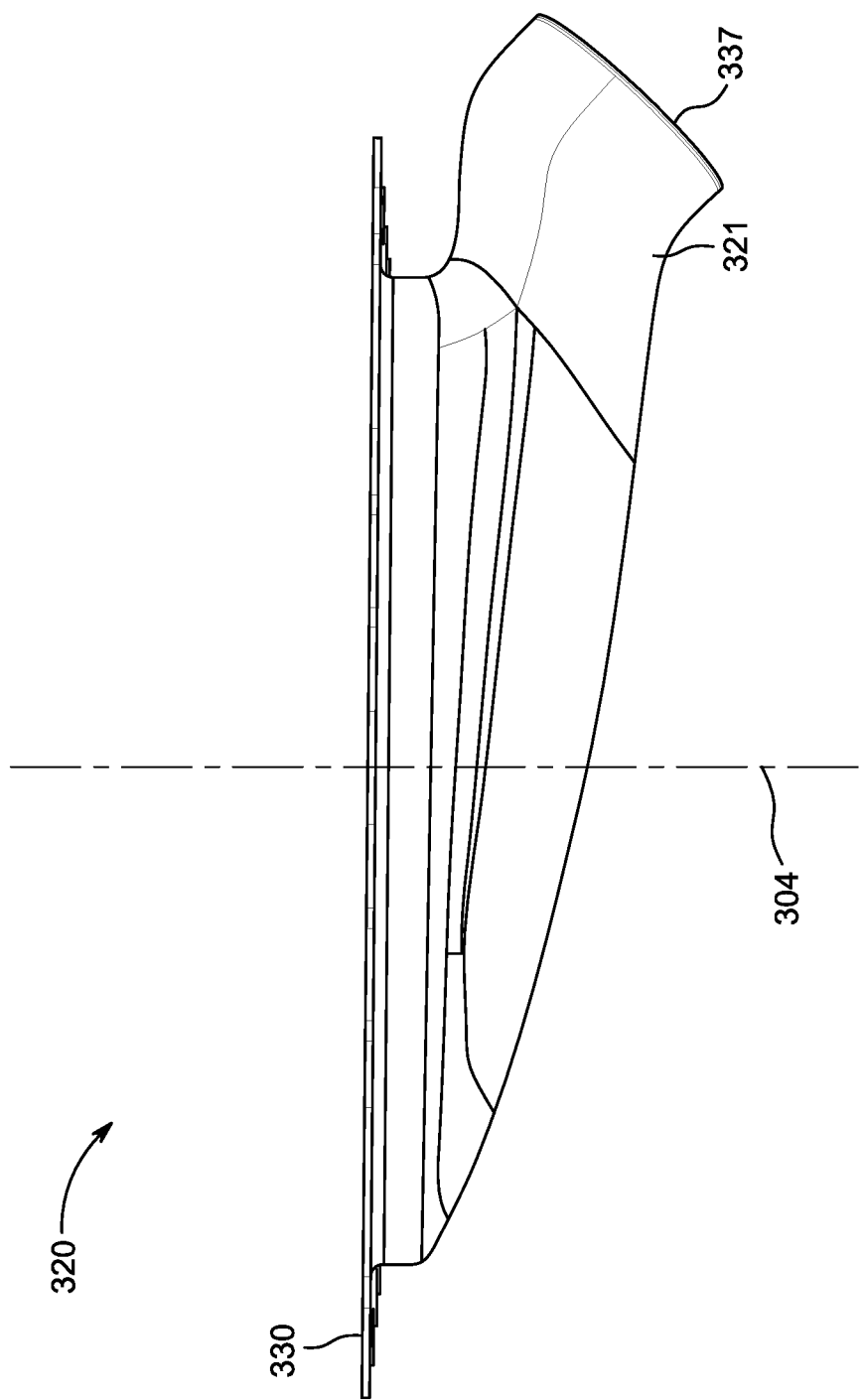
FIG. 9 is a front view of the single channel air inlet shown in FIG. 5.

There is optionally provided an inlet seal assembly 331 to facilitate securing single channel air inlet 320 to intercooler 300. It is particularly preferred that each inlet seal assembly 331 includes two inlet seal L-components 335. As shown in FIG. 8, each inlet seal L-component 335 is L-shaped, and preferably is identical in size and geometry to the other inlet seal L-component 335, so that when one such L-component 335 is paired with another such L-component 335 (arrows 338 in FIG. 8), they together form an inlet seal assembly 331 in the form of a rectangular frame. Splitting the inlet seal assembly 331 into L-shaped components 335 yields fabrication economies, as described above in regard to intercooler flange assembly 310 and intercooler flange L-components 311. Inlet seal assembly 331 preferably has the same pattern of bolt apertures as both intercooler flange assembly 310 and air inlet flange 330.

Single channel air inlet 320 can be fabricated from sheet metal, such as steel or aluminum, either from a single piece of stock or from multiple pieces then assembled and fastened together, such as by riveting, brazing or welding. Alternatively, air inlet 320 can be fabricated from plastics such as HDPE, or from composite materials such as temperature-resistant fiberglass/fiberglass resin, carbon fiber, Kevlar and others. The inlet seal L-components 335 are preferably fabricated from aluminum plate stock or the like.

To assemble the preferred embodiments of intercooler 300 and single channel air inlet 320, air inlet flange 330 is positioned between an inlet seal assembly 331 and one of the two intercooler flange assemblies 310 of intercooler 300; following which inlet seal assembly 331 and the selected intercooler flange assembly 310 are urged together, such as by means of nuts 309 and bolts 314, to yield a unitary air inlet/intercooler system. Inlet seal assembly 331 distributes the compressive joinder loads around the periphery of air inlet flange 330 to provide a better seal than would be attained by using bolts alone creating pressure points at discrete locations along air inlet flange 330. A resilient sealing gasket, component or structure may additionally be interposed between air inlet flange 330 and intercooler flange assembly 310 to contribute to sealing. For example, FIG. 3 shows an optionally provided sealing groove 317 on the exterior face of each intercooler flange assembly 310 for receiving an O-ring 307 and yielding a relatively air-tight seal between intercooler 300 and air inlet 320.

Dual Channel Air Inlet (340)

Figure 14:
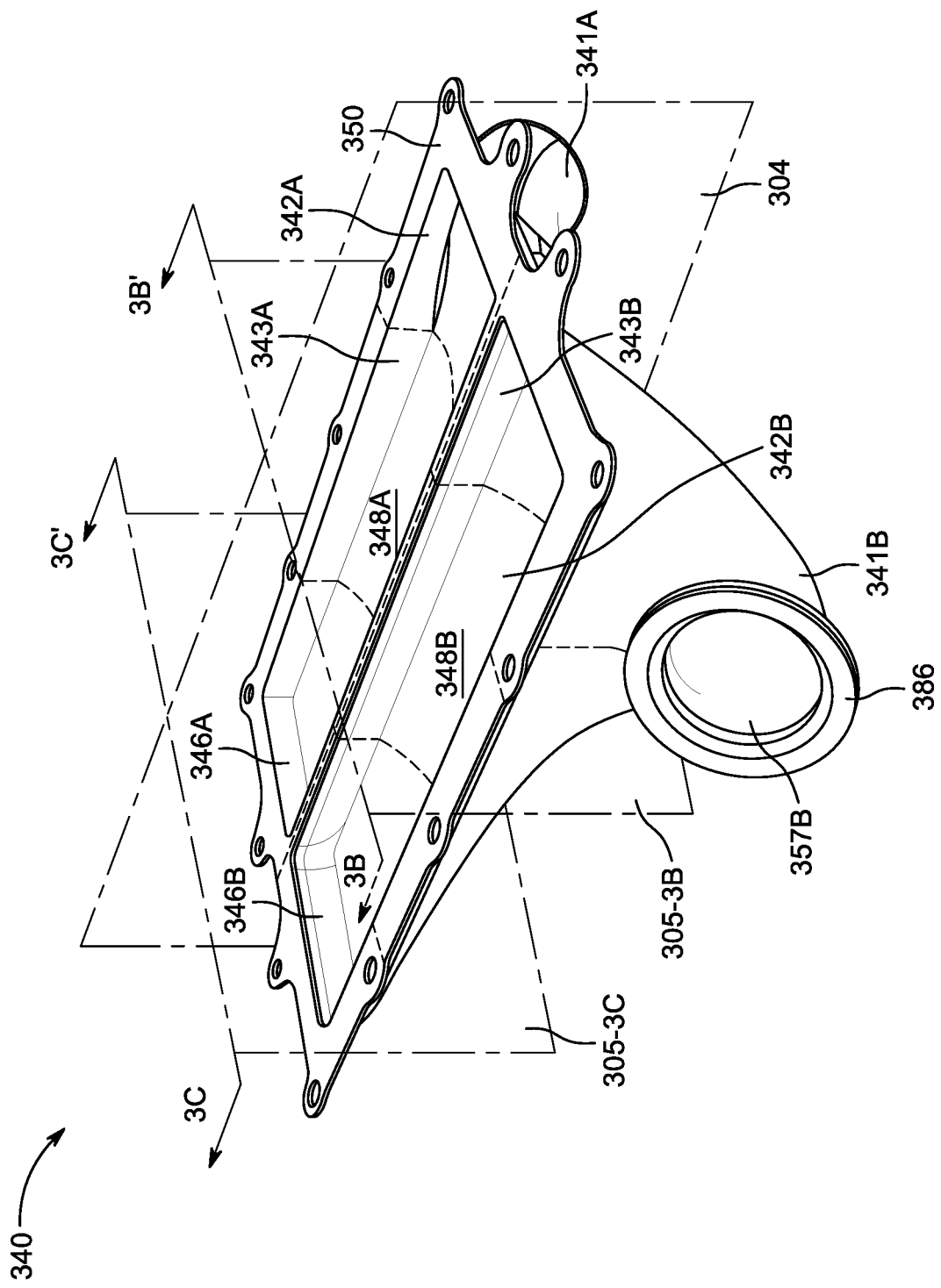
FIG. 14 is a perspective view of a dual channel air inlet utilized in the upward flow configuration of the present invention.

FIG. 14 shows a dual channel air inlet 340 for delivery of compressed air through two channels, conduits or pipes, such as for example from two air compressors, to an intercooler 300. In comparison with single channel air inlet 320, dual channel air inlet 340 is characterized by having two plenums. Accordingly, referring to FIGS. 14, 17 and 18, dual channel air inlet 340 includes a first air inlet pipe 341A, a second air inlet pipe 341B, a first air inlet plenum 342A, a second air inlet plenum 342B and an air inlet flange 350. Dual channel air inlet 340 is adapted to be joined to intercooler 300 to form a unitary assembly, as described below.

Figure 18:
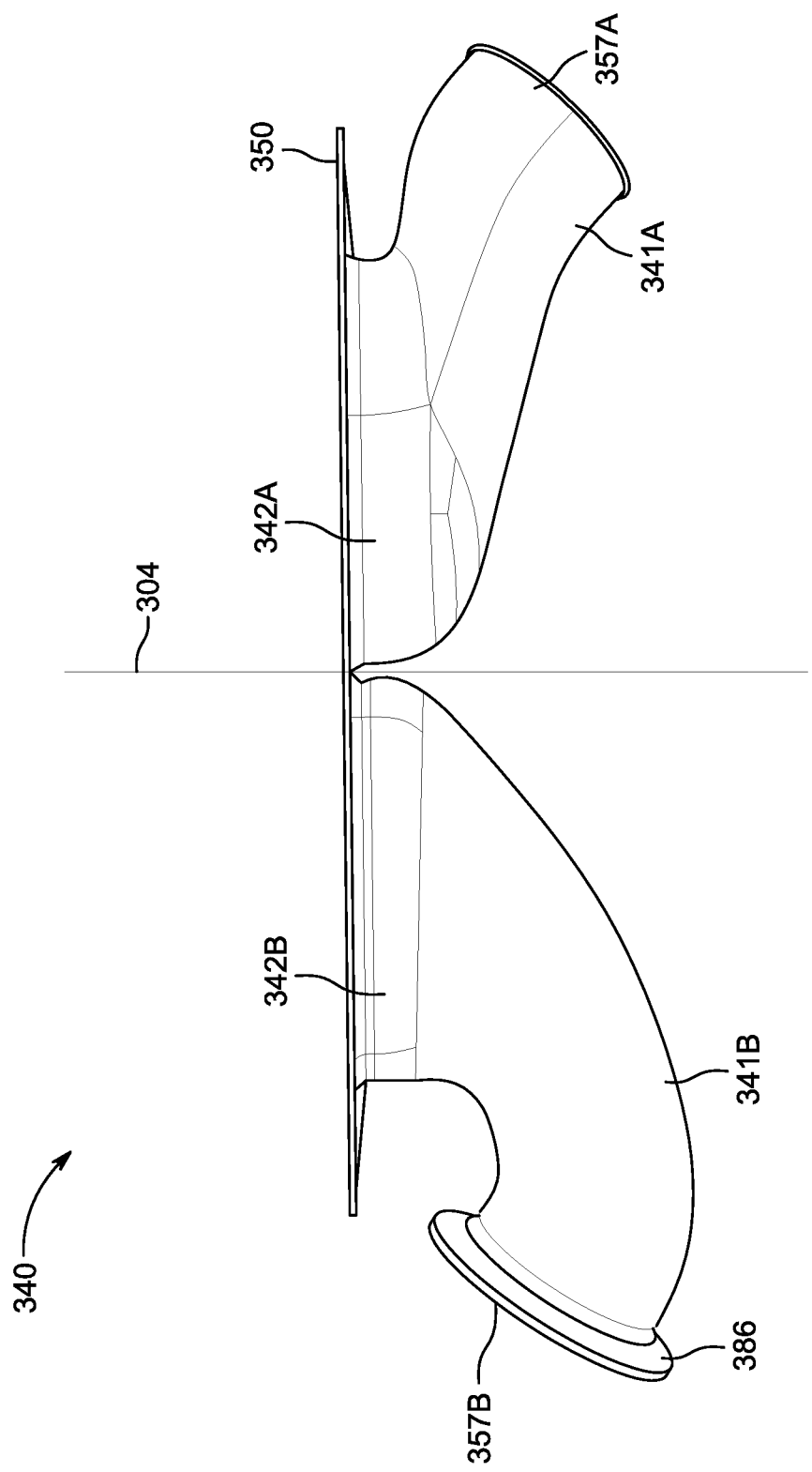
FIG. 18 is a front view of the dual channel air inlet shown in FIG. 14.

Dual channel air inlet 340 is configured to deliver air across one face (303 or 308) of intercooler 300. In the preferred embodiment, longitudinal plane 304 in FIG. 14 evenly divides air inlet 340 in plan view, and is coplanar with longitudinal plane 304 in FIG. 3 that evenly divides intercooler 300. The intercooler 300/dual channel air inlet 340 assembly in the preferred embodiment is particularly adapted to be mounted over the intake manifold of a V-8 engine, with longitudinal plane 304 passing through the crankshaft axis, and with intercooler 300 positioned over dual channel air inlet 340, so that inlet 340 delivers an upward flow of intake air through intercooler 300. For this mounting position, it is preferred that dual channel air inlet 340 be configured so that longitudinal plane 304 does not pass through either inlet pipe 341A or 341B; rather, as shown in FIG. 18 inlet pipes 341A and 341B preferably are each positioned to one side of longitudinal plane 304 (shown on edge in FIG. 18), one to one side and the other to the other side. Such side positioning allows each of inlet pipes 341A and 341B to be closer, in an appropriately configured system, to a corresponding air compressor air outlet, thereby yielding a tighter and more compact engine accessory package. For the same reason, the centerline of each of inlet pipes 341A and 341B is generally transversely oriented, so that its respective inlet aperture, 357A, 357B, is to one side of air inlet 340, and so as to receive and route air flow in a generally transverse direction into air inlet plenum 342A and 342B respectively.

The shapes of inlet pipes 341A and 341B may or may not be the same, in accordance with other engine system aspects. For example, in the case where the associated connecting systems are symmetric about longitudinal plane 304, inlet pipes 341A and 341B can have the same shapes. However, some air compressors, such as for example some turbocharger designs, are asymmetrical in shape. In such cases, the connection with such turbochargers can differ in location and orientation, depending on to which side of longitudinal plane 304 the connection is being made. To accommodate those cases, inlet pipes 341A and 341B can differ in shape, an example of which is shown in FIG. 18, so as to compactly connect to a corresponding turbocharger.

Figure 15:
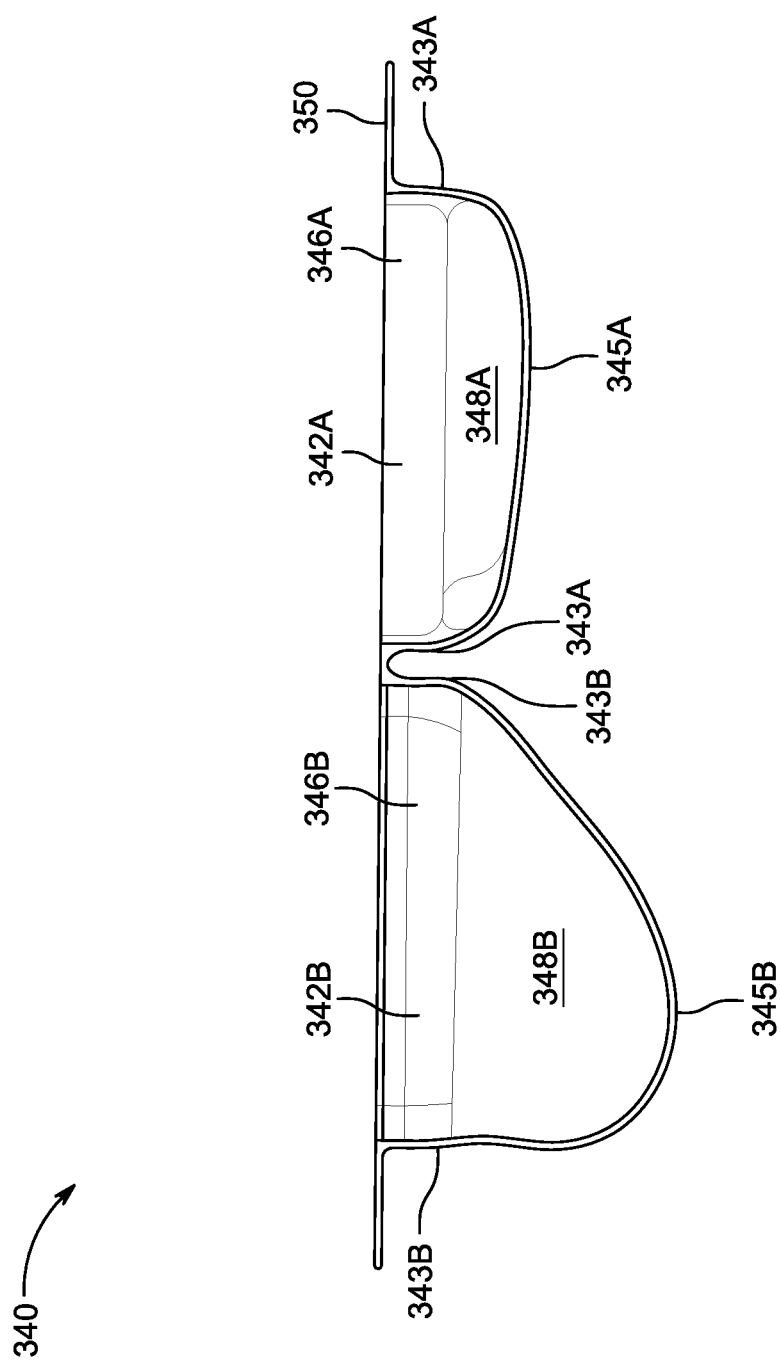
FIG. 15 is a view of the dual channel air inlet shown in FIG. 14 which is sectioned on geometrical plane 305-3B and viewed as shown by section line 3B-3B'.
Figure 16:
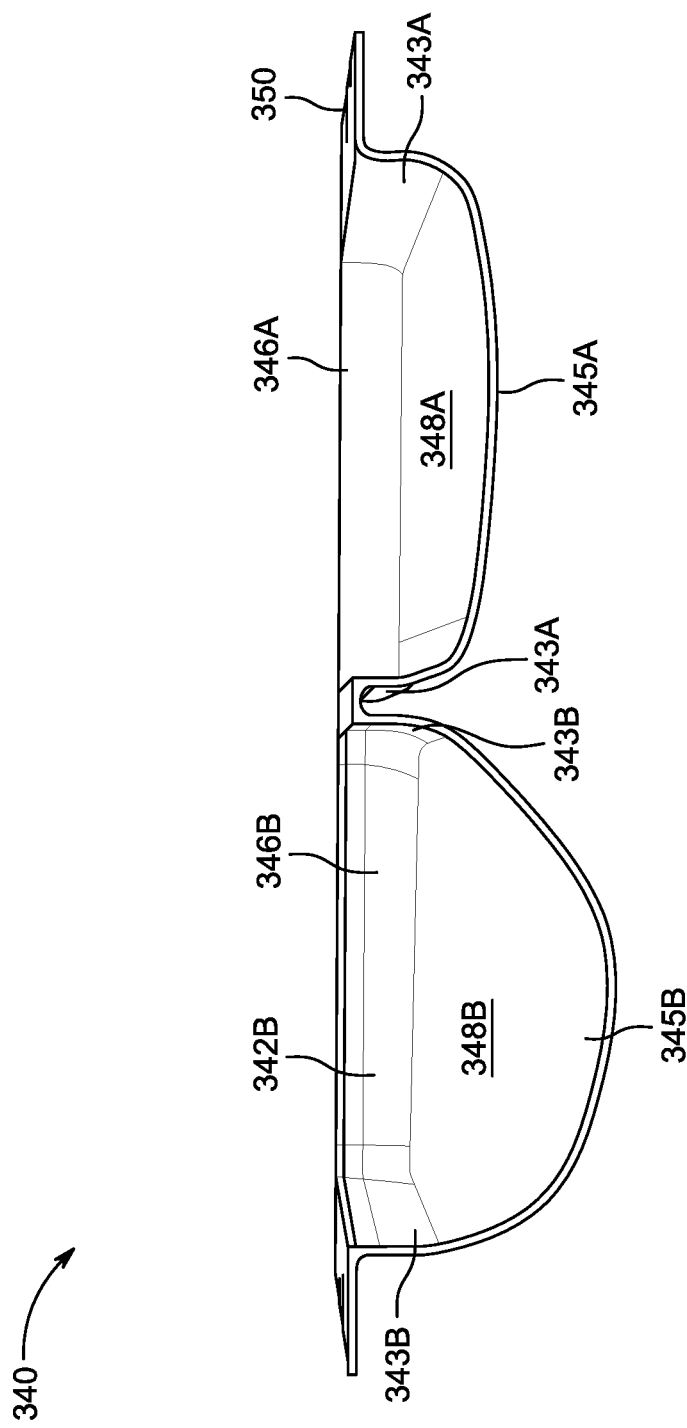
FIG. 16 is a view of the dual channel air inlet shown in FIG. 14 which is sectioned on geometrical plane 305-3C and viewed as shown by section line 3C-3C'.
Figure 17:
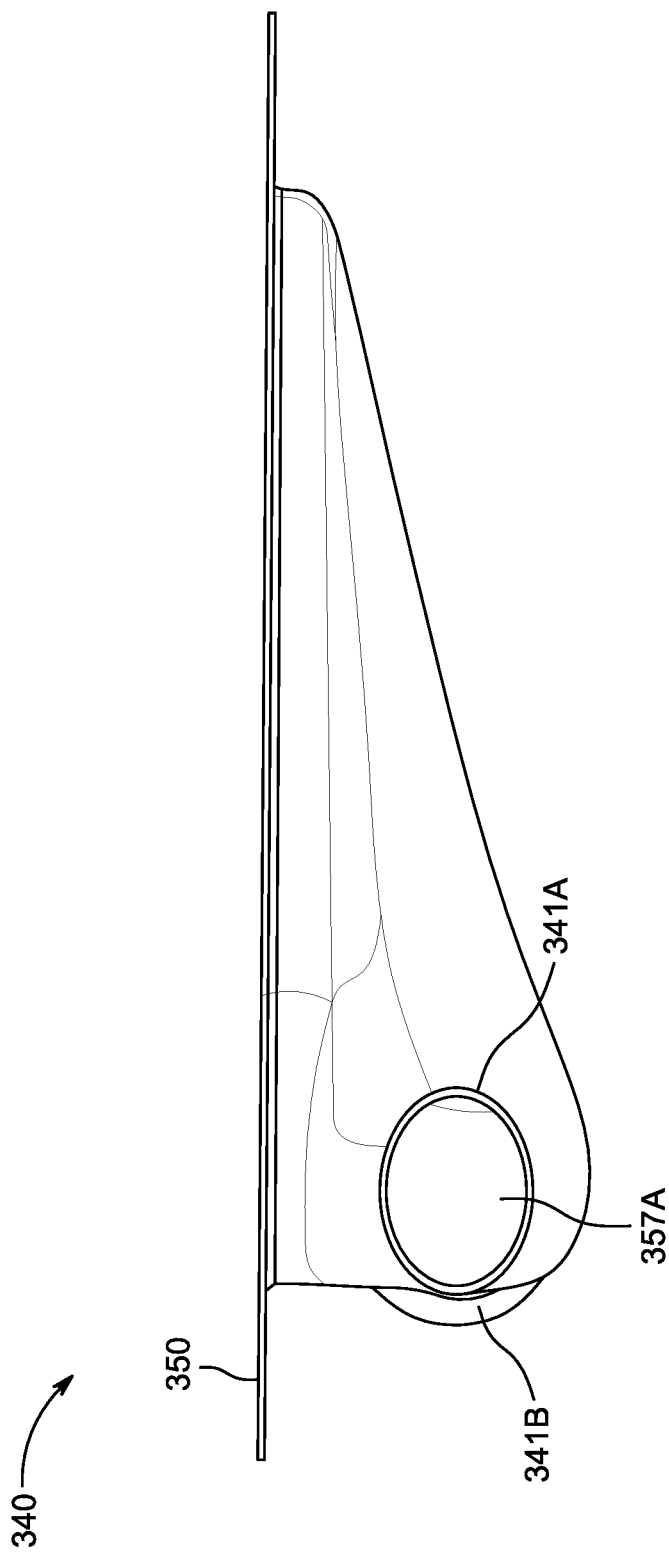
FIG. 17 is a side view of the dual channel air inlet shown in FIG. 14.

In the preferred embodiment shown in FIGS. 14-18, air inlet pipe 341A delivers air to air inlet plenum 342A, and air inlet pipe 341B delivers air to air inlet plenum 342B; the inlet plenums 342A and 342B are substantially independent. As an alternative embodiment, one large plenum 342 can be utilized instead. Each plenum 342A and 342B in the preferred embodiment is internally contoured to transition the transverse air flow from inlet pipes 341A and 341B respectively to flow across the receiving face (303 or 308) of intercooler 300. Plenum 342A comprises four sidewalls (two longitudinal sidewalls 343A, two transverse sidewalls 346A), which are joined by a glacis 345A (see FIG. 15), and plenum 342B comprises four sidewalls (two longitudinal sidewalls 343B, two transverse sidewalls 346B), which are joined by a glacis 345B (FIG. 15).

Sidewalls 343A, 346A and glacis 345A together define a first inlet plenum cavity 348A whose transverse cross-sectional area is greatest proximate to inlet pipe 341A, least distal from inlet pipe 341A, and which generally decreases between these two regions in a smooth manner, as shown in FIGS. 3A, 3B, 3C and 3D. Likewise, sidewalls 343B, 346B and glacis 345B together define a second inlet plenum cavity 348B whose transverse cross-sectional area is greatest proximate to inlet pipe 341B, least distal from inlet pipe 341B, and which generally decreases between these two regions in a smooth manner, as shown in FIGS. 14, 15, 16 and 17. The transverse cross-section of each of inlet plenum cavities 348A and 348B at any longitudinal point in the preferred embodiment will have a shape that in general can depart from symmetry, as is exemplified by FIGS. 15 and 16, since each cavity is shaped with the goal of inducing the air to be distributed across the receiving face (303 or 308) of intercooler 300 more evenly, minimizing or even eliminating areas of low air flow through the receiving face, while at the same time accommodating the particular shape and positioning of air inlet pipe 341A or 341B and more generally maintaining the intercooler 300/dual channel air inlet 340 assembly as a compact package.

It is preferred that air inlet flange 350 of dual channel air inlet 340 be identical in size and geometry to intercooler flange assembly 310, and have the same pattern of bolt apertures as intercooler flange assembly 310. Accordingly, air inlet flange 343 can be bolted to either of the two intercooler flange assemblies 310 of an intercooler 300. Additionally, dual channel air inlet 340 can be affixed to intercooler 330 in substantially the same manner as described above in connection with single channel air inlet 330, including utilizing the same inlet seal assembly 331. There can also optionally be provided an inlet seal assembly for dual channel air inlet 340 comprising two inlet seal L-components, comparable in design to seal assembly 331 comprising two L-components 335 described above, to facilitate securing single channel air inlet 340 to intercooler 300.

Dual channel air inlet 340 can be fabricated from sheet metal, such as steel or aluminum, either from a single piece of stock or from multiple pieces then assembled and fastened together, such as by riveting, brazing or welding. Alternatively, dual channel air inlet 340 can be fabricated from plastics such as HDPE, or from composite materials such as temperature-resistant fiberglass/fiberglass resin, carbon fiber, Kevlar and others.

The preferred embodiments of dual channel air inlet 340 and intercooler 300 are assembled in the same way as single channel air inlet 320. As a general matter, a user would select for use either single channel air inlet 320 or dual channel air inlet 340, depending on the design of the system for compressing inlet air prior to delivery to the intercooler 300.

Air Outlet (360)

Figure 10:
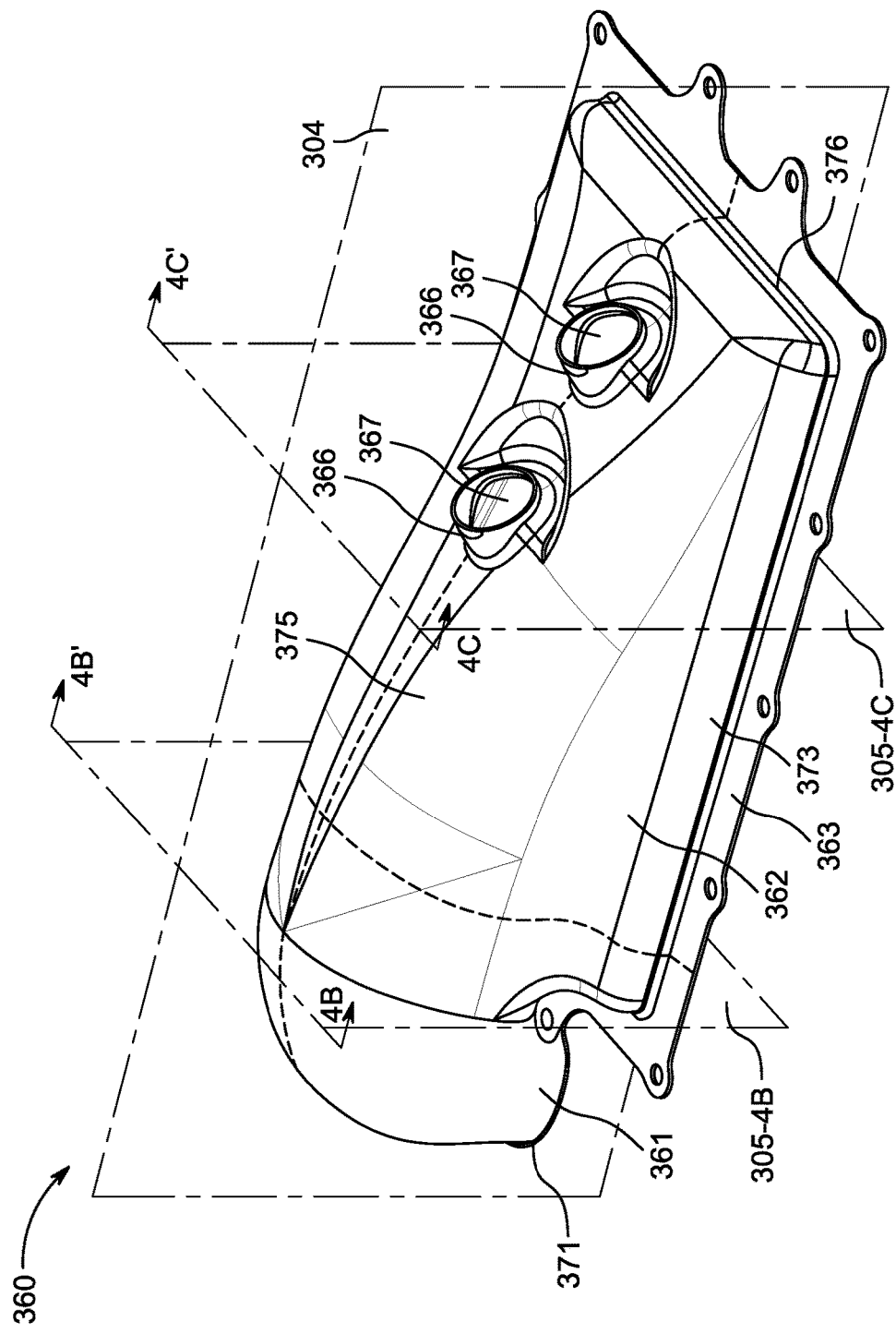
FIG. 10 is a perspective view of an air outlet utilized in the upward flow configuration of the present invention.
Figure 11:
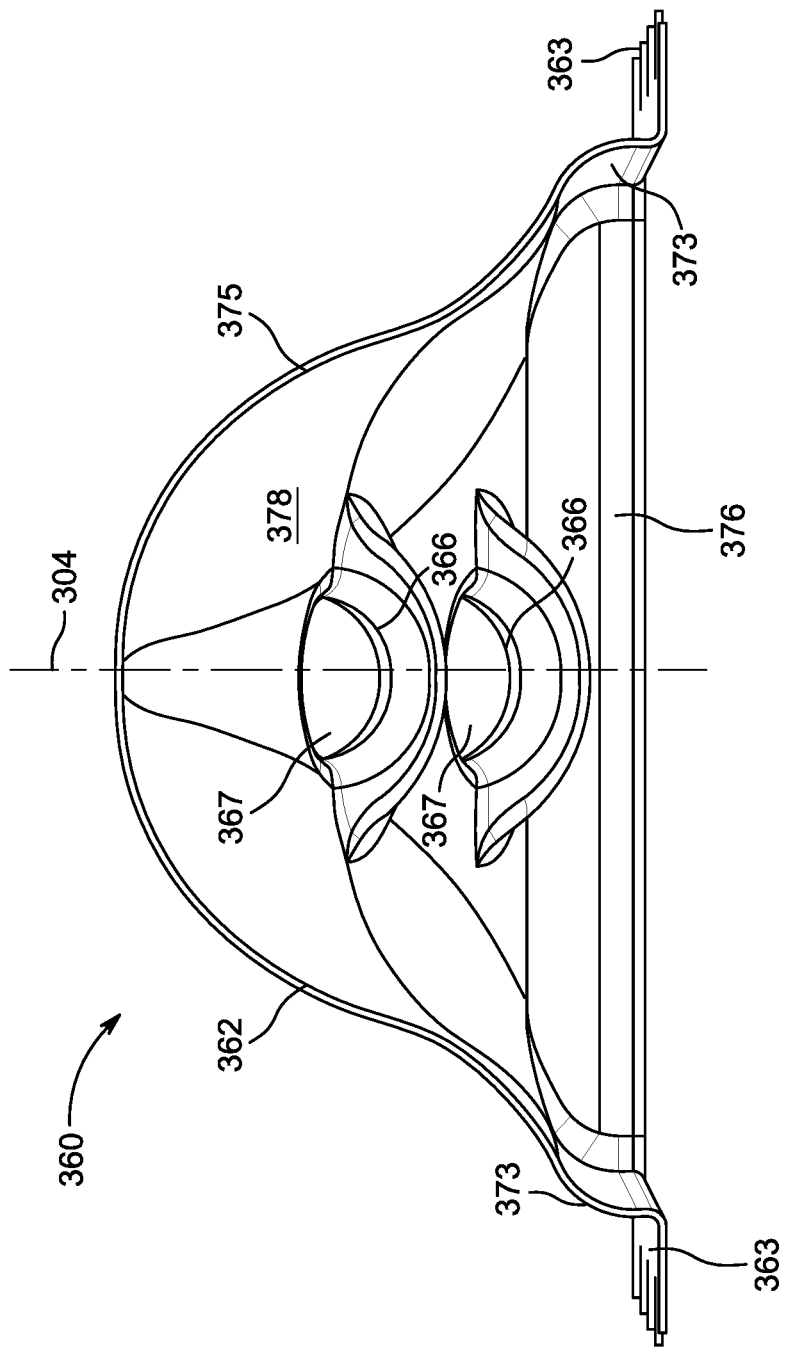
FIG. 11 is a view of the air outlet shown in FIG. 10 sectioned on geometrical plane 305-4B and viewed as shown by section line 4B-4B'.
Figure 12:
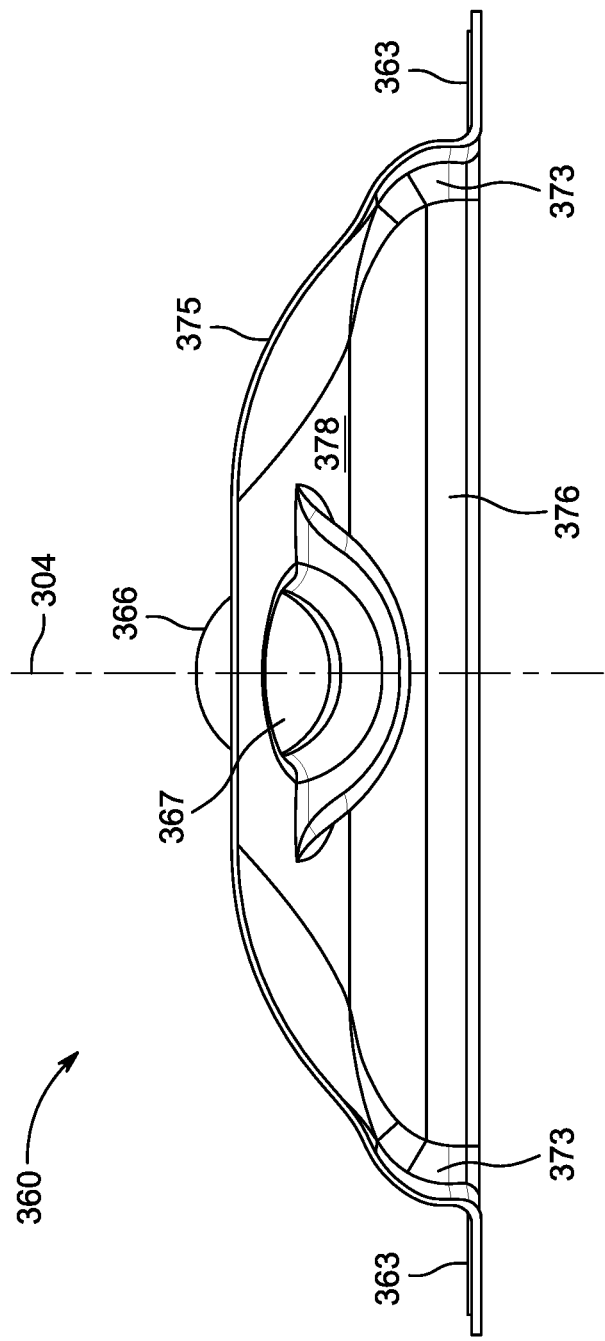
FIG. 12 is a view of the air outlet shown in FIG. 10 sectioned on geometrical plane 305-4C and viewed as shown by section line 4C-4C'.

FIG. 10 shows an air outlet 360 for delivery of cooled air from an intercooler 300 to an engine intake manifold. Air outlet 360 includes an outlet pipe 361, an air outlet plenum 362 and an air outlet flange 363. In the embodiment of FIGS. 10-12, air outlet plenum 362 includes two cylindrical connectors 366, each defining an aperture 367. Air outlet 360 is adapted to be joined to intercooler 300 to form a unitary assembly, as described below.

Air outlet 360 is configured to receive air issuing from one face (303 or 308) of intercooler 300. In the preferred embodiment, longitudinal plane 304 in FIG. 10 evenly divides air outlet pipe 361, and is coplanar with longitudinal plane 304 in FIG. 3 that evenly divides intercooler 300. The intercooler 300/air outlet 360 assembly in the preferred embodiment is particularly adapted to be mounted over the intake manifold of a V-8 engine, with longitudinal plane 304 passing approximately through the crankshaft axis 701 shown in FIG. 1, and with intercooler 300 positioned under air outlet 360, so that outlet 360 receives an upward flow of intake air from intercooler 300. In this orientation, air outlet plenum 362 is internally contoured to transition the air issuing from one of the faces (303 or 308) of intercooler 300 into outlet pipe 361, to be routed to an engine intake manifold (710 in FIG. 1) located beneath the intercooler 300/air outlet 360 assembly, and beneath the air inlet 320/340 utilized to deliver air to intercooler 300 of that assembly. The centerline of the outlet aperture 371 of outlet pipe 361 in the preferred embodiment preferably resides in longitudinal plane 304 and is oriented in the vertical direction. The mouth of outlet aperture 371 is oriented in the horizontal plane 306. These design features provide a compact connection to an engine intake manifold, particularly to a V-8 engine. There is a bend in outlet pipe 361 to redirect air received from plenum 362 to the mouth of outlet 371.

Plenum 362 comprises four sidewalls (two longitudinal sidewalls 373, two transverse sidewalls 376) joined by a carapace 375. Sidewalls 373, 376 and carapace 375 together define an outlet plenum cavity 378 whose transverse cross-sectional area is greatest proximate to outlet pipe 361, least distal from outlet pipe 361, and which smoothly decreases between these two regions, as can be seen from FIGS. 10, 11 and 12. The transverse cross-section of outlet plenum cavity 378 at any longitudinal point is generally symmetric about longitudinal plane 304, as shown in FIGS. 11 and 12.

Connectors 366 are adapted to be coupled to two blow-off valves 173, shown in FIG. 1, which are received in apertures 367, shown in FIG. 10. A blow-off valve is a spring-loaded cylindrical valve that will vent compressed air to the atmosphere above a selected pre-set pressure. The provision of two connectors 366 permit the use of two blow-off valves for increased air flow. Either or both can be capped if not utilized.

It is preferred that air outlet flange 363 be identical in size and geometry to intercooler flange assembly 310, and have the same pattern of bolt apertures as intercooler flange assembly 310. Accordingly, air outlet flange 363 can be bolted to either of the two intercooler flange assemblies 310 of an intercooler 300.

Figure 13:
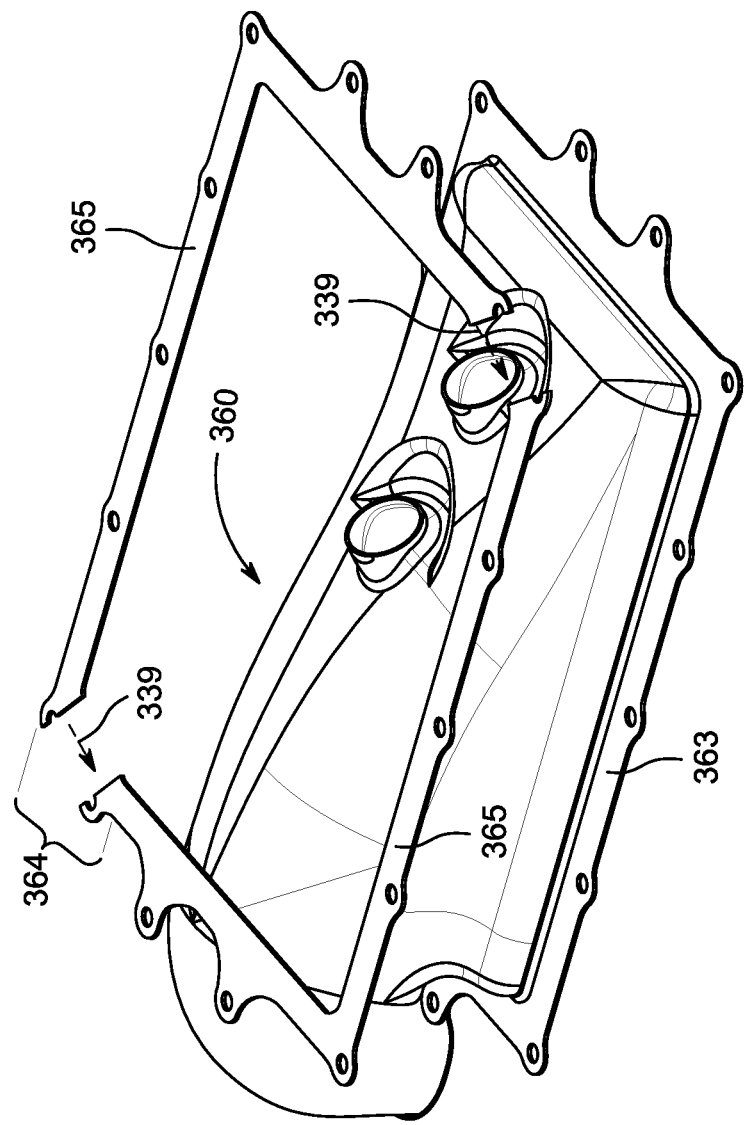
FIG. 13 is a perspective view of the air outlet shown in FIG. 10 and its outlet seal assembly.

There is optionally provided an outlet seal assembly 364 to facilitate securing air outlet 360 to intercooler 300. It is particularly preferred that each outlet seal assembly 364 includes two outlet seal L-components 365. As shown in FIG. 13, each outlet seal L-component 365 is L-shaped, and preferably is identical in size and geometry to the other outlet seal L-component 365, so that when one such L-component 365 is paired with another such L-component 365 (arrows 339 in FIG. 13), they together form an outlet seal assembly 364 in the form of a rectangular frame. Splitting the outlet seal assembly 364 into L-components 365 yields fabrication economies, as described above in regard to intercooler flange assembly 310 and intercooler flange L-components 311. Outlet seal assembly 364 preferably has the same pattern of bolt apertures as intercooler flange assemblies 310 and air outlet flange 363.

Air outlet 360 can be fabricated from sheet metal, such as steel or aluminum, either from a single piece of stock or from multiple pieces then assembled and fastened together, such as by riveting, brazing or welding. Alternatively, air outlet 360 can be fabricated from plastics such as HDPE, or from composite materials such as temperature-resistant fiberglass/fiberglass resin, carbon fiber, Kevlar and others. The outlet seal L-components 365 preferably are fabricated from aluminum plate stock or the like.

To assemble the preferred embodiments of air outlet 360 and intercooler 300, air outlet flange 363 is positioned between an outlet seal assembly 364 and one of the two intercooler flange assemblies 310; following which outlet seal assembly 364 and the selected intercooler flange assembly 310 are urged together, such as by means of nuts 314 and bolts 309, to yield a unitary air outlet/intercooler system. A resilient sealing gasket, component or structure may additionally be interposed between air outlet flange 363 and intercooler flange assembly 310 to contribute to sealing. For example, FIG. 3 shows an optionally provided sealing groove 321 on the exterior face of each intercooler flange assembly 310 for receiving an O-ring 307 and yielding a relatively air-tight seal between intercooler 300 and air outlet 360.

Upward Flow System Arrangement Options

When flange assemblies 310 and each of flanges 330, 350 and 363 are identical in size and geometry, and have the same pattern of bolt apertures as described above, the air intake system components described above provide a wide variety of upward flow configuration arrangement options. Three options are given below as non-limiting examples.

Figure 19A:
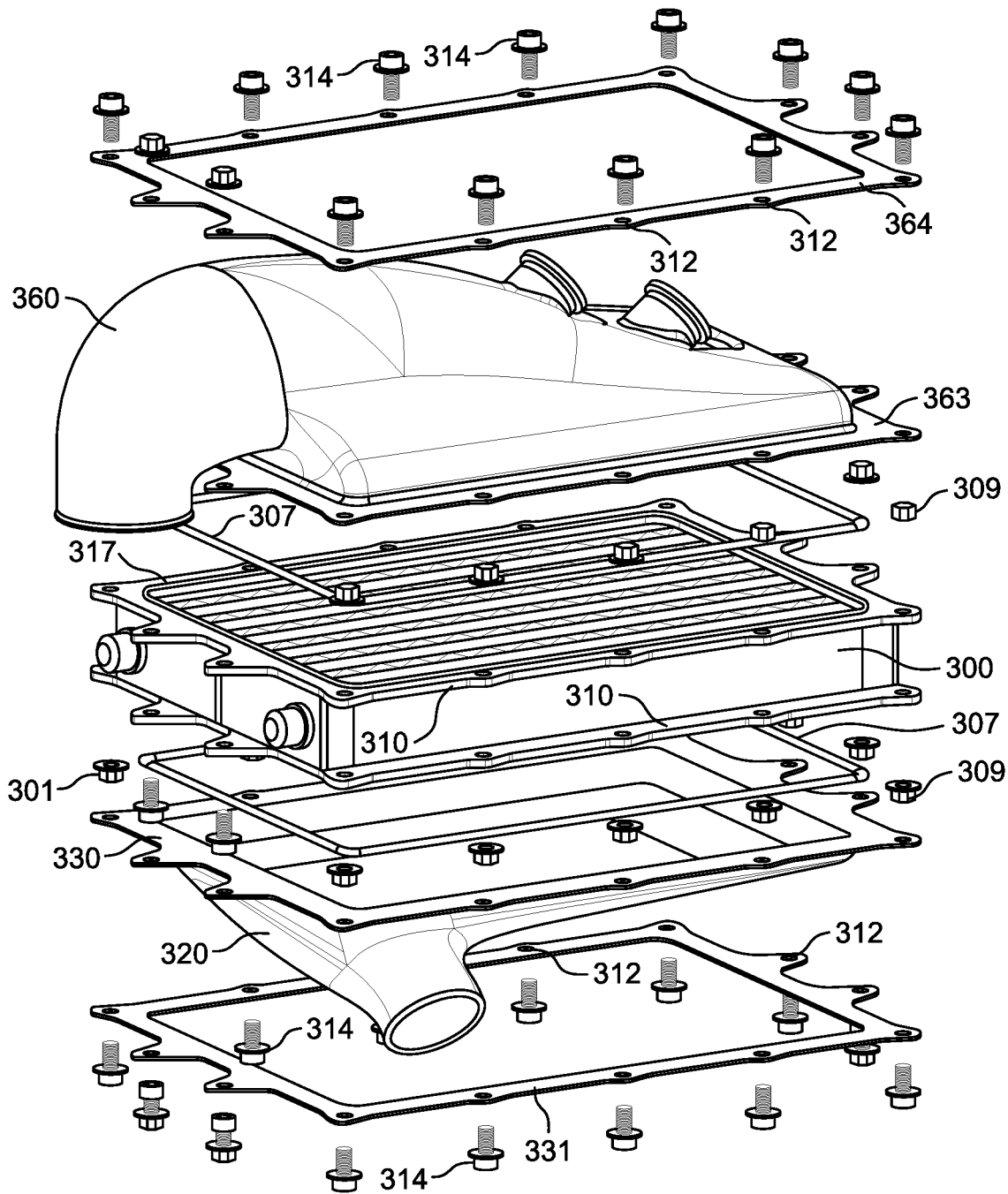
FIG. 19A is an exploded perspective view of a first upward flow air intake system arrangement option of the present invention.

As a first arrangement option, single channel air inlet 320 can be secured to one face 303 or 308 of an intercooler 300, and air outlet 360 can be secured to the other face 303 or 308 of the intercooler 300. The components utilized for this configuration are depicted in FIG. 19A in exploded form, and in assembled form in FIG. 19B. As can be seen, the single channel air inlet 320 is bolted to one flange assembly 310 of intercooler 300 using nuts 309 and bolts 314, and the air outlet 360 is separately bolted to the other flange assembly 310 of intercooler 300 using nuts 309 and bolts 314.

Figure 19B:
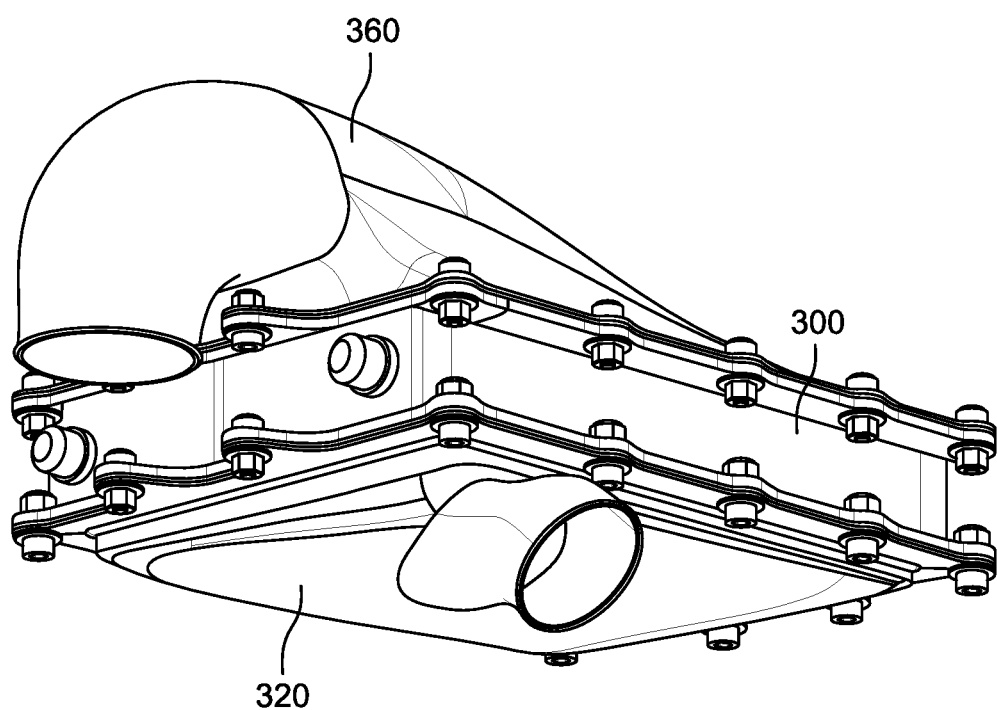
FIG. 19B is an assembled perspective view of a first upward flow air intake system arrangement option of the present invention.
Figure 19C:
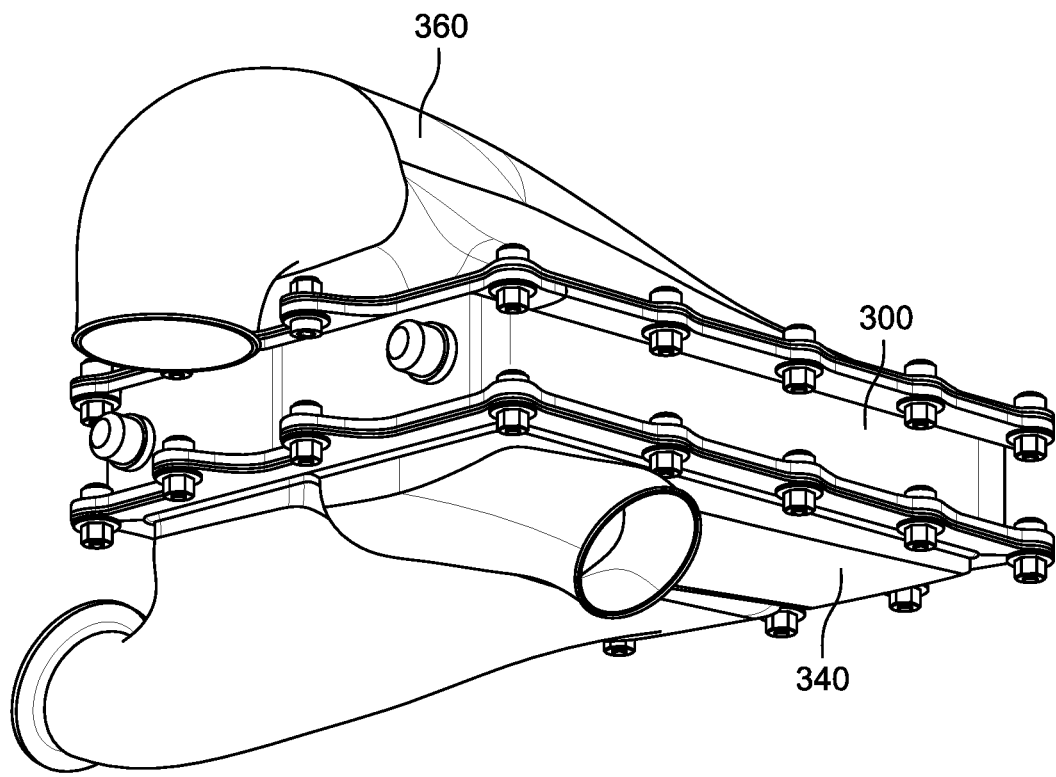
FIG. 19C is an assembled perspective view of a second upward flow air intake system arrangement option of the present invention.

As a second arrangement option, dual channel air inlet 340 can be secured to one face 303 or 308 of an intercooler 300, and air outlet 360 can be secured to the other face 303 or 308 of the intercooler 300. This configuration is shown in FIG. 19C. The components used for this system option are the same as shown in FIGS. 19A and 19B, except that the dual channel air inlet 340 replaces the single channel air inlet 320. The assembly for this second configuration is the same as shown in FIG. 19A. Since single channel air inlet 320 is only bolted to intercooler 300 and is not welded or brazed thereto, the replacement of a single channel air inlet 320 with a dual channel air inlet 340 can be accomplished relatively simply, even following installation of the first configuration in a vehicle.

Figure 19D:
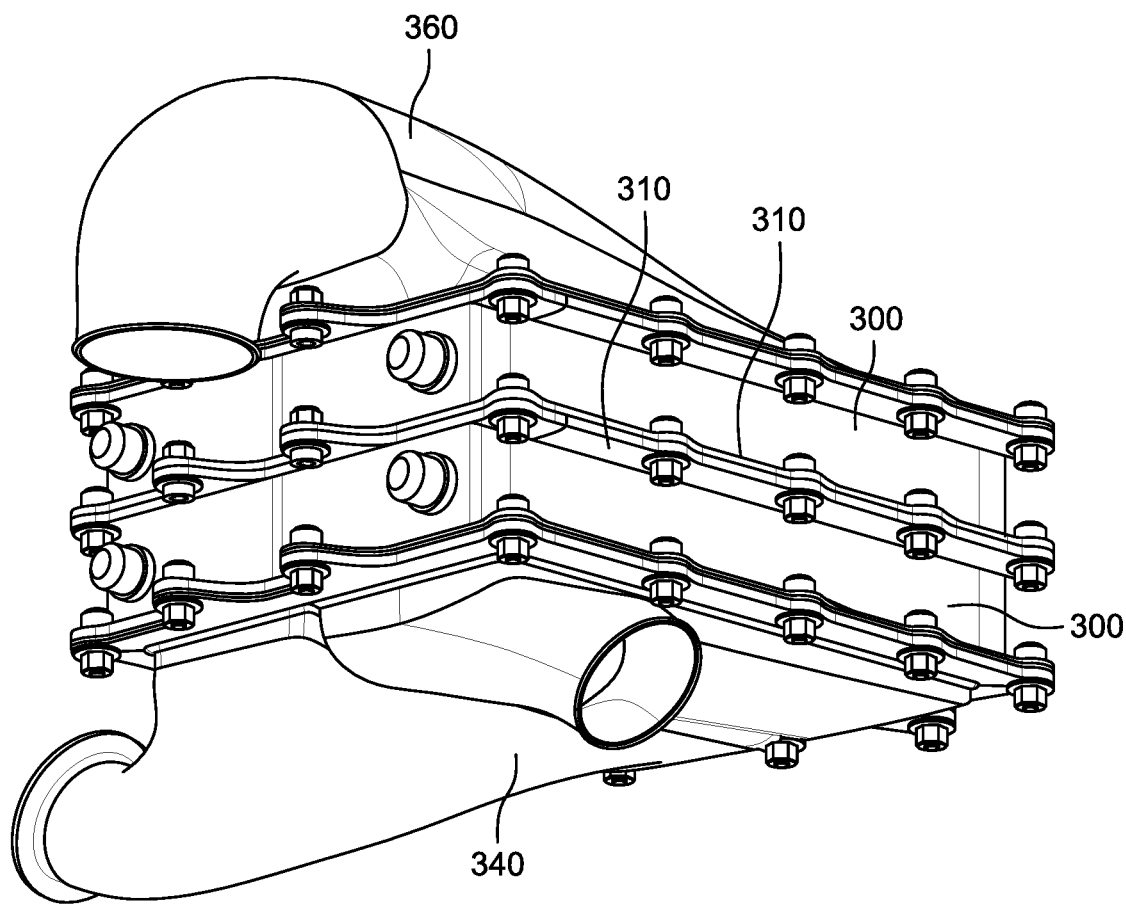
FIG. 19D is an assembled perspective view of a third upward flow air intake system arrangement option of the present invention.

As a third arrangement option, a first intercooler 300 can be secured to a second intercooler 300, and that assembly can be secured between a dual channel air inlet 340 and an air outlet 360. This configuration is shown in FIG. 19D. The components used for this configuration are the same as shown in FIG. 19C, with the addition of a second intercooler 300, which is bolted to the first intercooler 300 along adjacent flange assemblies 310. Since dual channel air inlet 340 and air outlet 360 are only bolted to a first intercooler 300 and are not welded or brazed thereto, the addition of a second intercooler 300 can be accomplished relatively simply, even following installation of the second arrangement option in a vehicle.

Because the upward flow arrangement configuration does not presume use of any particular intake manifold, the air intake system components of such a configuration are positioned and secured over the utilized intake manifold in a spaced-apart and overlying relationship using suitable brackets, such as brackets 381, 382 shown in FIG. 1. Further specifics regarding such brackets and bracket arrangements are described in U.S. patent application Ser. No. 16/168,984, entitled "Customizable Engine Air Intake/Exhaust Systems," filed on Oct. 24, 2018 and having the same inventors as the subject application. The contents of U.S. patent application Ser. No. 16/168,984 are hereby incorporated by reference as if fully set forth herein, including descriptions of the aforementioned brackets and bracket arrangements, found for example at paragraphs 154, 173 and 192, and FIGS. 13A-13B, 27A-27B and 34, among others, of U.S. patent application Ser. No. 16/168,984.

Downward Flow Configuration

The principal components of an air intake system of the present invention utilizing a downward flow (downdraft) configuration are intercooler 300, NA air inlet 410 or single channel air inlet 430 or dual channel air inlet 450 (depending on whether no turbochargers, one turbocharger or two turbochargers are used), intercooler 300, air distribution tray 720 and air passage closure tray 760. Intercooler 300 is described above, whereas single channel air inlet 410 or dual channel air inlet 420, air distribution tray 720 and air passage closure tray 760 are each described below.

NA Air Inlet (410)

Figure 20:
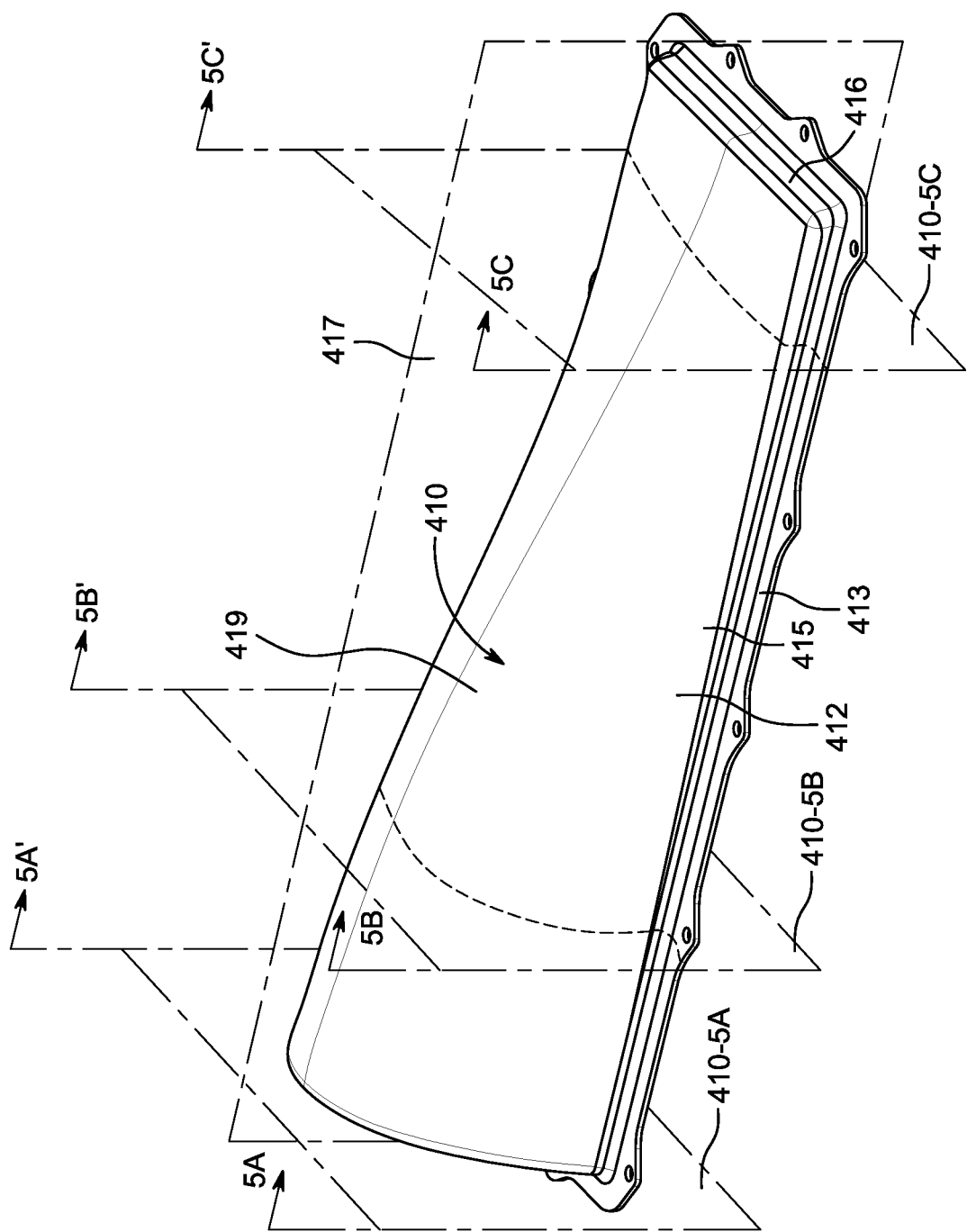
FIG. 20 is a perspective view of an air inlet utilized in the downward flow configuration of the present invention.
Figure 31A:
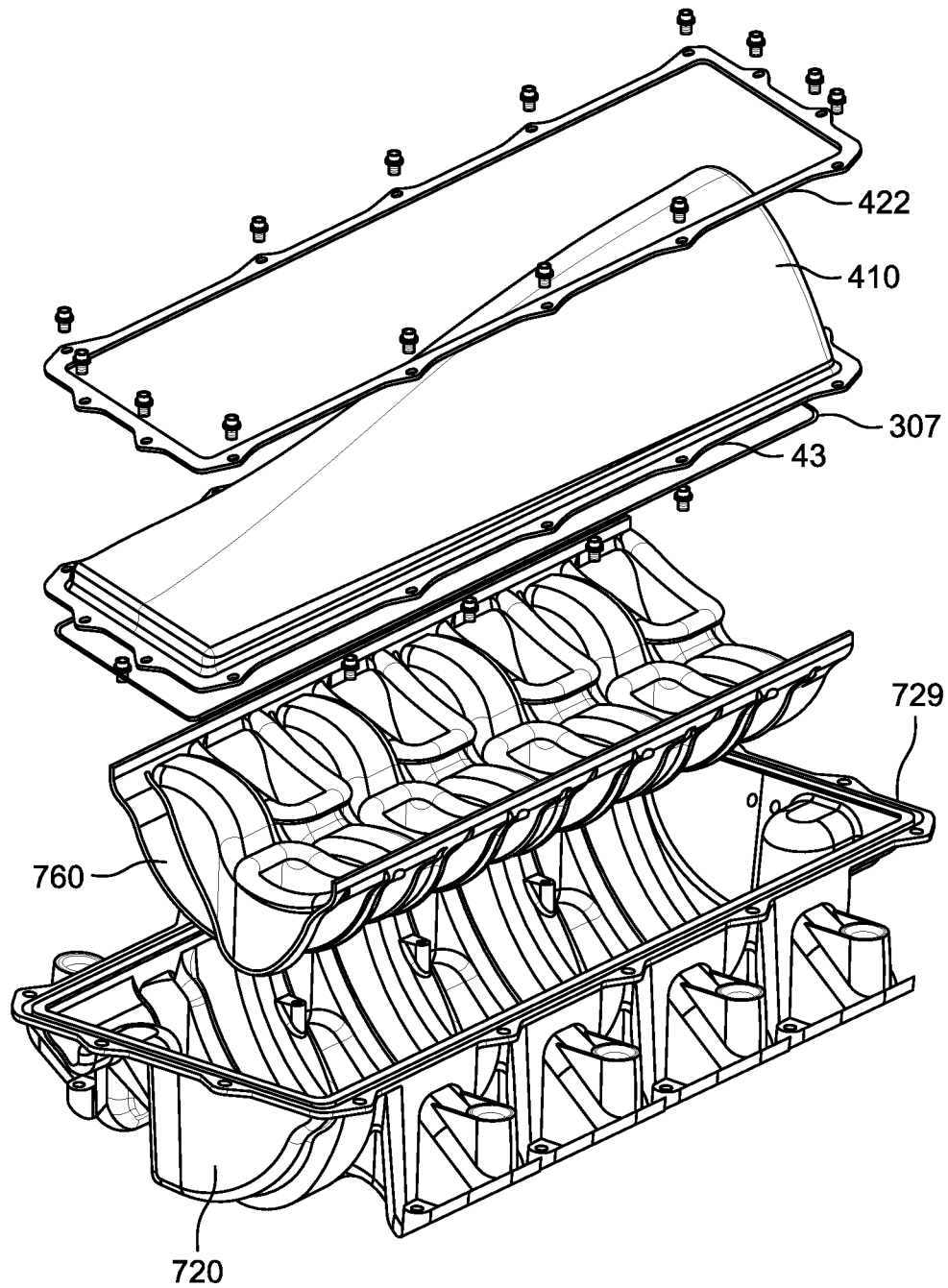
FIG. 31A is a conceptual exploded perspective view of a first downward flow air intake arrangement option of the present invention.
Figure 31B:
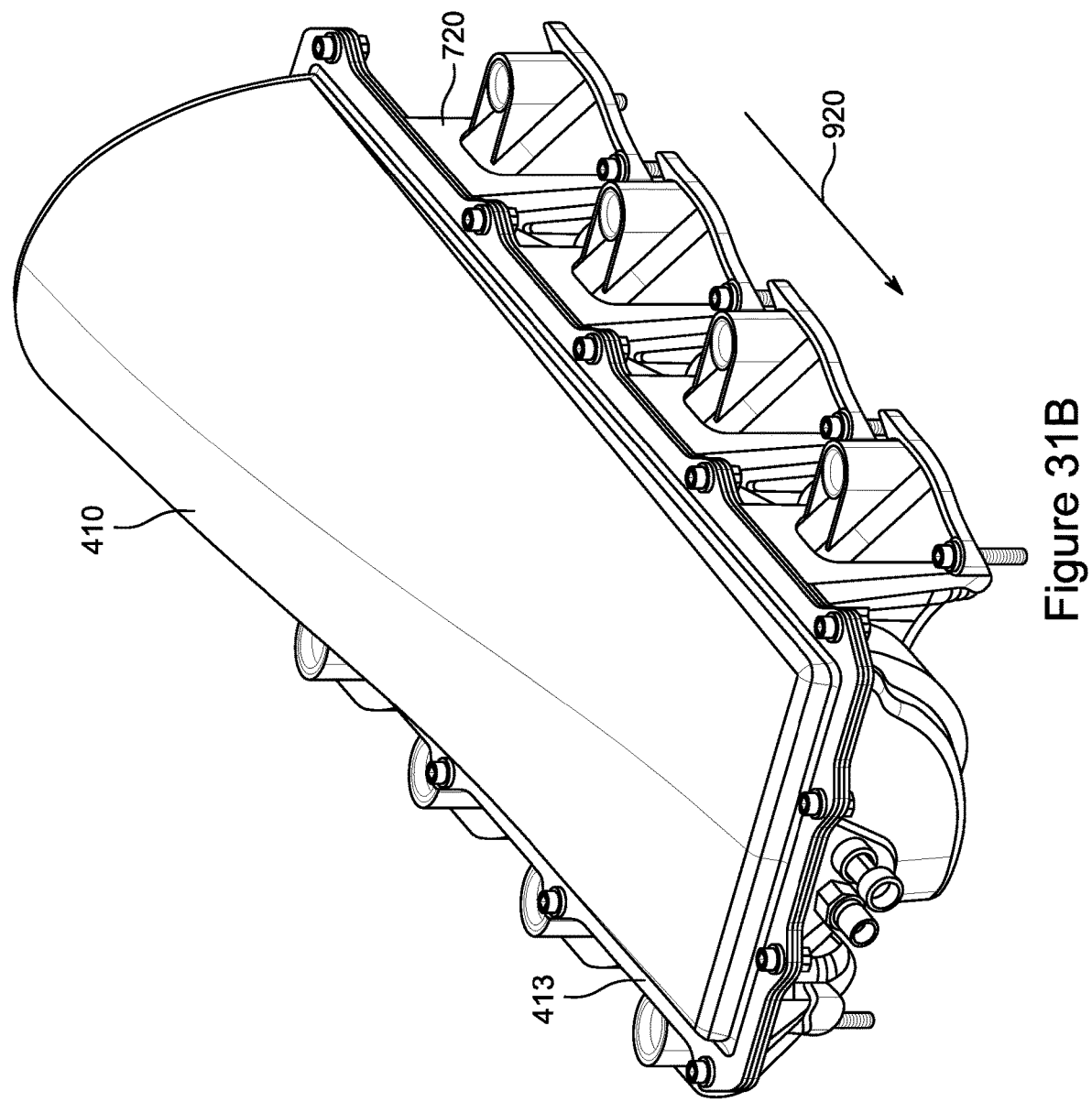
FIG. 31B is an assembled perspective view of the first downward flow air intake arrangement option of the present invention.
Figure 31C:
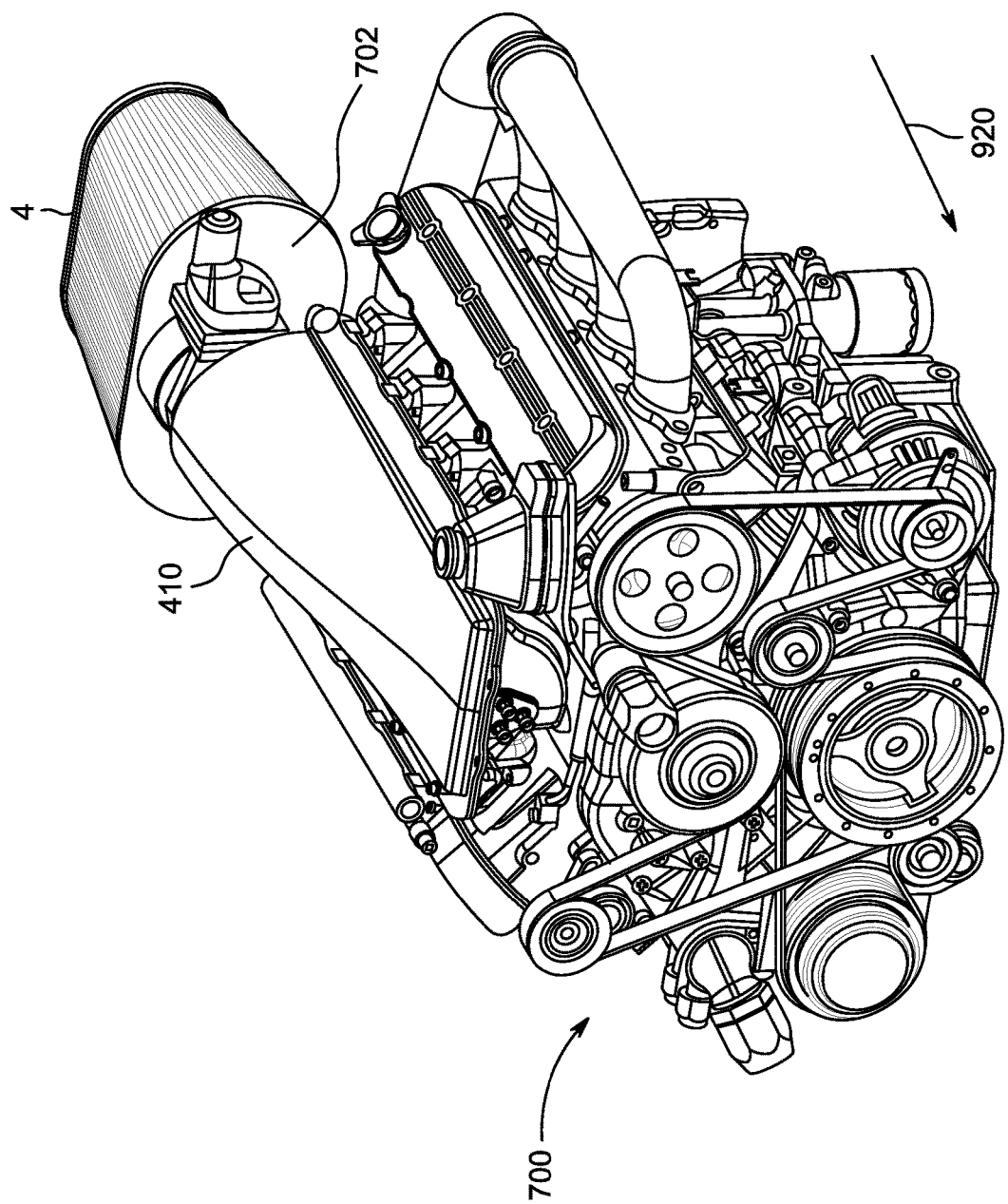
FIG. 31C is a perspective view of an engine utilizing the first downward flow air intake arrangement option of the present invention.
Figure 31D:
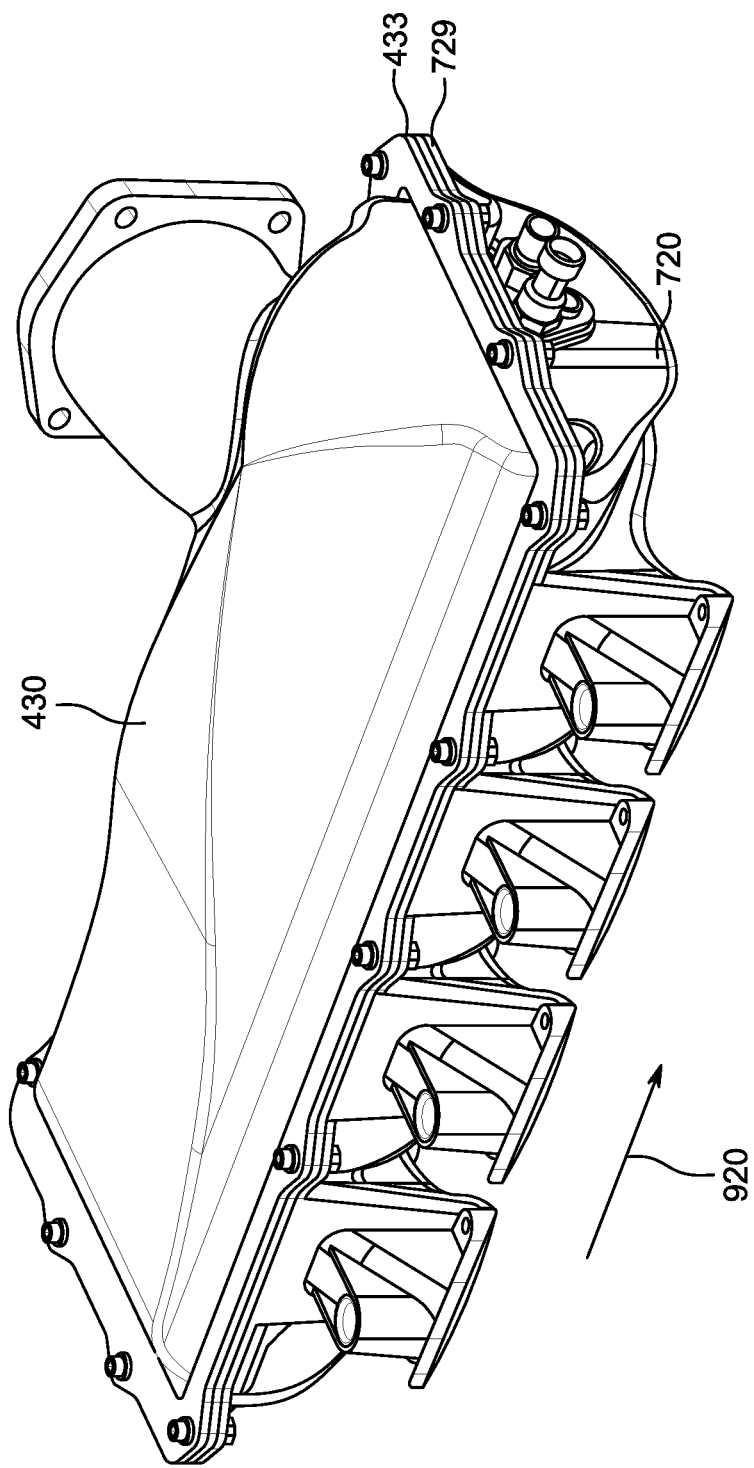
FIG. 31D is an assembled perspective view of a second downward flow air intake arrangement option of the present invention.
Figure 31E:
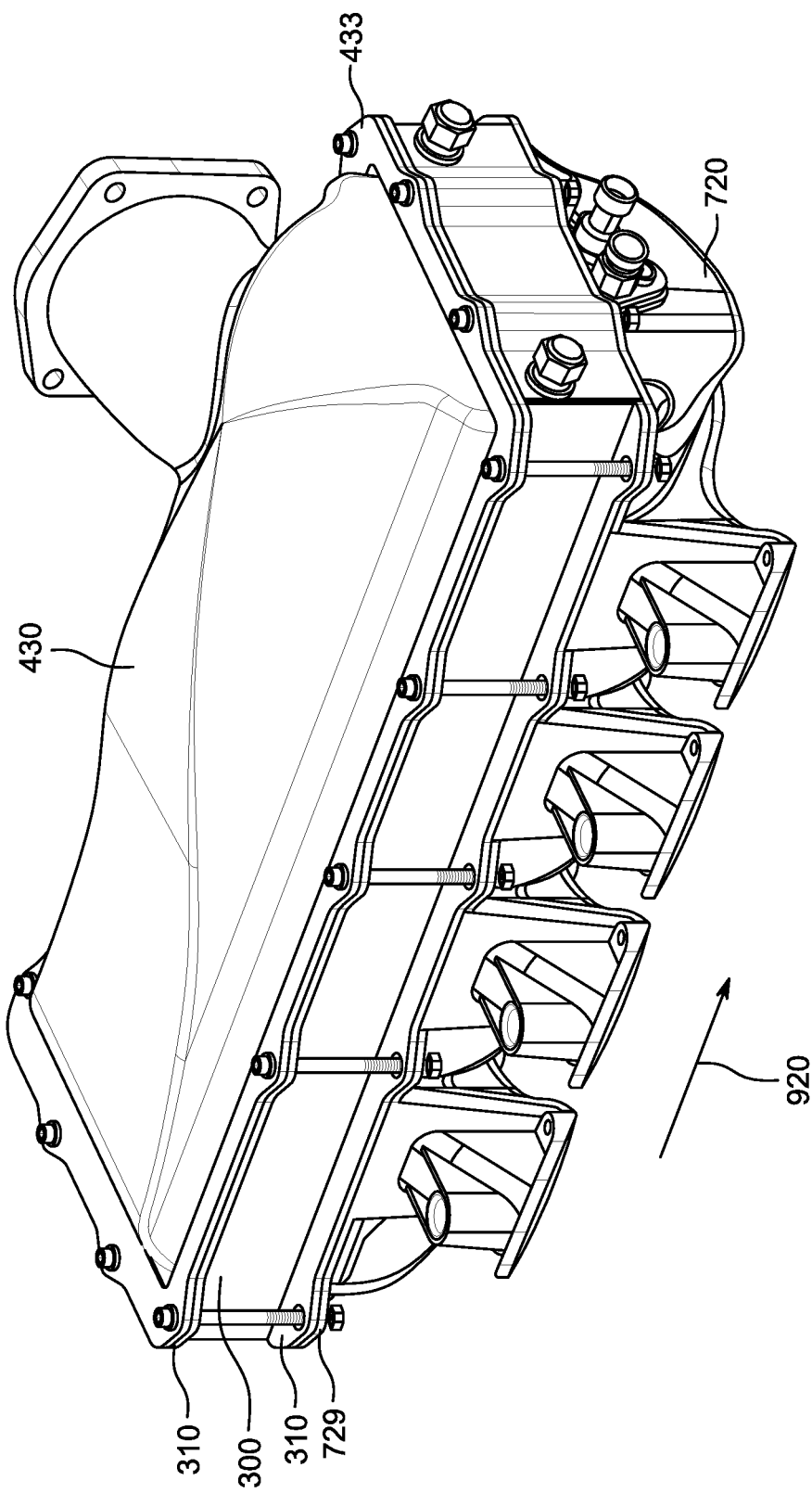
FIG. 31E is an assembled perspective view of a third downward flow air intake arrangement option of the present invention.

FIG. 20 shows an NA air inlet 410 for delivery of ambient air (uncooled and unpressurized by mechanical means, apart from ram air) to air distribution tray 720. Air inlet 410 includes an inlet aperture 414, an air inlet plenum 412 and an NA air inlet flange 413. In use, the inlet aperture 414 receives air from the ambient atmosphere through a filter arrangement 4 and a throttle assembly 702, as shown in FIG. 31C.

Figure 21:
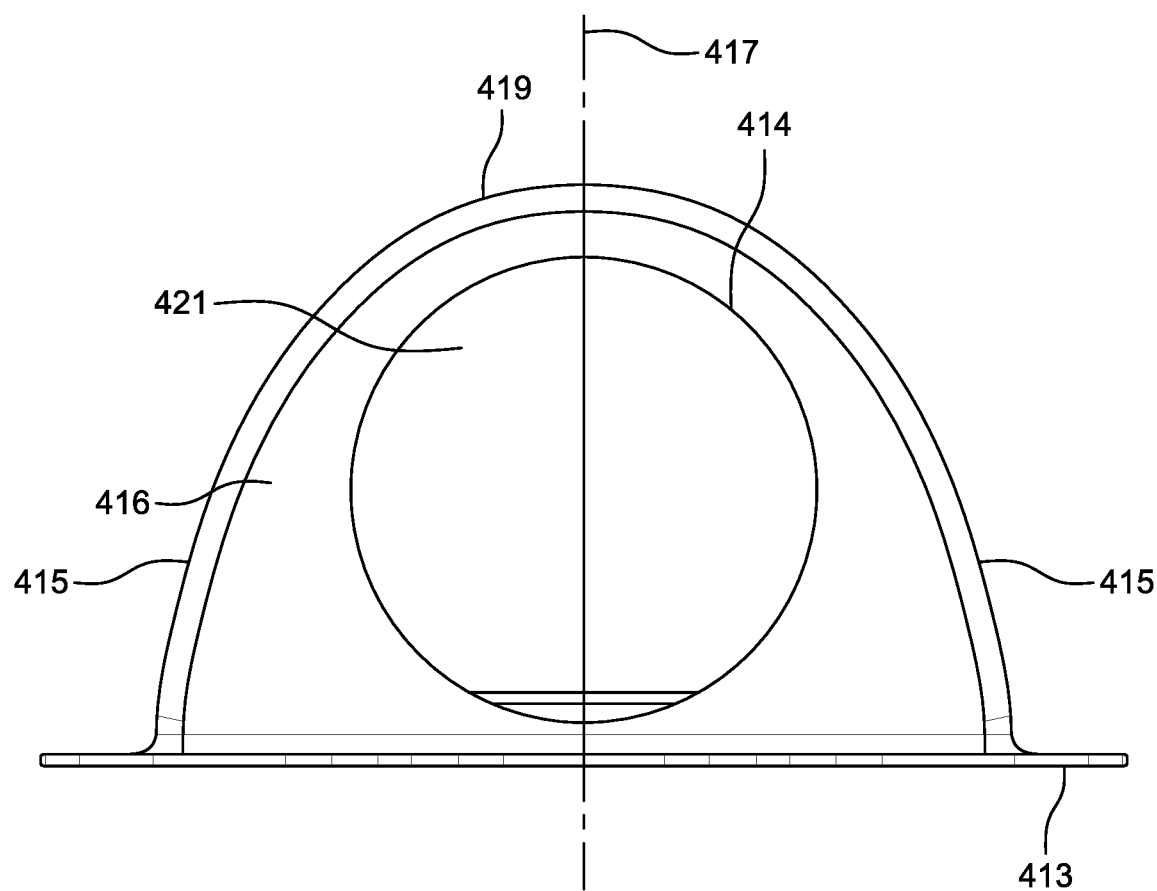
FIG. 21 is an end view of the air outlet shown in FIG. 20 on geometrical plane 410-5A and viewed as shown by section line 5A-5A'.

In the preferred embodiment, longitudinal plane 417 in FIG. 21 evenly divides inlet aperture 414. The NA air inlet 410/intercooler 300 assembly in the preferred embodiment is particularly adapted to be mounted over a V-8 engine, with longitudinal plane 417 passing through crankshaft centerline 701. Air inlet plenum 412 is internally contoured to smoothly transition the air received through aperture 414 and deliver it downward to air distribution tray 720.

Figure 22:
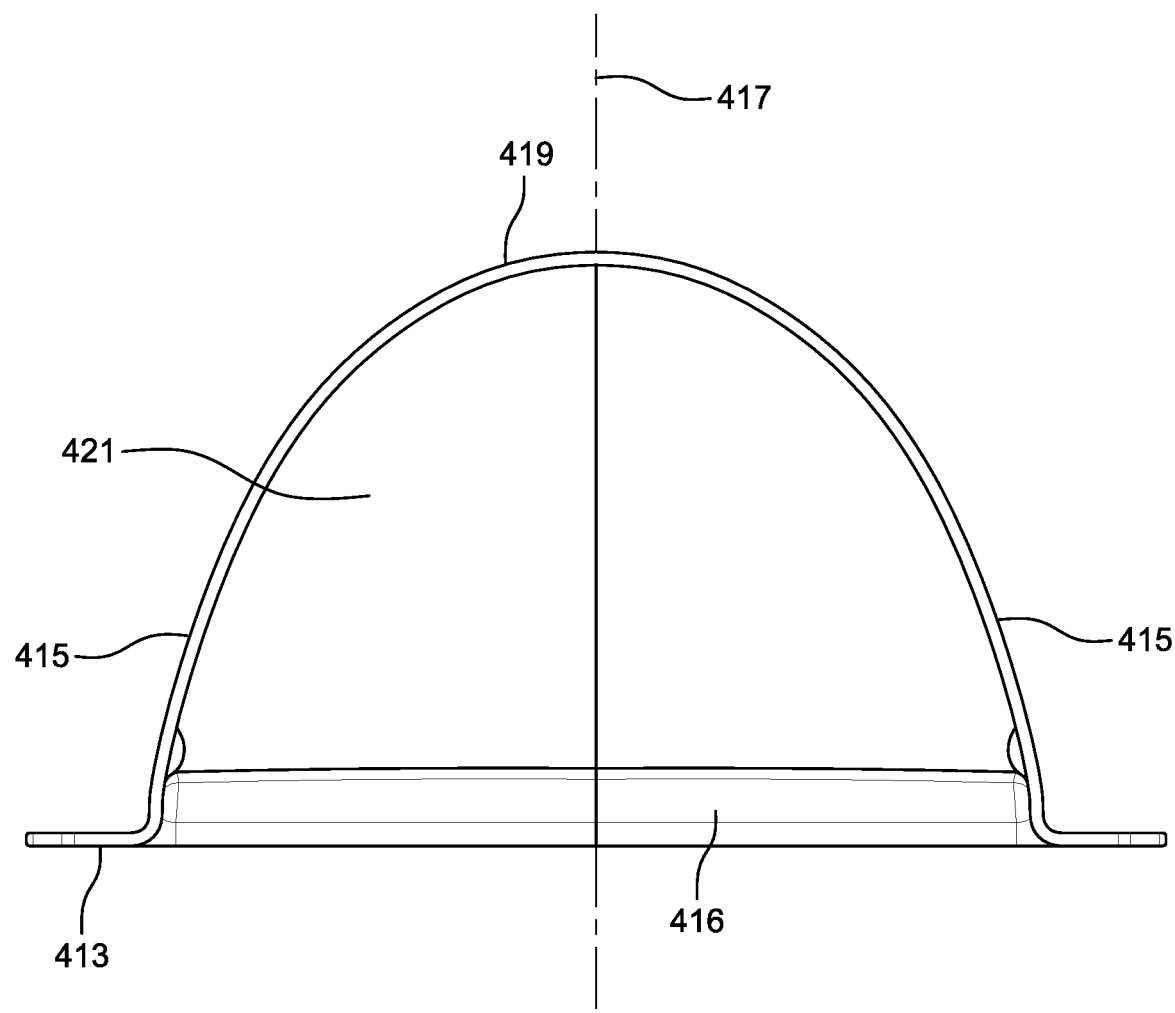
FIG. 22 is a view of the air outlet shown in FIG. 20 sectioned on geometrical plane 410-5B and viewed as shown by section line 5B-5B'.
Figure 23:
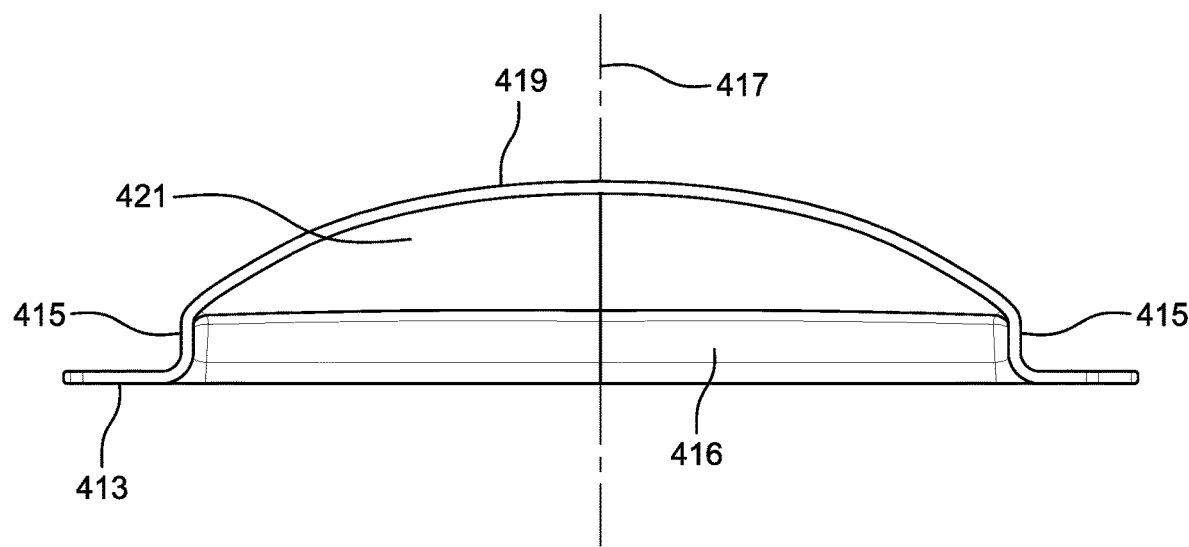
FIG. 23 is a view of the air outlet shown in FIG. 20 sectioned on geometrical plane 410-5C and viewed as shown by section line 5C-5C'.

Plenum 412 comprises four sidewalls (two longitudinal sidewalls 415, two transverse sidewalls 416) joined by a carapace 419. Sidewalls 415, 416 and 419 together define an inlet plenum cavity 421 whose transverse cross-sectional area is greatest proximate to inlet aperture 414, least distal from inlet aperture 414, and which smoothly decreases between these two regions, as can be seen from FIGS. 21, 22 and 23. The transverse cross-section of inlet plenum cavity 421 at any longitudinal point is generally symmetric about longitudinal plane 417, as shown in FIGS. 22 and 23.

Figure 24:
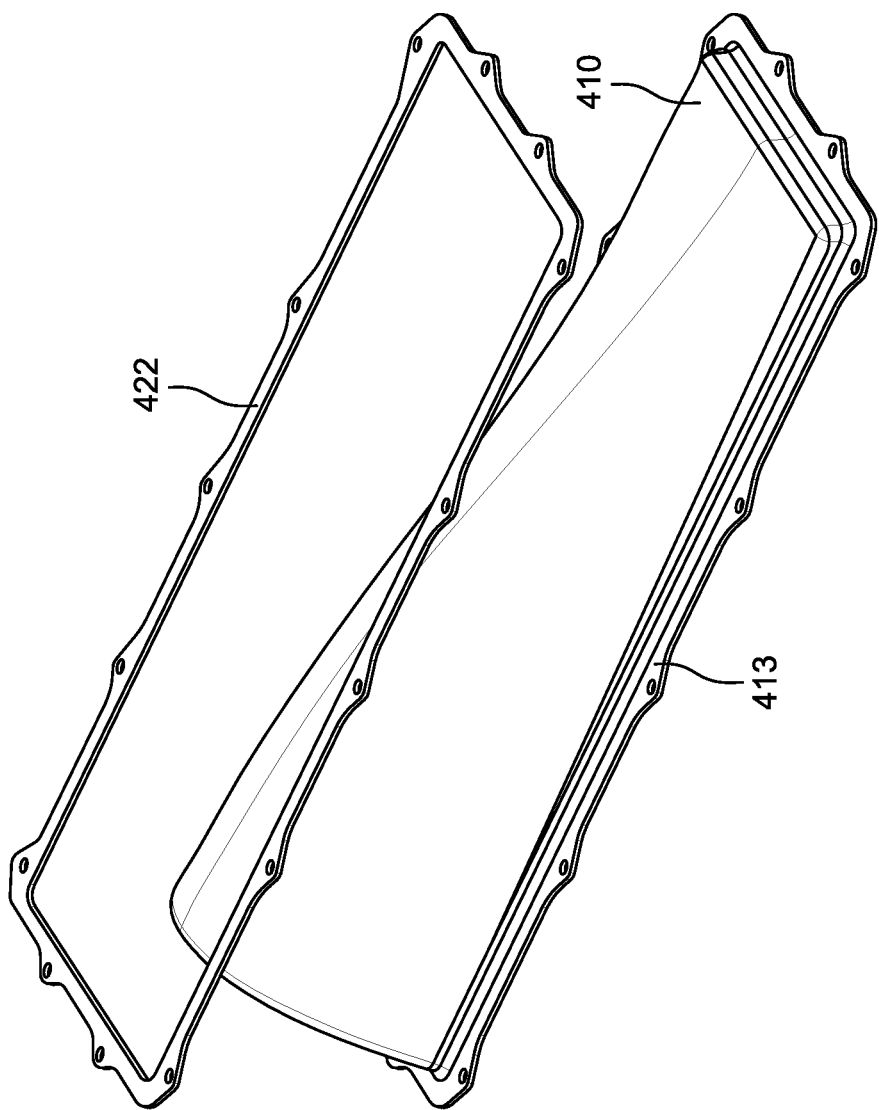
FIG. 24 is a perspective view of the air inlet shown in FIG. 20 and its seal assembly.

As described below, it is preferred that NA air inlet flange 413 be identical in size and geometry to the of air distribution tray flange 729, and have the same pattern of bolt apertures as air distribution tray flange 729, to permit it to be bolted to that flange 729. There is optionally provided an inlet seal 422 to facilitate securing NA air inlet 410 to air distribution tray 720. As depicted in FIG. 24, seal 422 is of single piece construction. Alternatively, inlet seal 422 can be an assembly formed by positioning together two inlet seal L-components 423, where each inlet seal L-component 423 is L-shaped, substantively similar to seal assembly 365 in FIG. 13, and preferably identical in size and geometry to the other inlet seal L-component 423, so that when one such L-component 423 is paired with another such L-component 423, they together form an inlet seal assembly 422 in the form of a rectangular frame having an appearance as shown in FIG. 24.

NA air inlet 410 can be fabricated from sheet metal, such as steel or aluminum, either from a single piece of stock or from multiple pieces then assembled and fastened together, such as by riveting, brazing or welding. Alternatively, air inlet 410 can be fabricated from plastics such as HDPE, or from composite materials such as temperature-resistant fiberglass/fiberglass resin, carbon fiber, Kevlar and others. The inlet seal L-components 423 preferably are fabricated from aluminum plate stock or the like.

To assemble the preferred embodiments of NA air inlet 410 and air distribution tray 720, NA air inlet flange 413 is positioned between an inlet seal assembly 422 and air distribution tray flange 729; following which NA air inlet 410 and air distribution tray 720 are urged together, such as by means of nuts and bolts inserted through bolt apertures in their flanges 413 and 729. As described below, a resilient sealing gasket, component or structure may additionally be interposed between flanges 413 and 729 to contribute to sealing.

Single Channel Air Inlet (430)

Single channel air inlet 430 is for delivery of compressed air through one channel, conduit or pipe, from a turbocharger either to air distribution tray 720 (if no intercooling is used) or to an intercooler 300 (if intercooling is used). If no intercooling is used, single channel air inlet 430 is positioned on top of air distribution tray 720 and secured as by bolts in that position, for delivery of air downward through distribution tray 720. If intercooling is used, single channel air inlet 430 is positioned on top of an intercooler 300 and secured as by bolts in that position, for delivery of compressed air downward through intercooler 300.

The design single channel air inlet 430 generally can be in accordance with the design of single channel air inlet 340, accommodating as necessary the piping run from the compressed air outlet of a turbocharger 160, and providing a throttle body mounting flange at the inlet aperture of the inlet pipe, for mounting a throttle assembly 702 between the turbocharger 160 and the inlet pipe.

Single channel air inlet 430 is provided with a flange 433 (comparable to air inlet flange 330 of single channel air inlet 320), to facilitate securing inlet 430 as described above. It is preferred that this flange of single channel air inlet 430 be identical in size and geometry to intercooler flange assemblies 310, and have the same pattern of bolt apertures as intercooler flange assemblies 310. There can also optionally be provided an inlet seal or seal assembly 432 comparable to seal or seal assembly 422 described above, to facilitate securing single channel air inlet 430 to air distribution tray 720 or intercooler 300.

Single channel air inlet 430 can be fabricated from sheet metal, such as steel or aluminum, either from a single piece of stock or from multiple pieces then assembled and fastened together, such as by riveting, brazing or welding. Alternatively, air inlet 430 can be fabricated from plastics such as HDPE, or from composite materials such as temperature-resistant fiberglass/fiberglass resin, carbon fiber, Kevlar and others.

Dual Channel Air Inlet (450)

Engine 700 depicted in FIG. 2 is provided with a dual channel inlet 450, for delivery of compressed air through two channels, conduits or pipes, from two turbochargers 160 to intercooler 300. In one embodiment, dual channel inlet 450 generally can be in accordance with the two plenum design of dual channel air inlet 340; alternatively, a single plenum can be used. Utilization of either embodiment can accommodate as necessary the piping runs from the compressed air outlets of turbochargers 160 and also provide at the inlet aperture of each inlet pipe to dual channel air inlet 450 a throttle body mounting flange 158, shown for example in FIG. 2, for mounting a throttle assembly 702 to the inlet pipe. As shown in the embodiment of FIG. 2, blow-off valves 173 have been interposed in the inlet pipes leading to dual channel air inlet 340.

Dual channel air inlet 450 is positioned on top of intercooler 300 and secured as by bolts in that position, for delivery of air downward through intercooler 300. Given the higher air pressures that two turbochargers may deliver, dual channel air inlet 450 would generally be used in conjunction with an intercooler.

Dual channel air inlet 450 is provided with a flange 453 (comparable to air inlet flange 350 of dual channel air inlet 340) to facilitate securing inlet 450 to intercooler 300. It is preferred that this flange of dual channel air inlet 450 be identical in size and geometry to intercooler flange assemblies 310, and have the same pattern of bolt apertures as intercooler flange assemblies 310. There can also optionally be provided an inlet seal or seal assembly 452 for dual channel air inlet 450, comparable to seal or seal assembly 422 described above, to facilitate securing dual channel air inlet 450 to intercooler 300.

Dual channel air inlet 450 can be fabricated from sheet metal, such as steel or aluminum, either from a single piece of stock or from multiple pieces then assembled and fastened together, such as by riveting, brazing or welding. Alternatively, air inlet 450 can be fabricated from plastics such as HDPE, or from composite materials such as temperature-resistant fiberglass/fiberglass resin, carbon fiber, Kevlar and others.

Air Distribution Tray (720)

Figure 25A:
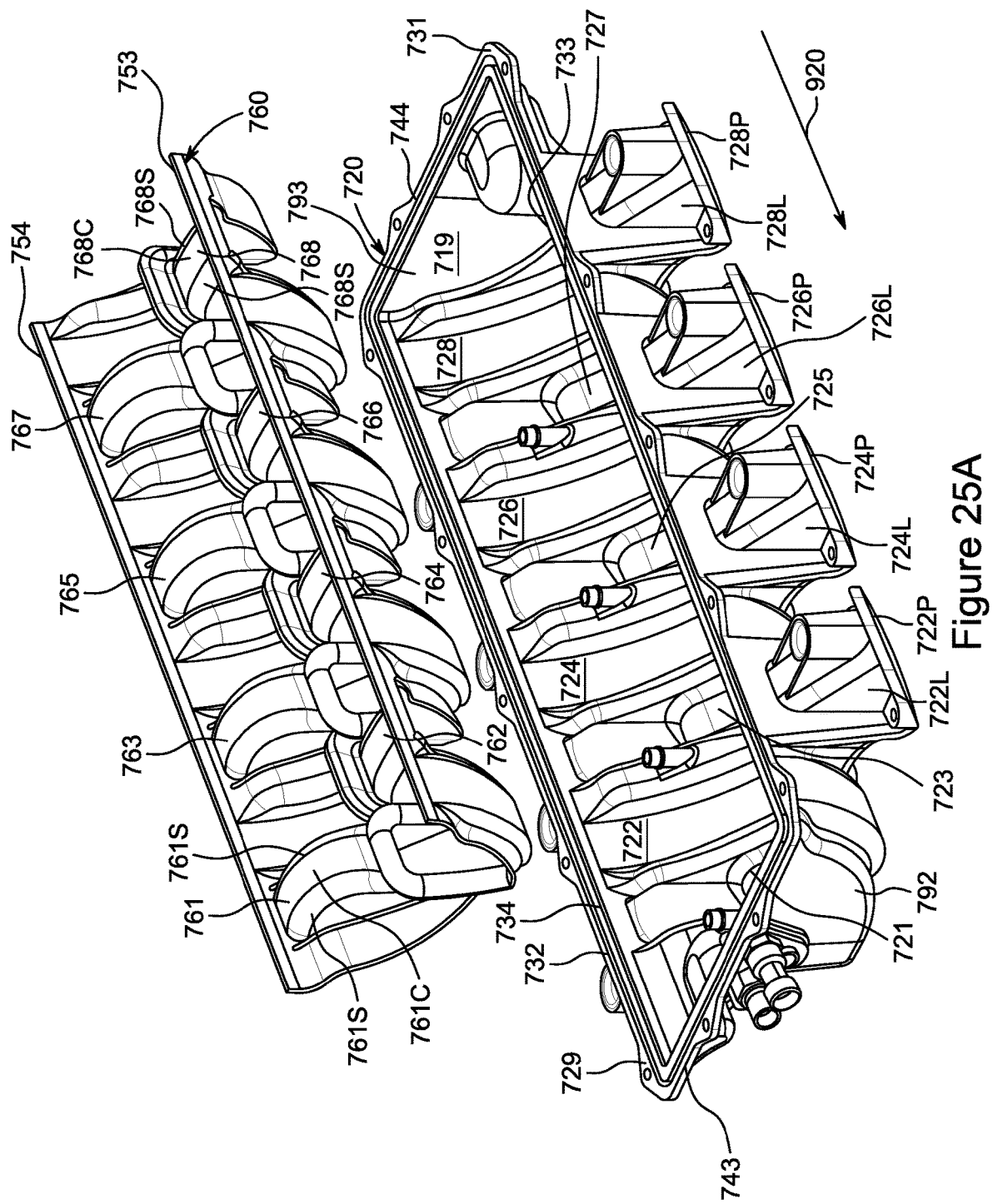
FIG. 25A is an exploded perspective view of an air distribution tray and air passage closure tray utilized in the downward flow configuration of the present invention.
Figure 25B:
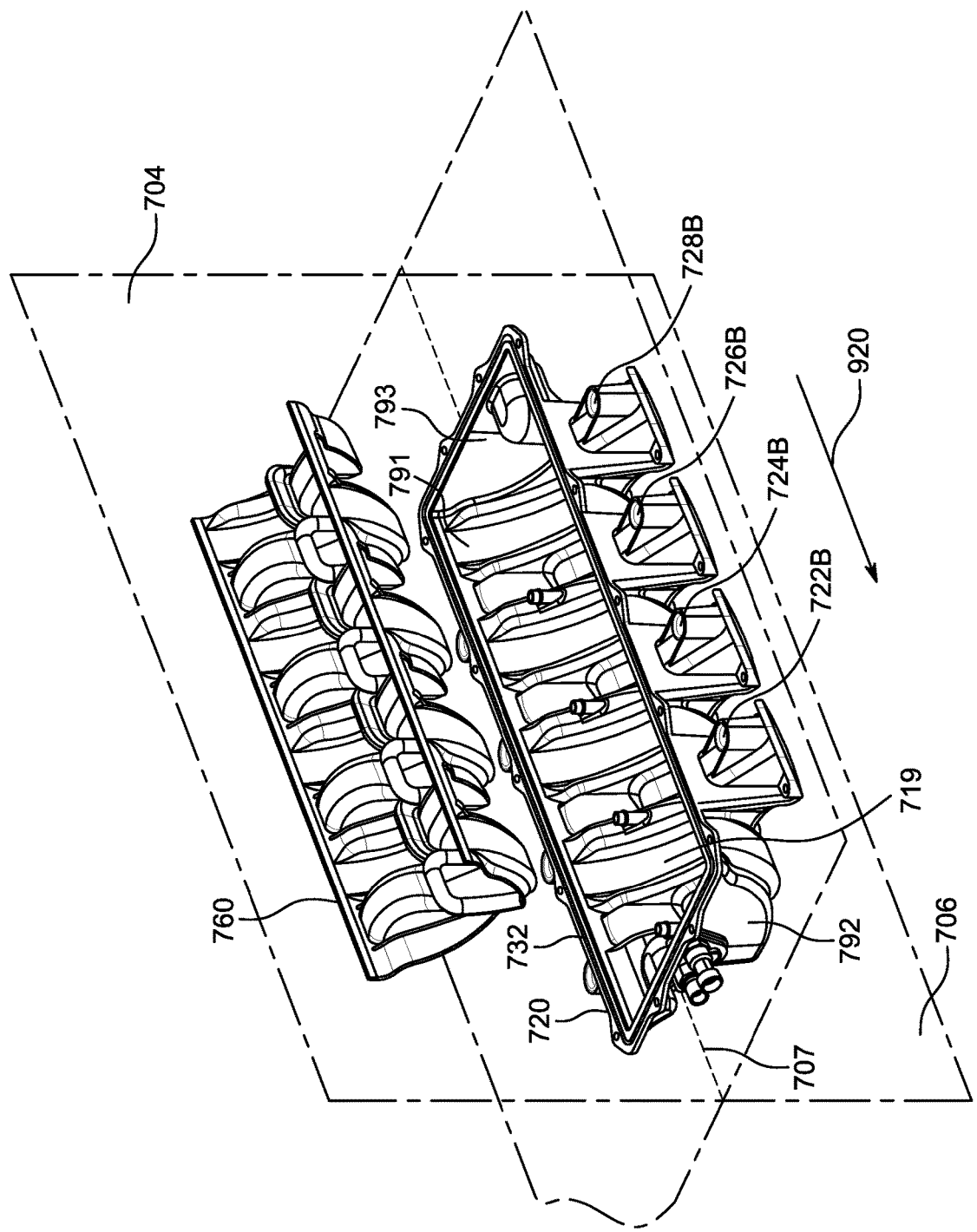
FIG. 25B is the same exploded perspective view depicting the geometrical planes used for reference herein.
Figure 25C:
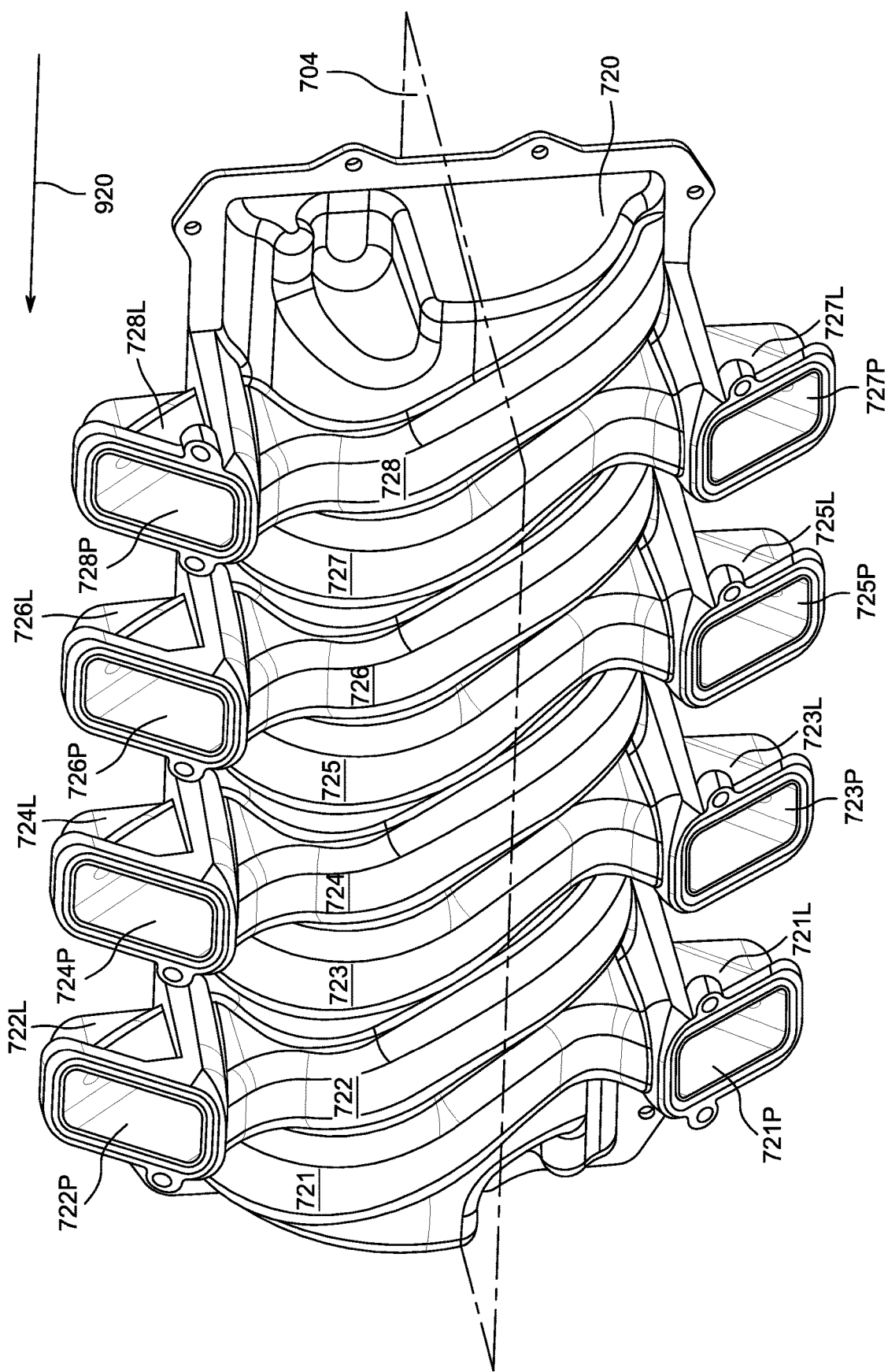
FIG. 25C is an underside perspective view of the air distribution tray depicted in FIGS. 25A and 25B.

Air distribution tray 720 is shown in FIGS. 25A and 25B. In general outline, air distribution tray 720 is a semi-cylindrical shape 791 with two semi-circular end plates 792, 793, which define an air distribution tray bowl 719 bounding an interior volume. Air distribution tray 720 has a first longitudinal edge 733, a second longitudinal edge 734, a first transverse edge 743 and a second transverse edge 744 to provide a generally rectangular planar perimeter 732 in plan view. In the preferred embodiment, air distribution tray 720 is dimensioned to be mounted between the cylinder banks of a V-8 engine in lieu of for example a stock engine air intake manifold. The planar perimeter 732 of air distribution tray 720 permits the ready attachment of other components to air distribution tray 720 in an overlying relationship, such as NA air inlet 410, intercooler 300, single channel air inlet 430 and dual channel air inlet 450.

As shown in FIG. 25B, a vertical reference plane 704 evenly divides air distribution tray 720 and its perimeter 732. Perimeter 732 is coplanar with a horizontal reference plane 706, shown in FIG. 25B. For convenience of reference, the intersection of planes 704 and 706, denominated direction 707, may be referred to herein from time to time as the "longitudinal" direction. A third reference plane (not shown), which is perpendicular to both plane 704 and plane 706, defines the transverse direction, and the intersection of this third reference plane and plane 704 may be referred to herein from time to time as the "vertical" direction. In the preferred embodiment, when air distribution tray 720 is mounted to an engine, plane 704 shown in FIG. 25B is generally coincident with plane 104 shown in FIG. 2; plane 706 shown in FIG. 25B is generally parallel to plane 106 shown in FIG. 2; and direction 707 in FIG. 25B is generally parallel to arrow 920 shown in FIG. 2.

Figure 26A:
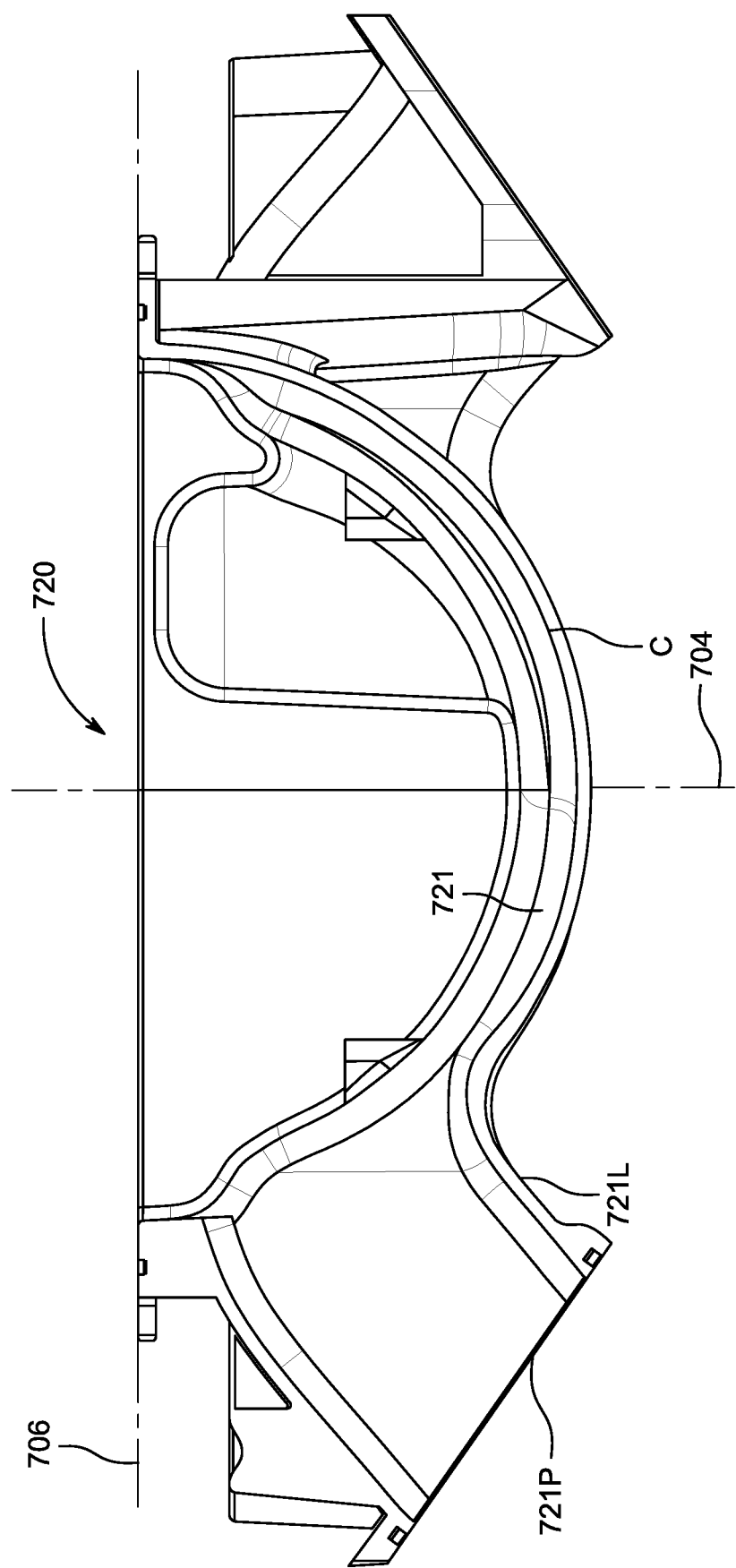
FIG. 26A is a section view of a select air distribution channel in the air distribution tray utilized in the downward flow configuration of the present invention.
Figure 26B:
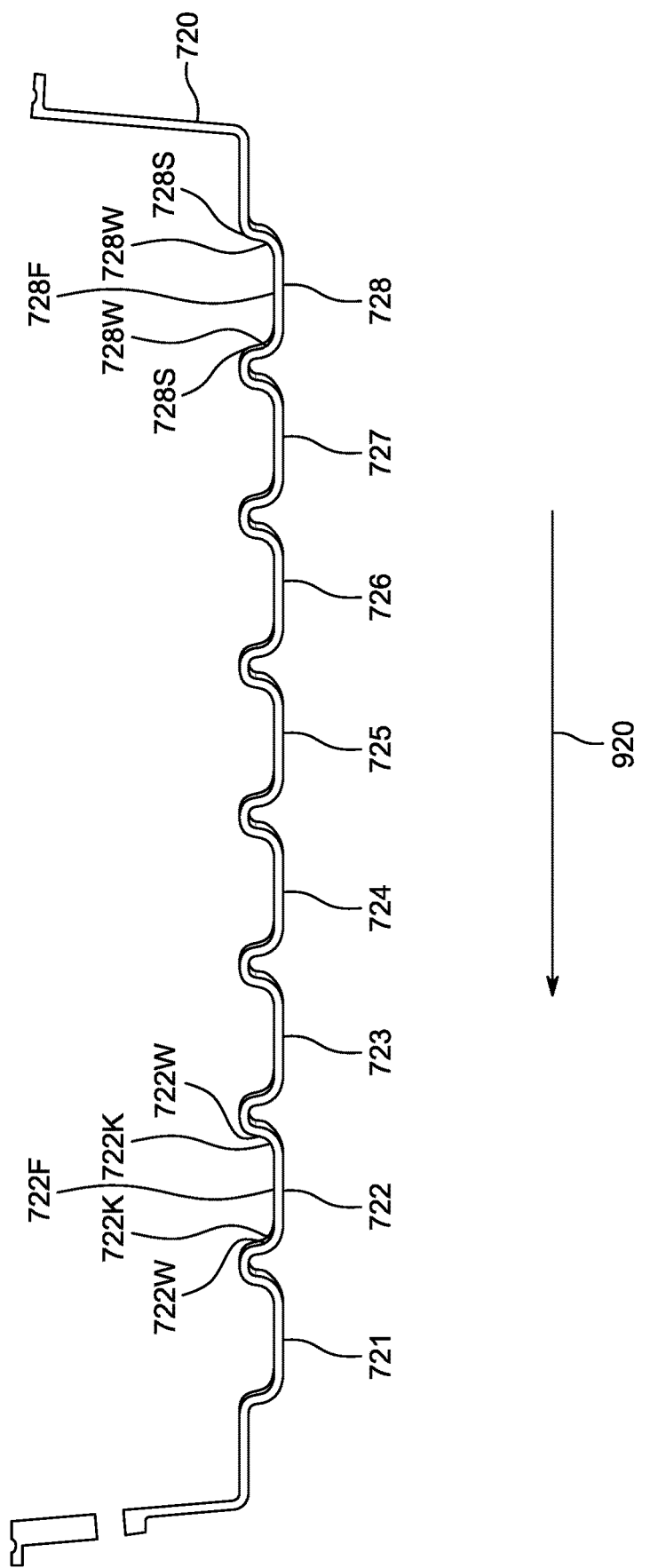
FIG. 26B is a longitudinal section view of the air distribution tray utilized in the downward flow configuration of the present invention.

Air distribution tray 720 is shaped to define a plurality of air distribution channels 721, 722, 723, 724, 725, 726, 727 and 728. each having a generally shallow U-shaped cross section, as shown in FIG. 26B, which depicts a longitudinal cross-section of air distribution tray 720. Each of air distribution channels 721-728 defines a path to a connecting passage formed through a respective one of air distribution tray legs 721L, 722L, 723L, 724L, 725L, 726L, 727L and 728L, shown in FIGS. 25A, 25C and 27. Each connecting passage terminates in a respective outlet port 721P, 722P, 723P, 724P, 725P, 726P, 727P and 728P, shown for example in FIGS. 25A and 25C.

In the preferred embodiment, there are eight air distribution tray legs 721L-728L. Four tray legs 721L, 723L, 725L and 727L are positioned to one side of vertical reference plane 704 that divides air distribution tray 720, and four tray legs 722L, 724L, 726L and 728L are positioned to the other side of vertical reference plane 704 that divides air distribution tray 720, as shown for example in FIG. 25C. Legs 721L-728L are positioned to overlie the cylinder inlet ports of a V-8 engine, engine 700, so that the connecting passage in each of legs 721L-728L communicates with a respective cylinder inlet port. Air distribution tray 720 is rigidly fastened to engine 700, as for example by bolts passed through apertures in legs 721L-728L that are received in threaded apertures in engine 700. In this manner, tray legs 721L-728L support air distribution tray 720 over engine 700.

Figure 27:
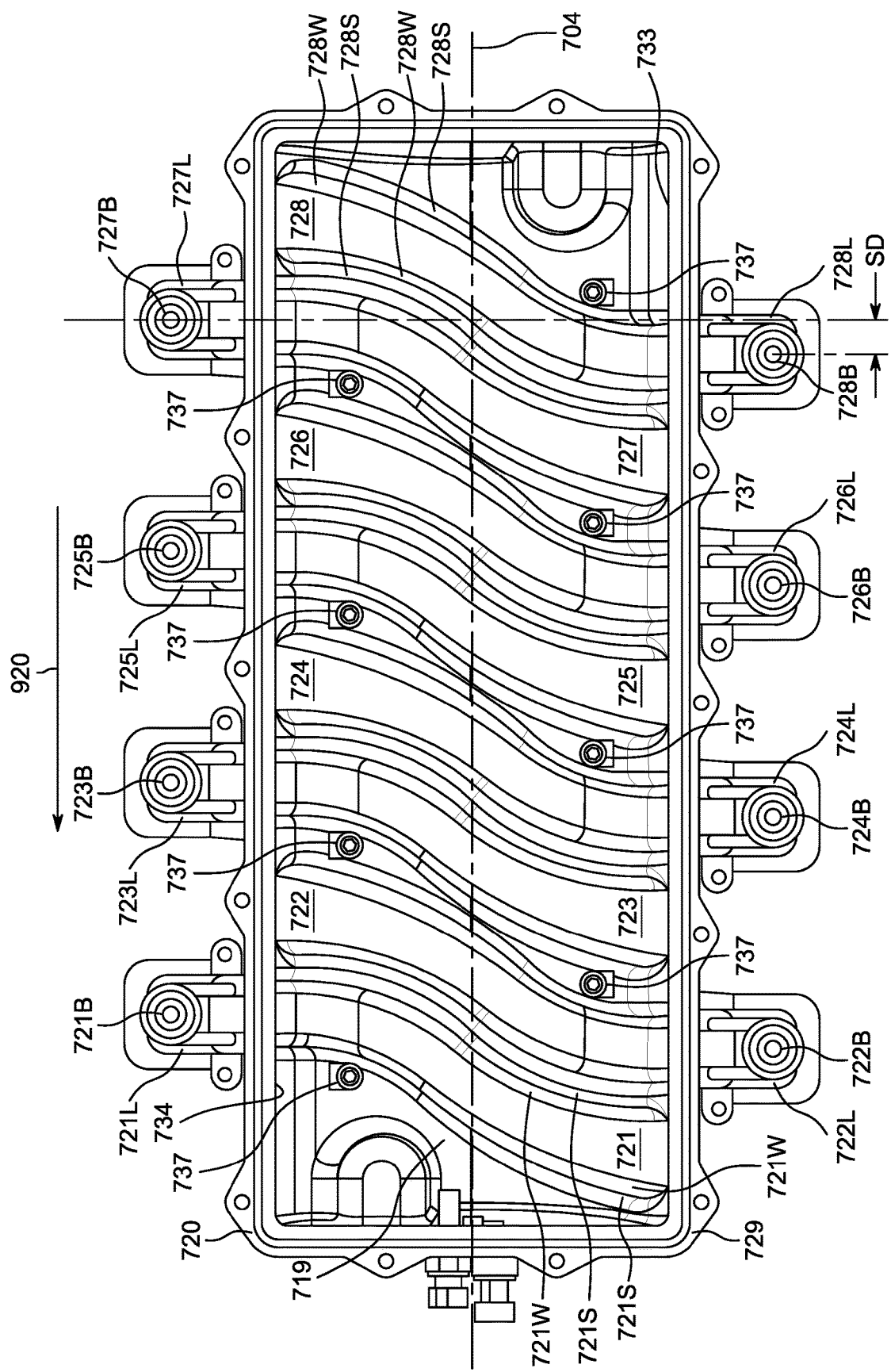
FIG. 27 is a plan view of the air distribution tray utilized in the downward flow configuration of the present invention.

Each of air distribution tray legs 721L, 722L, 723L, 724LP, 725L, 726L, 727L and 728L defines a respective bore 721B, 722B, 723B, 724B, 725B, 726B, 727B and 728B, shown for example in FIGS. 25B and 27, for receiving a fuel injector. It is preferred that bores 721B-728B be vertically aligned (i.e., not inclined) to permit, in the preferred embodiment described herein, the optional use of oversized injectors that could otherwise interfere with other engine components if oriented at an incline.

Each of air distribution channels 721-728 are curved about a longitudinal axis, located in vertical reference plane 704 and parallel to direction 707, so as to follow an arc-like downwardly and upwardly curved path when viewed edge-on in the longitudinal direction. This curved path starts from either first longitudinal edge 733 or second longitudinal edge 734 of air distribution tray 720, and continues across vertical reference plane 704, where it communicates with a respective one of the connecting passages formed in legs 721L-728L. An example of this curved path is denominated C and depicted in FIG. 26A, which is a section view of air distribution channel 721. Going from the right-hand side to the left-hand side of FIG. 26A, the material forming air distribution tray 720 is shaped so that channel 721 is concavely curved when viewed edge-on in the longitudinal direction: it curves downward until the mid-point of tray 720 is reached (coincident with vertical reference plane 704), following which channel 721 curves upward and smoothly joins with the connecting passage in tray leg 721L which terminates at outlet port 721P.

The air distribution channels 721-728 are arranged one adjacent the other, and this side-by-side arrangement, given that each of air distribution channels 721-728 is concavely curved, defines the air distribution tray bowl 719. Each longitudinally adjacent pair of air distribution channels 721-728 (e.g., first air distribution channel pair 721 and 722, second air distribution channel pair 723 and 724, third air distribution channel pair 725 and 726, fourth air distribution channel pair 727 and 728) communicate with corresponding connecting passages in two of legs 721L-728L which are positioned on opposing sides of vertical reference plane 704. Using first channel pair 721 and 722 as an example and referring to FIG. 25C, air distribution channel 721 communicates with the connecting passage in leg 721L located on the right side of vertical reference plane 704 (in relation to direction 920), and air distribution channel 722 communicates with the connecting passage in leg 722L located on the left side of vertical reference plane 704. This communication pattern is repeated for each successive pair, such that air distribution channels 721-728 are characterized by communicating with the corresponding connecting passages in legs 721L-728L in an alternating (right-left-right-left-right-left-right-left) pattern.

As is common, the left and right cylinder bank inlet ports of V-8 engines, such as engine 700 shown in FIG. 2, are not symmetrically disposed about vertical plane 704 across from each other, but rather are longitudinally offset (typically a consequence of utilizing crankshafts with crankpins arranged along the length of the crankshaft). To accommodate this offset, the legs and outlet ports on each side of the longitudinal plane dividing air distribution tray 720 are correspondingly offset, or staggered, in the longitudinal direction a comparable distance. Thus as shown in FIG. 27 as an example, the legs 727L and 728L located across from each other are shown as being offset in the longitudinal direction a stagger distance SD.

It is preferred that the paths of air distribution channels 721-728 in plan view be neither straight, nor uniformly transversely-oriented (that is, not be uniformly perpendicular to the longitudinal plane dividing air distribution tray 720). Rather, it is preferred that air distribution channels 721-728 in plan follow serpentine paths, as shown in the plan view of FIG. 27. In particular, viewed in plan each channel is generally perpendicularly oriented to longitudinal edges 733 and 734 (or nearly so) proximate those two edges. Between edges 733 and 734, the channel traces an S-shape viewed in plan. This S-shape permits each channel to efficiently utilize the space between the two adjacent outlet ports on the opposite side of air distribution tray 720.

The generally U-shaped cross section of each of air distribution channels 721-728 is defined by a channel floor and two opposing channel walls. Thus referring to channel 728 in FIG. 26B for example, the cross section of channel 728 is defined by channel floor 728F and two opposing channel walls 728W. The cross sections of each of air distribution channels 721, 722, 723, 724, 725, 726 and 727 are comparable. Preferably, the shoulder at the top of each wall of the air distribution channels (i.e., distal from the floors) is not angular or square in profile, but rather is curved or rounded utilizing a select curve or radius to allow air when present to smoothly flow in the channel and minimize turbulence. Referring again for example to air distribution channel 728 shown in FIG. 26B, each of the upper portions (distal from floor 728F) of the two opposing channel walls 728W of air distribution channel 728 are provided with curved or rounded shoulders 728S. Comparable curved or rounder shoulders preferably are provided for each the other opposing channel walls of air distribution channels 721, 722, 723, 724, 725, 726 and 727.

Similarly, the knee at the bottom of each wall of an air distribution channel (proximate to the floor) is not angular or square in profile, but rather is curved or rounded utilizing a select curve or radius to allow air to smoothly flow in the channel and minimize turbulence. Referring for example to air distribution channel 722 shown in FIG. 26B, each of the lower portions (proximate to floor 722F) of the two opposing channel walls 722W of air distribution channel 722 are provided with curved or rounded knees 722K. Comparable curved or rounded knees 721K, 723K, 724K, 725K, 726K, 727K and 728K preferably are respectively provided for each of the other opposing channel walls of air distribution channels 721, 723, 724, 725, 726, 727 and 728. As described further below, the channel walls 721W-728W of each of air distribution channels 721-728 preferably are not parallel, but rather vary in separation distance.

The perimeter 732 of air distribution tray 720 is provided with an air distribution tray flange 729, shown for example in FIGS. 25 and 27. It is preferred that air distribution tray flange 729 be identical in size and geometry to intercooler flange assembly 310, and have the same pattern of bolt apertures as intercooler flange assembly 310. Likewise, it is preferred that that air distribution tray flange 729 be identical in size and geometry to NA air inlet flange 413, and have the same pattern of bolt apertures as NA air inlet flange 413. When prepared in accordance with these preferences, air distribution tray flange 729 can be bolted to either of the two intercooler flange assemblies 310 of an intercooler 300, or directly to NA air inlet flange 413 of NA air inlet 410, as desired. The aspect ratio AR of intercooler 300 can be varied as required to conform to the dimensions of air distribution tray flange 729.

A resilient sealing gasket, component or structure may additionally be interposed to contribute to sealing. For example, FIG. 3 shows an optionally provided sealing groove 317 on the exterior face of each intercooler flange assembly 310 for receiving an O-ring 307 and yielding a relatively air-tight seal between intercooler 300 and air outlet 360. A like sealing groove 731 on the contact face of air distribution tray flange 729, as shown in FIG. 25A, can likewise receive an O-ring 307 to provide a relatively air-tight seal between an intercooler 300 and air distribution tray 720, or between NA air inlet 410 and air distribution tray 720.

Air distribution tray 720 is preferably fabricated from glass reinforced nylon or temperature-resistant suitable plastics or composite materials.

Air Passage Closure Tray (760)

Air passage closure tray 760 is shown in FIGS. 25A and 25B. In general outline, air passage closure tray 760 is semi-cylindrical in shape, bordered by a first longitudinal edge 753 and an opposing second longitudinal edge 754. Air passage closure tray 760 is adapted to be inserted into and received within air distribution tray 720 in a nesting relationship, below perimeter 732 and within the air distribution tray bowl 719 of air distribution tray 720, with first longitudinal edge 753 proximate to first longitudinal edge 733 of air distribution tray 720, and second longitudinal edge 754 proximate to second longitudinal edge 734 of air distribution tray 720. In the preferred embodiment (adapted for engine 700), air passage closure tray 760 comprises eight closure tray channel regions 759 and eight closure tray pan regions 780. Each closure tray channel region 759 is contiguous with a corresponding closure tray pan region 780, as described further below.

Figure 28A:
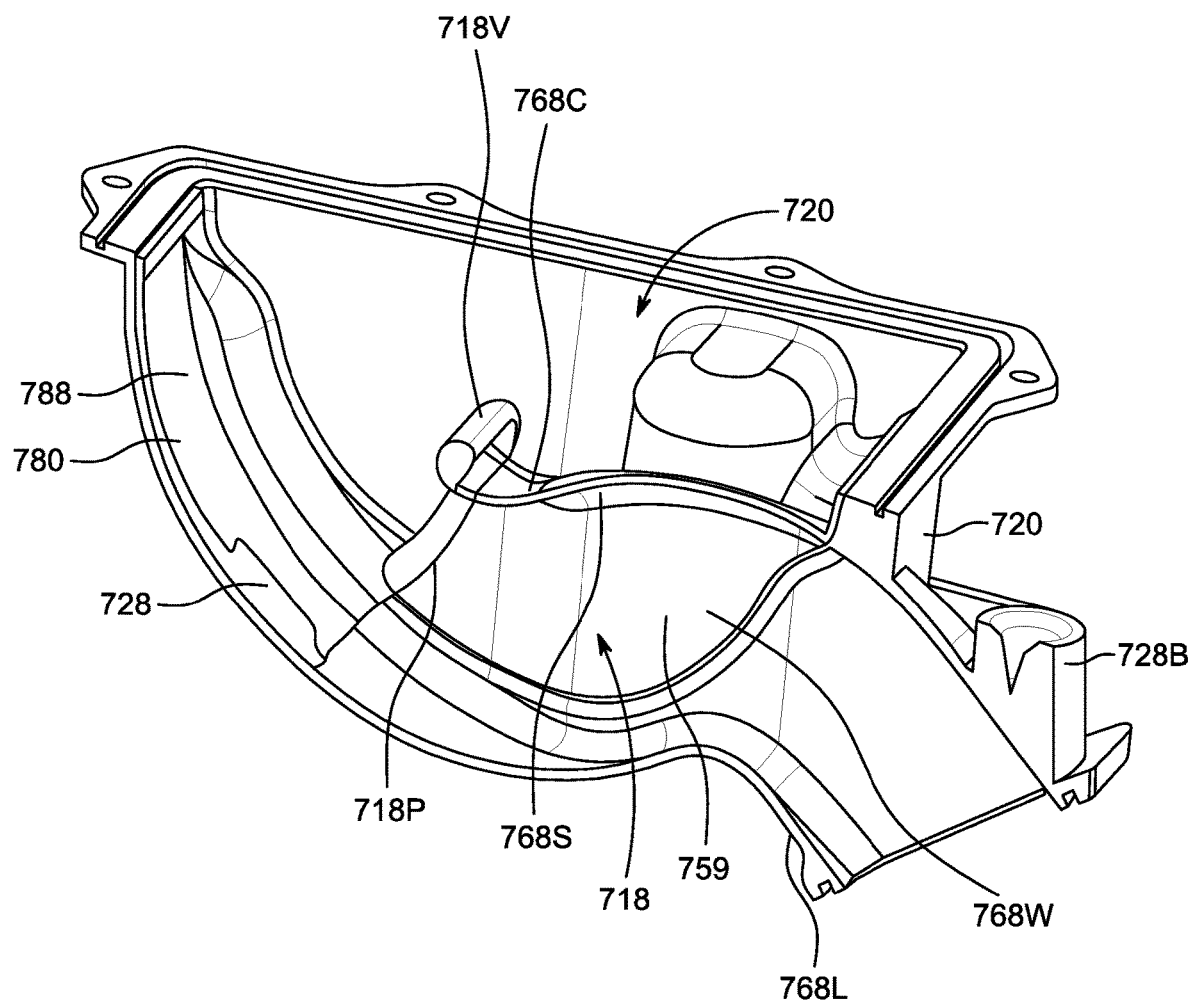
FIG. 28A is a perspective section view of a select closed air conduit of an assembled air distribution tray and air passage closure tray utilized in the downward flow configuration of the present invention.
Figure 28B:
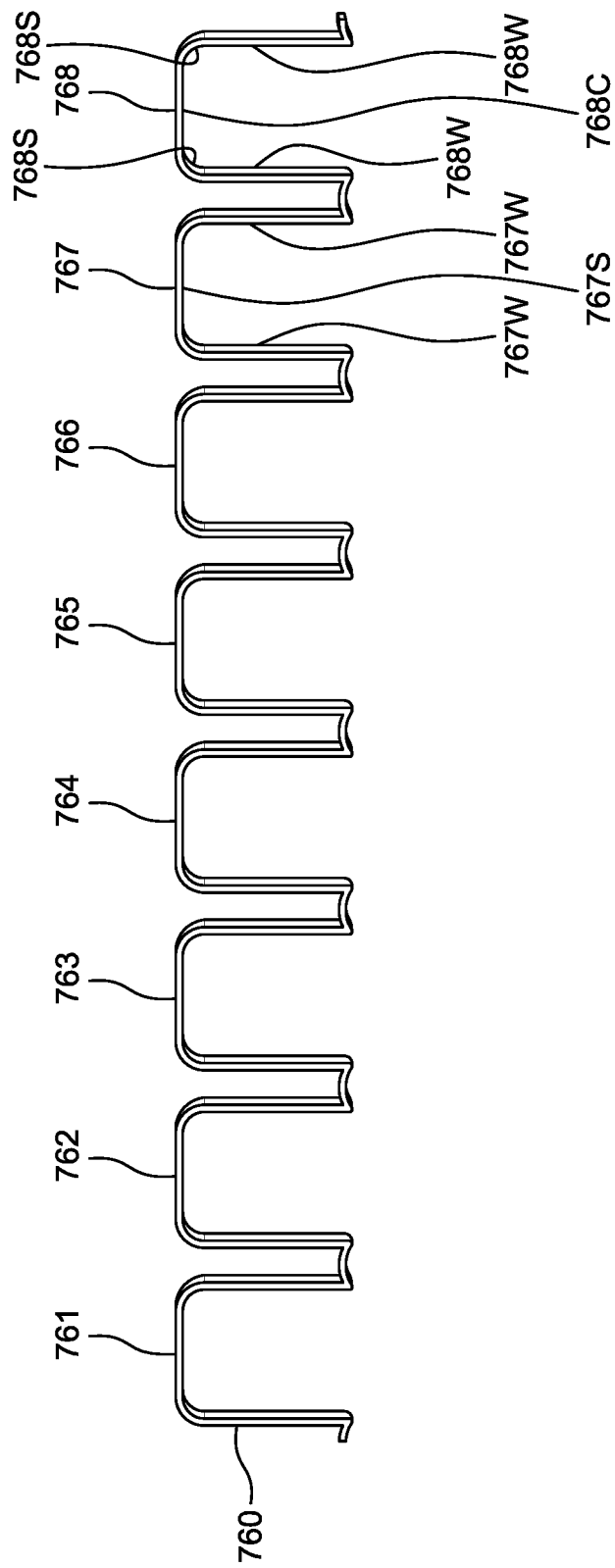
FIG. 28B is a longitudinal section view of the air passage closure tray, shown in FIG. 29, utilized in the downward flow configuration of the present invention.

Closure tray channel regions 759 of air passage closure tray 760 are shaped to define a plurality of air passage closure channels 761, 762, 763, 764, 765, 766, 767 and 768, each having a generally U-shaped cross section, as shown in FIG. 28B, depicting for illustrative purposes a particular longitudinal cross-section of an embodiment of air passage closure tray 760. As explained further below, air passage closure channels 761-768 are shaped so that when air passage closure tray 760 is inserted into and received within air distribution tray 720 in a nesting relationship, air passage closure channels 761-768 cooperate with the air distribution channels 721-728 of air distribution tray 720 to define a plurality of closed air conduits 711-718 having conduit inlet ports 711P-718P; in use, air is drawn from the region above the conduit inlet ports 711P-718P and then conducted to one of the connecting passages in legs 721L-728L.

Figure 28C:
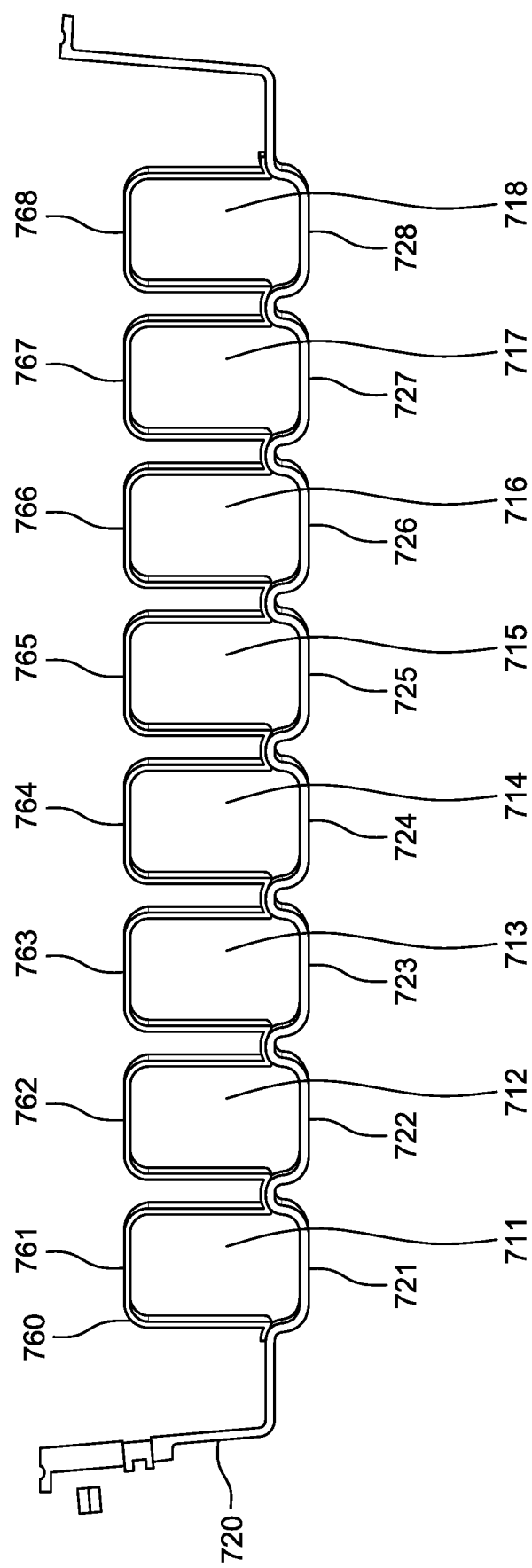
FIG. 28C is a longitudinal section view of that air passage closure tray nested within an air distribution tray, as shown in FIG. 26B.

In particular, as shown in the example of FIG. 28C, (1) air passage closure channel 761 is shaped to be mated with air distribution channel 721 to form a closed air conduit 711 having a conduit inlet port 711P; (2) air passage closure channel 762 is shaped to be mated with air distribution channel 722 to form a closed air conduit 712 having a conduit inlet port 712P; (3) air passage closure channel 763 is shaped to be mated with air distribution channel 723 to form a closed air conduit 713 having a conduit inlet port 713P; (4) air passage closure channel 764 is shaped to be mated with air distribution channel 724 to form a closed air conduit 714 having a conduit inlet port 714P; (5) air passage closure channel 765 is shaped to be mated with air distribution channel 725 to form a closed air conduit 715 having a conduit inlet port 715P; (6) air passage closure channel 766 is shaped to be mated with air distribution channel 726 to form a closed air conduit 716 having a conduit inlet port 716P; (7) air passage closure channel 767 is shaped to be mated with air distribution channel 727 to form a closed air conduit 717 having a conduit inlet port 717P; and (8) air passage closure channel 768 is shaped to be mated with air distribution channel 728 to form a closed air conduit 718 having a conduit inlet port 718P.

Figure 25D:
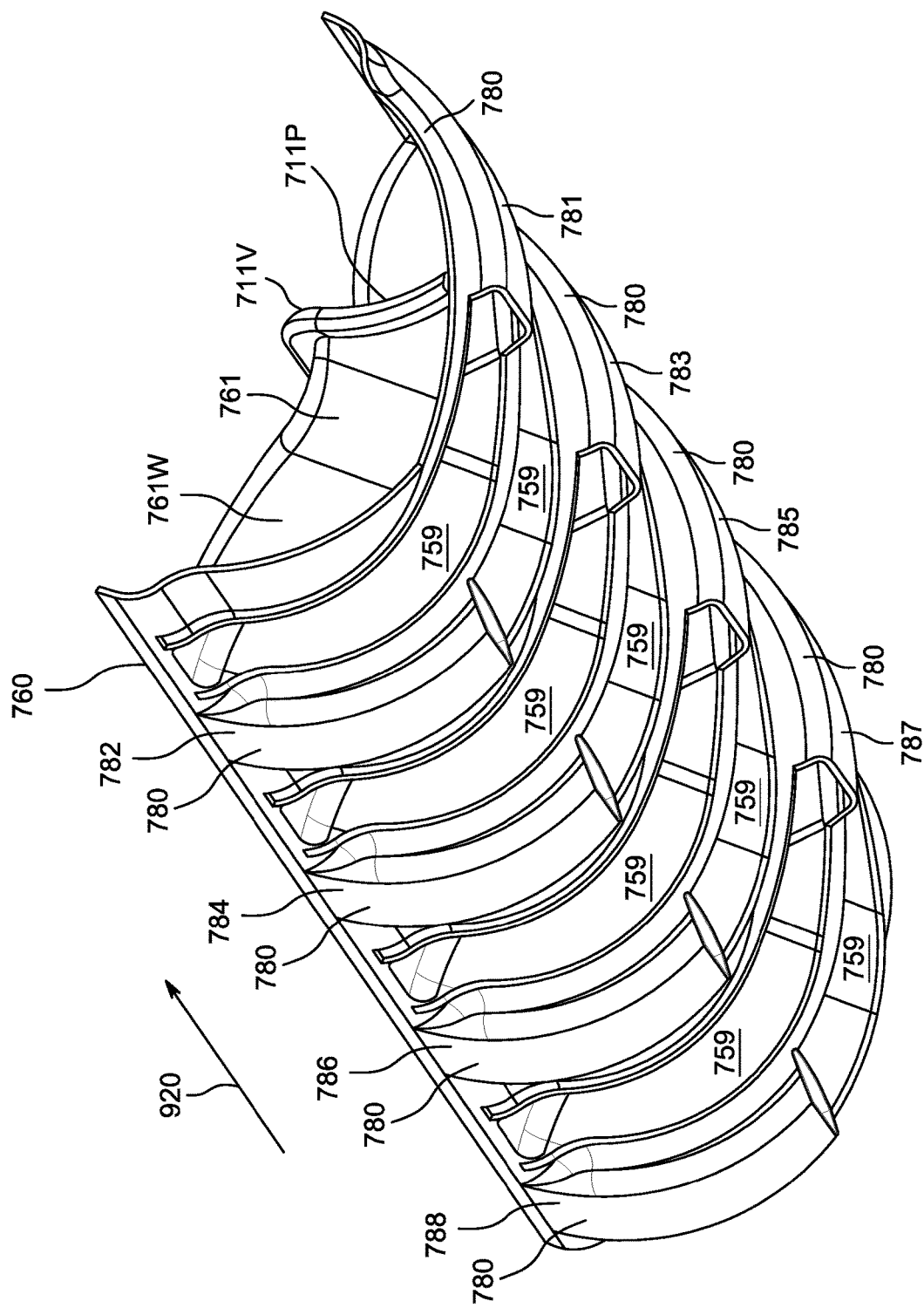
FIG. 25D is an underside perspective view of the air passage closure tray depicted in FIGS. 25A and 25B.

Accordingly, air passage closure channels 761-768 are each curved and shaped in general conformity with the curvature of the respective one of air distribution channels 721-728 to which they mate. Specifically, air passage closure channels 761-768 are each concavely-curved when viewed edge-on in the longitudinal direction, and are each shaped to trace a serpentine S-shape when viewed in plan. Further, air passage closure channels 761-768 are arranged in conformity with the connection passage communication pattern of air distribution channels 721-728 to the connecting passages in legs 721L-728L. As a result, there is an alternating airflow pattern (right-left-right-left-right-left-right-left) in closed air conduits 711-718. Correspondingly, in the preferred embodiment closure tray channel regions 759 are not substantially longitudinally contiguous, but rather are disposed in an alternating arrangement in the longitudinal direction, as shown in FIG. 25D.

The generally U-shaped cross section of each air passage closure channels 761-768 is defined by a closure channel ceiling and two opposing closure channel walls. Referring to closure channel wall 768 in FIG. 28B for example, the cross section of closure channel 768 is defined by channel ceiling 768C and two opposing channel walls 768W. The cross sections of each of air passage closure channels 761, 762, 763, 764, 765, 766 and 767 are comparable. Preferably, the shoulder at the top of each wall of an air passage closure channel (i.e., proximate to the channel ceiling) is not angular or square in profile, but rather is curved or rounded utilizing a select curve or radius to allow air to smoothly flow through the channel and minimize turbulence. Thus referring to FIGS. 25A and 28B for example, each of the top portions (proximate to ceiling 768C) of the two opposing closure channel walls 768W of air passage closure channel 768 are provided with curved or rounded shoulders 768S. Comparable curved or rounded pairs of shoulders 761S, 762S, 763S, 764S, 765S, 766 and 767S preferably are respectively provided for each the other opposing channel walls of air passage closure channels 761, 762, 763, 764, 765, 766 and 767.

Figure 29:
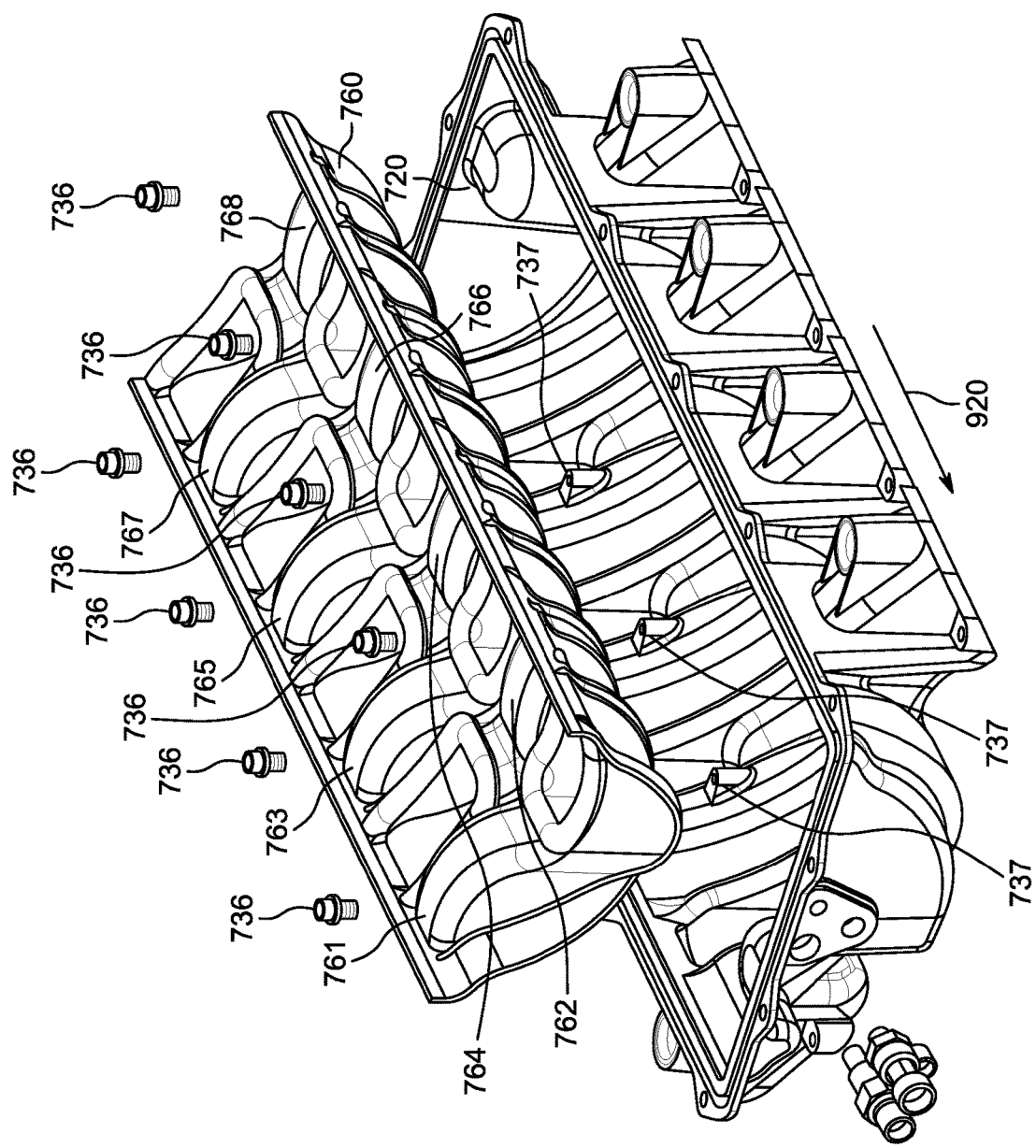
FIG. 29 is an exploded perspective view of an air distribution tray and air passage closure tray forming upon assembly closed air conduits of maximal length, which is utilized in the downward flow configuration of the present invention.

As shown in FIG. 29, there are plural fasteners 736 that pass through fastener apertures 738, defined in air passage closure tray 760, which are received in bores defined by posts 737 shown in FIG. 27 located in the air distribution tray bowl 719 of air distribution tray 720. Fasteners 736 are used to fix securely in place closure tray 760 to air channel distribution tray 720.

Figure 30:
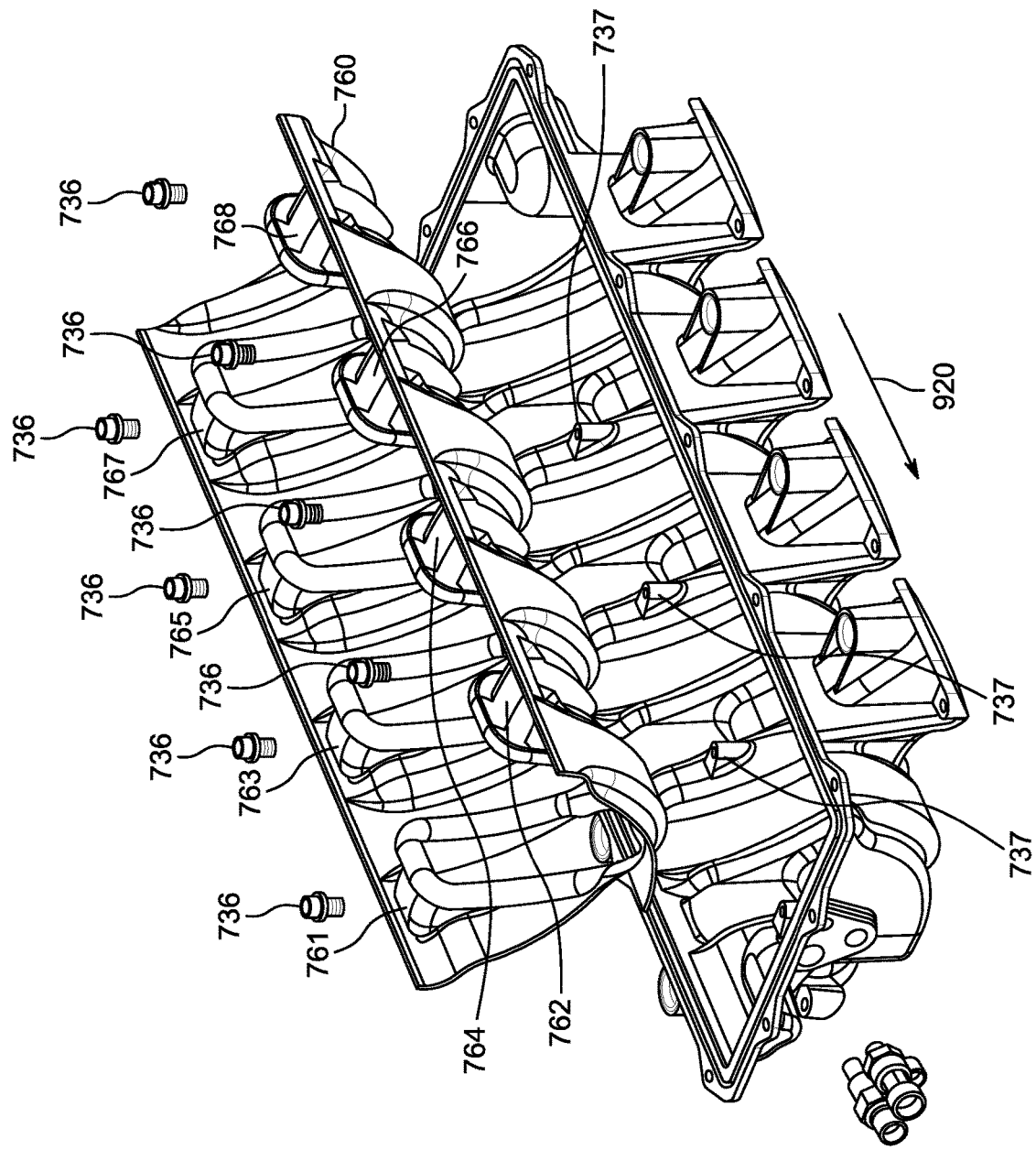
FIG. 30 is an exploded perspective view of an air distribution tray and air passage closure tray forming upon assembly closed air conduits of minimal length, which is utilized in the downward flow configuration of the present invention.

The length of air passage closure channels 761-768 can be varied as desired, limited only by the length of the air distribution channels 721-728 to which they are respectively mated, with the result that the lengths of closed air conduits 711-718 are varied. The length of air passage closure channels 761-768, and thus the length of air conduits 711-718, are selected in accordance with design choices relating to torque and power considerations. For example, air passage closure tray 760 depicted in FIG. 25A is provided with air passage closure channels 761-768 that terminate at approximately the mid-point of air distribution channels 721-728 (roughly proximate to vertical reference plane 704) to form closed air conduits 711-718 of an intermediate length, with air being introduced to conduits 711, 712, 713, 714, 715, 716, 717 and 718 through respective conduit inlet ports 711P, 712P, 713P, 714P, 715P, 716P, 717P and 718P, the shape of each of which is described further below. An alternative embodiment is shown in FIG. 29, in which air passage closure tray 760 as depicted is provided with air passage closure channels 761-768 of approximately the same length as air distribution channels 721-728 to form air conduits, 711-718 of maximal length. A further alternative embodiment is shown in FIG. 30, in which air passage closure tray 760 depicted is provided with air passage closure channels 761-768 that terminate only a modest distance from their respective outlet ports 721P-728P to form air conduits, 711-718 of minimal length.

In general, the present invention contemplates a set of air passage closure trays 760 that provide a variety of lengths of air passage closure channels 761-768, so that substantially different engine performance characteristics can be obtained, with but a relatively modest investment in time and energy, by simply removing fasteners 736, removing a first air passage closure tray 760 from air distribution tray 720, selecting a second air passage closure tray 760 (different from the first air passage closure tray 760), and securing that second air passage closure tray 760 in place with fasteners 736. The entirety of closed air conduits, 711-718, whether of maximal length, minimal length, or an intermediate length, are all concavely curved when viewed edge-on in the longitudinal direction, and are all contained within the interior volume of air distribution tray bowl 719, below perimeter 732 (coplanar with horizontal reference plane 706) of air distribution tray 720. Likewise, for any length of closed air conduits 711-718, inlet ports 711P-718P are located below perimeter 732 and draw air from the common air region above those ports, such that above the ports, the intake air is not guided to any specific cylinder, while below these ports, it is, namely by closed air conduits 711-718.

Figure 32:
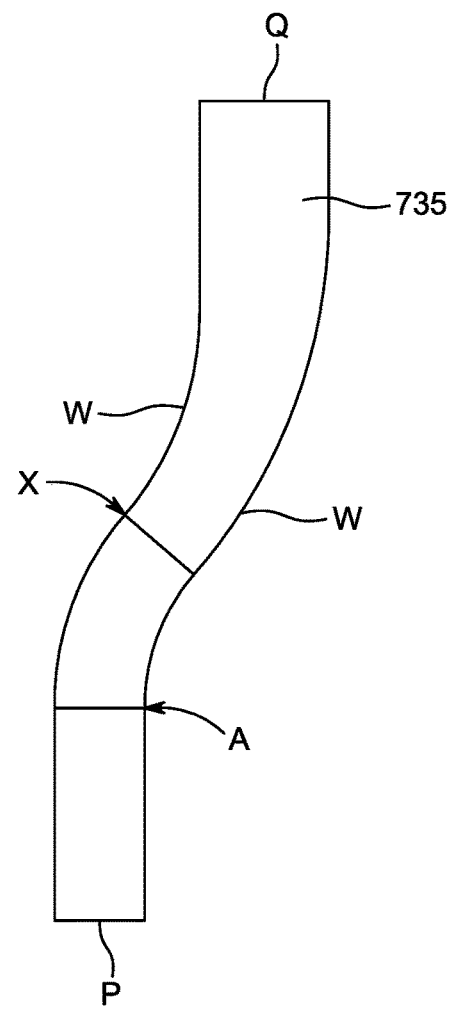
FIG. 32 is a plan view of an air column contained within a maximal length air conduit.

The cross-sectional area along the length of any of closed air conduits 711-718 preferably is not constant, but preferably varies between a maximum area proximate the inlet port to a minimum area proximate to the outlet port. This variation preferably is obtained by varying the distance separating the opposing air distribution channel walls 721W-728W of the air distribution channels 721-728, and varying in like manner the distance separating the opposing closure channel walls 761W-768W of the air passage closure channels 761-768, along the length of those channels. Referring to FIG. 32, there is shown in plan view an air column 735 contained within a maximal length air conduit of conduits 711-718. The cross-sectional area of column 735 at an arbitrary section is A. The column is bounded by walls W. As can be seen, the distance between walls W varies along the length of air column 735. Proximate to the outlet port P (corresponding to one of outlet ports 721P-728P), the distance between walls W is at a minimum and hence the area A is at a minimum. Correspondingly, proximate the inlet port Q (corresponding to one of conduit inlet ports 711P-718P), the distance between walls W is at a maximum and hence the area A is at a maximum. Although air column 735 is shown for a maximal length air conduit, generally corresponding to the embodiment of FIG. 29, the inlet ports 711P-718P can be located as desired at any point X between outlet port P and point Q, yielding the cross-sectional area at that point in accordance with FIG. 32.

In addition, it is preferred that the conduit inlet ports 711P-718P have an inlet area (i.e., the area of the aperture) greater than the cross-sectional area of the air outlet ports 721P-728P, and it is particularly preferred that conduit inlet ports 711P-718P have an inlet area in the range of 1.5-2.0 times the cross-sectional area of the air outlet ports 721P-728P. Accordingly, it is preferred in the present invention to vary the shape of the inlet ports 711P-718P so that the inlet area satisfies the foregoing design preference, as by canting at an angle to the air flow (i.e., not perpendicular to the air flow) the inlet boundaries of those portions of closure channel walls 761W-768W terminating at inlet ports 711P-718P, or by curving those inlet boundaries, or by doing both.

Figure 33A:
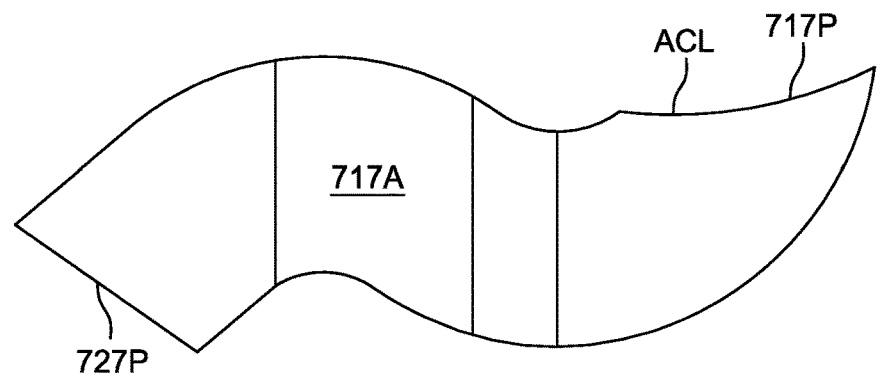
FIG. 33A depicts a column of air contained within a closed air conduit of maximal length, viewed in the longitudinal direction.
Figure 33B:
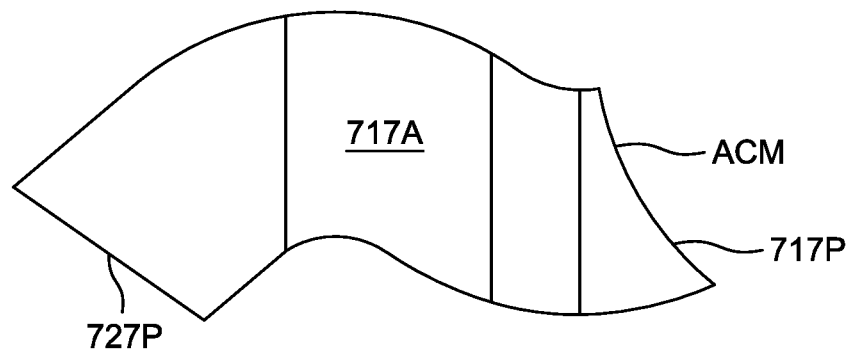
FIG. 33B depicts a column of air contained within a closed air conduit of medium length, viewed in the longitudinal direction.
Figure 33C:
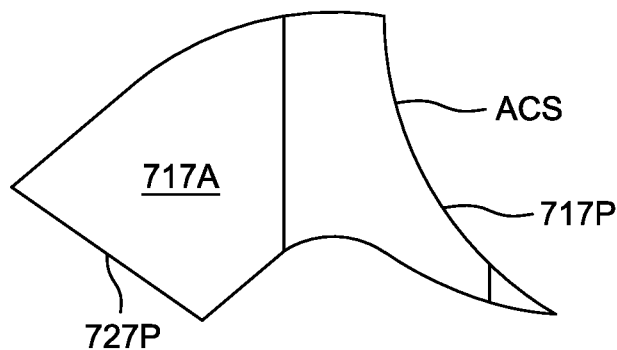
FIG. 33C depicts a column of air contained within a closed air conduit of minimal length, viewed in the longitudinal direction.

As an example, FIG. 33A depicts the column of air 717A contained within a closed air conduit 717 of maximum length, as would be approximately found in the embodiment of FIG. 29, when in the longitudinal direction. In this example, the inlet boundaries of those portions of the two closure channel walls 767W terminating at inlet port 717P would be angled and curved at inlet port 717P to conform to the profile ACL shown in FIG. 33A. In comparison, FIG. 33B depicts the column of air 717A contained within a closed air conduit 717 of medium length, as would be approximately found in the embodiment of FIG. 25B, when viewed in the longitudinal direction. In this example, the inlet boundaries of those portions of the two closure channel walls 767W terminating at inlet port 717P would be angled and curved at inlet port 717P to conform to the profile ACM shown in FIG. 33B. As a further comparison, FIG. 33C depicts the column of air 717A contained within a closed air conduit 717 of minimal length, as would be approximately found in the embodiment of FIG. 30, when viewed in the longitudinal direction. In this example, the inlet boundaries of those portions of the two closure channel walls 767W terminating at part inlet port 717P would be angled and curved at inlet port 717P to conform to the profile ACS shown in FIG. 33C.

Accordingly, it can be seen that each of the closure tray panel regions 759 defines one of air passage closure channels 761-768; that each of those air passage closure channels 761-768 overlies a select length of a respective one of the air passage distribution channels 721-728, so as to define one of closed air conduits 711-718; and that each of the conduit inlet ports 711P-718P provides an entrance to a respective one of closed air conduits 711-718 through which air enters the closed air conduit.

As shown in FIG. 25D, a closure tray pan region 780 is joined to each of the closure tray panel regions 759. The closure tray pan regions 780 are shaped to form plural pan channels 781, 782, 783, 784, 785, 786, 787 and 788. For example, FIG. 25D shows the closure tray panel region 759 that defines air passage closure channel 761, which in turn is part of closed air conduit 711 having an inlet port 711P (and a nozzle 711V, described below). Adjacent to closure tray panel region 759 defining channel 761, and upstream of inlet port 711P, there is provided a closure tray pan region 780 defining a pan channel 781.

Pan channels 781-788 are each appropriately dimensioned and positioned to conform in shape and positioning to air distribution channels 721-728 in the air distribution tray 720, and to snugly fit within those channels 721-728 when air panel closure tray 760 is nested within air distribution tray 720. As an example, FIG. 28A depicts in cross section the closure tray/distribution tray assembly proximate to closed air conduit 718. As can be seen, pan channel 788 of air panel closure tray 760 is snugly positioned within air distribution channel 728 of air distribution tray 720.

The cross-section of each of pan channels 781-788 preferably includes rounded shoulders and knees, of a select curvature or radius, comparable respectively to shoulders 721S-728S and knees 721K-728K of air distribution channels 721-728, described above. More generally, the cross-section of each of pan channels 781-788 is preferred to be similar in cross-section to each of the air distribution channels 721-728, but appropriately dimensioned to facilitate the snug nesting of pan channels 781-788 in air distribution channels 721-728 and to promote smoother airflow. As can be further appreciated, like closure tray channel regions 759, closure tray pan regions 780 are not substantially longitudinally contiguous, but rather are disposed in an alternating arrangement in the longitudinal direction, as shown in FIG. 25D. In general, each closure tray panel region 759 is partnered with the transversely adjacent closure tray pan region 780, as shown in FIG. 25D, with each partnered region 759-780 approximately spanning the distance between first longitudinal edge 753 and second longitudinal edge 754 of air passage closure tray 760, and with each partnered region 759-780 arranged in an oppositely oriented alternating arrangement in the longitudinal direction.

Preferably, the leading edges of conduit inlet ports 711P, 712P, 713P, 714P, 715P, 716P, 717P and 718P do not present a sharp edge to air flow at the inlet. Rather, it is preferred that each of conduit inlet ports 711P-718P be provided with an entry nozzle that is shaped, utilizing a select curve or radius, to induce a converging air entry pattern, which tends to reduce air turbulence and promote smooth flow through at least the initial lengths of the conduits. Referring for example to FIGS. 25A and 28A, the inlet boundary of air passage closure channel 768 (i.e., those portions of the two closure channel walls 768W and channel ceiling 768C which terminate at inlet port 718P of closed air conduit 718), are fitted with a shaped nozzle 718V having a curvature or radius that induces a converging air entry pattern. Comparably shaped nozzles 711V, 712V, 713V, 714V, 715V, 716V and 717V are preferably fitted to the respective inlet boundaries of air passage closure channels 761-767. Subject to geometrical constraints, it is additionally preferred that the curvature or radius of shaped nozzles 711V-718V be exactly or approximately the same as the curvature or radius of the shoulders of the air passage distribution channels 721-728 proximate to and over which they are respectively positioned, or alternatively, larger. It is additionally preferred that the transition between the nozzle and the shoulder of the pan channel to which it abuts be smooth and devoid of sharp edges or angles.

Air passage closure tray 760 preferably is fabricated from carbon fiber, plastic composites or like materials.

It therefore can be seen that, in the preferred embodiment, the assembly of air distribution tray 720 with an air passage closure tray 760 provides eight air management elements, each comprising an air distribution tray element and an air passage closure tray element. The air distribution tray element defines an air distribution channel, and the air passage closure tray element defines an air passage closure channel having a leading edge, for the entry of air, and an adjacent pan channel. The pan channel is snugly received and fits into a first portion of the air distribution channel formed in the air distribution tray element, and the air passage closure channel is correspondingly positioned over a second portion of the air distribution channel formed in the air distribution tray element to form a closed air conduit.

Further, in the preferred embodiment the eight air management elements are paired into four air management units, two air management elements to a unit. The two air management elements in each air management unit are oppositely arranged; thus for example, the air flow in closed air conduit 711 shown in FIG. 28C is in the opposite direction as the air flow in closed air conduit 712. On the other hand, each air management unit is in substance the same as other air management units; thus while the preferred embodiment utilizes four air management units, any number of air management units (e.g., one, two, three), can be provided in a side-by-side arrangement to adapt the present invention to a V-engine having any even number of cylinders.

Downward Flow System Arrangement Options

When flange assemblies 310 of intercooler 300 and each of the flanges of NA air inlet 410, single channel air inlet 430, dual channel air inlet 450 and air distribution tray 720 are identical in size and geometry, and have the same pattern of bolt apertures as described above, the air intake system components described above provide a wide variety of downward flow configuration arrangement options. Various options are given below as non-limiting examples.

As a first arrangement option, NA air inlet 410 can be secured directly to air distribution tray 720. The components utilized for this configuration are conceptually depicted in FIG. 31A in exploded form, and also depicted in assembled form in FIG. 31B and fitted to an engine in FIG. 31C. In particular, to assemble the components the air inlet flange 413 of NA air inlet 410 is bolted to flange 729 of air distribution tray 720 using nuts and bolts. The resulting assembly is for delivery uncompressed, uncooled air to the cylinders.

As a second arrangement option, single channel air inlet 430 can be secured directly to air distribution tray 720. The components utilized for this configuration are depicted in assembled form in FIG. 31D. In particular, to assemble the components the flange 433 of single channel air inlet 430 is bolted to flange 729 of air distribution tray 720 using nuts and bolts. The resulting assembly is for delivery of compressed, uncooled air to the cylinders.

As a third arrangement option, single channel air inlet 430 can be secured to one face 303 or 308 of an intercooler 300, and air distribution tray 720 can be secured to the other face 303 or 308 of first intercooler 300. The components utilized for this configuration are depicted in assembled form in FIG. 31E. In particular, to assemble the components the flange 433 of single channel air inlet 430 is bolted to the flange assembly 310 of one face (303 or 308) of intercooler 300, and flange 729 of air distribution tray 720 is bolted to the flange assembly 310 of the other face (303 or 308) of intercooler 300. Separate nut and bolt pairs can be utilized to secure each face 303 and 308 of intercooler 300 to its respective partner single channel air inlet 430 or tray 720, or the three components (430, 300, 720) can be secured together using longer bolts passing through all four flanges/flange assemblies, as preferred. The resulting assembly is for delivery of compressed, cooled air to the cylinders.

Figure 31F:
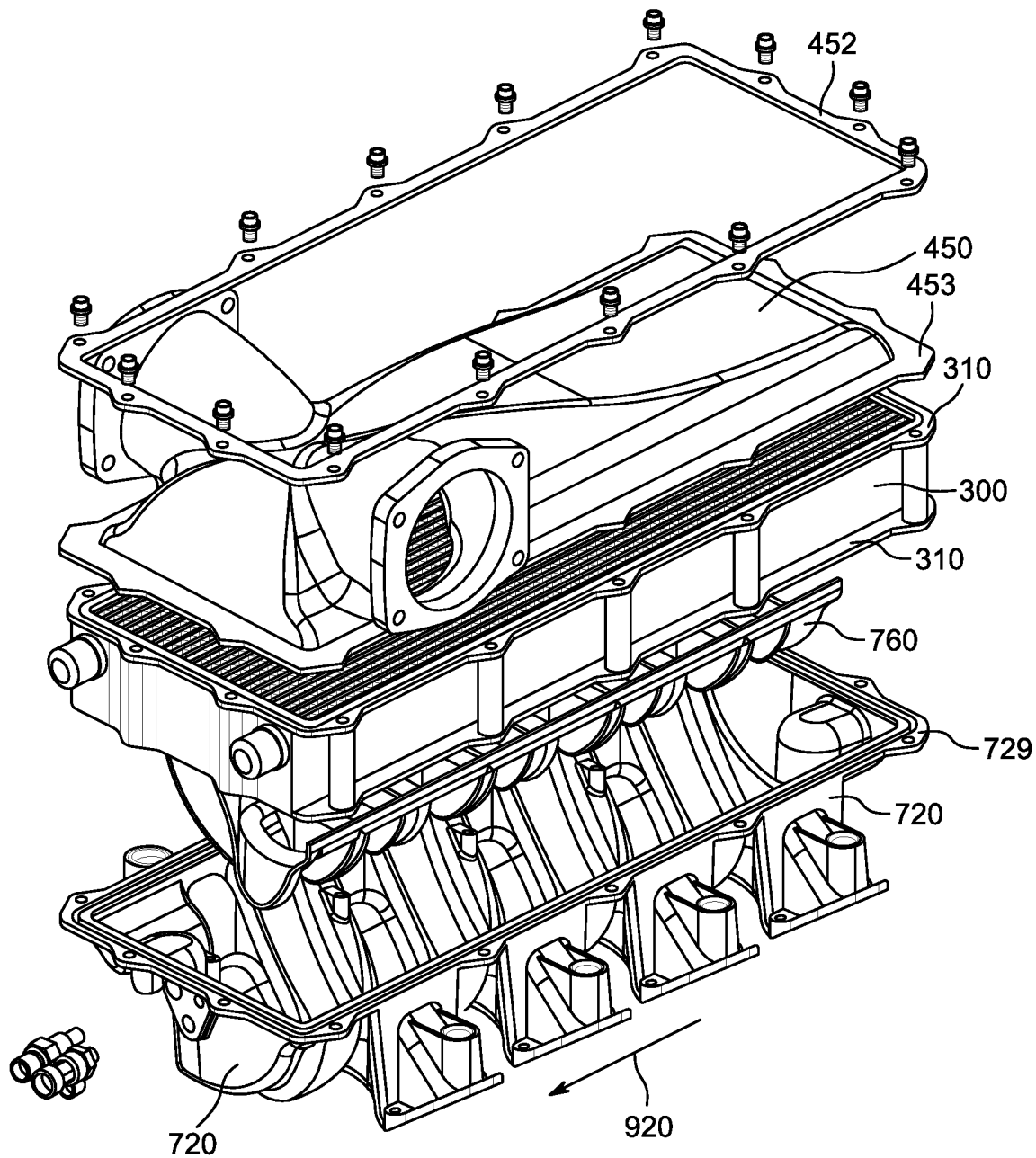
FIG. 31F is an exploded perspective view of a fourth downward flow air intake arrangement option of the present invention.
Figure 31G:
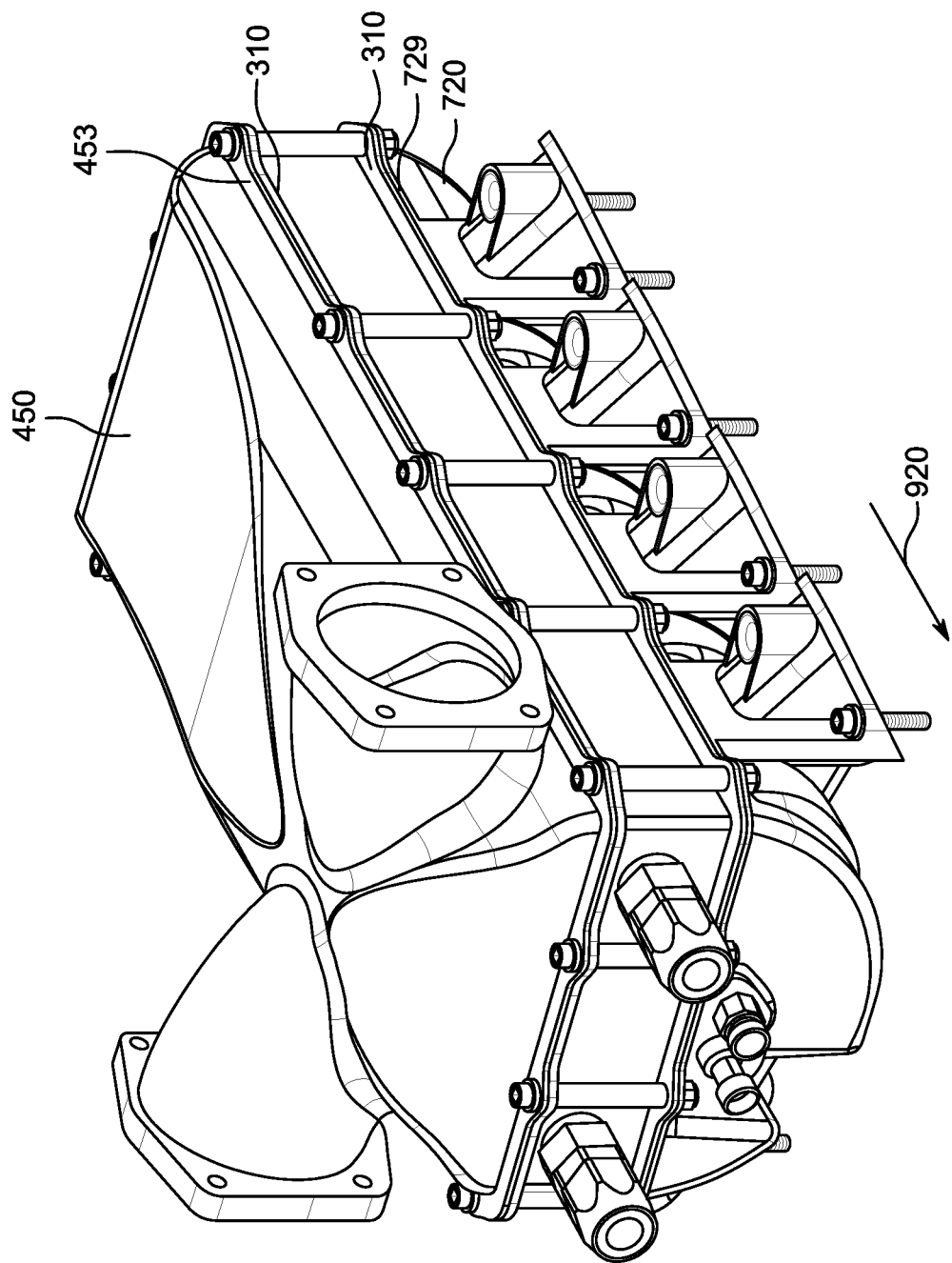
FIG. 31G is an assembled perspective view of the fourth downward flow air intake arrangement option of the present invention.

As a fourth arrangement option, dual channel air inlet 450 can be secured to one face 303 or 308 of an intercooler 300, and air distribution tray 720 can be secured to the other face 303 or 308 of first intercooler 300. The components used for this configuration are the same as described above in regard to the third option, except that the dual channel air inlet 450 replaces the single channel air inlet 430. The components utilized for this configuration are depicted in FIG. 31F in exploded form, in assembled form in FIG. 31G, and fitted to an engine in FIG. 2. In particular, to assemble the components the flange 453 of dual channel air inlet 450 is bolted to the flange assembly 310 of one face (303 or 308) of intercooler 300, and flange 729 of air distribution tray 720 is bolted to the flange assembly 310 of the other face (303 or 308) of intercooler 300. Separate nut and bolt pairs can be utilized to secure each face 303 and 308 of intercooler 300 to its respective partner dual channel air inlet 450 or tray 720, or the three components (450, 300, 720) can be secured together using longer bolts passing through all four flanges/flange assemblies, as preferred. The resulting assembly is for delivery of compressed, cooled air to the cylinders.

In addition, air passage closure trays 760 having air conduits 711-718 of different lengths can be utilized with any of the foregoing four non-limiting options to further vary the engine performance characteristics. A yet further option is to dispense with air passage closure tray 760 entirely, which provides an additional way to alter engine performance.

The foregoing detailed description is for illustration only and is not to be deemed as limiting the inventions, which are defined in the appended claims.

What is claimed is:

1. An updraft air intake system for an internal combustion piston engine having a first row of at least two cylinders inclined relative to a vertical plane, a second row of at least two cylinders inclined relative to the vertical plane, the two rows of cylinders forming a V configuration with the vertical plane being between the two rows, and an intake manifold for delivering intake air to the cylinders, the updraft air intake system comprising:
   (a) an intercooler component including:
   a rectangular heat exchanger core for cooling air with a liquid, the heat exchanger core having a first face for entry of uncooled air and a second opposing face for exit of cooled air;
   a first rectangular intercooler mounting flange structure secured to the periphery of the first face and a second rectangular intercooler mounting flange structure secured to the periphery of the second face;
   the first rectangular intercooler mounting flange structure and the second rectangular intercooler mounting flange structure having the same size and geometry; and
   the first rectangular intercooler mounting flange structure and the second rectangular intercooler mounting flange structure having the same pattern of plural spaced-apart symmetrically distributed bolt apertures; and
   (b) an air inlet component that includes (i) an air inlet for receiving air from an air compressor, (ii) a plenum, connected to the air inlet, for delivering the received air to the first face of the rectangular heat exchanger core; and (iii) a rectangular air inlet flange having the same pattern of bolt apertures as the first rectangular intercooler mounting flange structure;
   the rectangular air inlet flange of the air inlet component being bolted to the first rectangular intercooler mounting flange structure of the intercooler component to form an air intake system assembly, the air intake system assembly being configured to be mounted over the intake manifold with the air inlet component below the intercooler component so as to provide an upward flow through the intercooler component.

2. The updraft air intake system of claim 1, wherein the air intake system assembly further comprises (c) an air outlet component having a rectangular air outlet flange that has the same pattern of bolt apertures as the second rectangular intercooler mounting flange structure, the air outlet flange of the air outlet component being bolted to the second rectangular intercooler mounting flange structure of the intercooler component, with the air intake system assembly being configured with the air outlet component above the intercooler component.

3. An air distribution system for an internal combustion piston engine having a first row of at least two cylinders inclined relative to a vertical engine plane, a second row of at least two cylinders inclined relative to the vertical engine plane, the two rows of cylinders forming a V configuration with the vertical engine plane being between the two rows, comprising:

(a) an air distribution tray configured to be mounted to the engine between the first and second row of cylinders, the air distribution tray having (i) a planar perimeter defining a horizontal plane, and (ii) plural outlet ports, the plural outlet ports disposed in an alternating staggered relationship relative to a longitudinal plane perpendicular to the horizontal plane, each of the plural outlet ports configured to be connected to a respective air intake port of the cylinders of the internal combustion engine, the air distribution tray configured so that planar perimeter of the air distribution tray is above both the engine and the outlet ports when the air distribution tray is mounted to the engine and each of the plural outlet ports is connected to the respective air intake port of the cylinders;

(b) the air distribution tray including plural air distribution channels configured to be below the planar perimeter when the air distribution tray is mounted to the engine, each of the plural air distribution channels being concavely curved relative to a longitudinal axis located in the longitudinal plane and bounded by a first end and a second end, with the first end of each of the plural air distribution channels coupled to a respective one of the plural outlet ports and the second end being offset in the longitudinal direction from the first end, and with each of the plural air distribution channels shaped to trace a serpentine path in the horizontal plane along its length between the first end and the second end;

(c) an air passage closure tray fitted in a mating relationship with the air distribution tray, the air passage closure tray including plural closure channels, each of the plural closure channels being equal to or shorter in length than, and concavely curved and shaped to engage in a mating relationship with, a respective one of the plural air distribution channels, to form plural concavely curved closed air conduits configured to be below the planar perimeter when the air distribution system is mounted to the engine, each of the plural closure channels having a third end terminating in a conduit inlet port and a fourth end communicating with a respective outlet port of the air distribution tray; and (d) each of the plural closed air conduits configured to draw air from a common air region above the conduit inlet ports when the air distribution system is mounted to the engine, with adjacent pairs of the plural closed air conduits configured to provide alternating opposing air flow paths from their respective conduit inlet ports to the respective outlet ports with which they communicate.

4. The air distribution system of claim 3, wherein each closed air conduit has a cross-sectional area proximate its inlet port that is greater than its cross-sectional area proximate to the outlet port with which the closed air conduit communicates.

5. The air distribution system of claim 4, wherein each distribution channel has two opposing first channel walls, each closure channel has two opposing second channel walls, the first opposing channel walls and second opposing channel walls engage in a mating relationship to provide a closed air conduit, and the distance between the opposing first channel walls and between the opposing second channel walls, proximate the inlet port of the closed air conduit, is greater than the respective distance between the opposing first channel walls and between the opposing second channel walls, proximate the outlet port with which the closed air conduit communicates.

6. The air distribution system of claim 3, wherein the conduit inlet port of each closed air conduit has an inlet area that is greater than the cross-sectional area of the outlet port with which the closed air conduit communicates.

7. The air distribution system of claim 6, wherein the inlet area of the conduit inlet port of each closed air conduit is in the range of 1.5-2.0 greater than the cross-sectional area of the outlet port with which the closed air conduit communicates.

8. The air distribution system of claim 6, wherein a portion of the closure channel at the conduit inlet port of each closed air conduit is disposed at an angle to the air flow so that the inlet area of the conduit inlet port is greater than the cross-sectional area of the outlet port.

9. The air distribution system of claim 6, wherein a portion of the closure channel at the conduit inlet port of each closed air conduit is provided with a curved shape so that the inlet area of the conduit inlet port is greater than the cross-sectional area of the outlet port.

10. The air distribution system of claim 6, wherein a portion of the closure channel at the conduit inlet port of each closed air conduit is disposed at an angle to the air flow and is provided with a curved shape so that the inlet area of the conduit inlet port is greater than the cross-sectional area of the outlet port.

11. A downdraft air intake system for an internal combustion piston engine having a first row of at least two cylinders inclined relative to a vertical engine plane, a second row of at least two cylinders inclined relative to the vertical engine plane, the two rows of cylinders forming a V configuration with the vertical engine plane being between the two rows, the downdraft air intake system comprising:

(a) an intercooler component including:
a rectangular heat exchanger core for cooling air with a liquid, the heat exchanger core having a first face for entry of uncooled air and a second opposing face for exit of cooled air;
a first rectangular intercooler mounting flange structure secured to the periphery of the first face and a second rectangular intercooler mounting flange structure secured to the periphery of the second face;
the first rectangular intercooler mounting flange structure and the second rectangular intercooler mounting flange structure having the same size and geometry,
the first rectangular intercooler mounting flange structure and the second rectangular intercooler mounting flange structure having the same pattern of plural spaced-apart symmetrically distributed bolt apertures; and (b) an air inlet component that includes (i) an air inlet for receiving air from an air compressor, (ii) a plenum, connected to the air inlet, for delivering the received air to the first face of the rectangular heat exchanger core; and (iii) a rectangular air inlet flange having the same pattern of bolt apertures as the first rectangular intercooler mounting flange structure; and (c) an air distribution system component including:
(i) an air distribution tray configured to be mounted to the engine between the first and second row of cylinders, the air distribution tray having (A) a planar perimeter defining a horizontal plane and (B) plural outlet ports, the plural outlet ports disposed in an alternating staggered relationship relative to a longitudinal plane perpendicular to the horizontal plane, each of the plural outlet ports configured to be connected to a respective air intake port of the cylinders of the internal combustion engine, the air distribution tray configured so that the planar perimeter of the air distribution tray is above both the engine and the outlet ports when the air distribution tray is mounted to the engine and each of the plural outlet ports is connected to the respective air intake port of the cylinders;

(ii) the air distribution tray including plural air distribution channels configured to be below the planar perimeter when the air distribution tray is mounted to the engine, each of the plural air distribution channels being concavely curved relative to a longitudinal axis located in the longitudinal plane and bounded by a first end and a second end, with the first end of each of the plural air distribution channels coupled to a respective one of the plural outlet ports and the second end being longitudinally offset from the first end;

(iii) the perimeter of the air distribution tray further including an air tray distribution flange having the same pattern of bolt apertures as the first rectangular intercooler mounting flange structure;

(iv) an air passage closure tray fitted in a mating relationship with the air distribution tray, the air passage closure tray including plural closure channels, each of the plural closure channels being equal to or shorter in length than, and concavely curved and shaped to engage in a mating relationship with, a respective one of the plural air distribution channels to form plural concavely curved closed air conduits configured to be below the planar perimeter when the air distribution system is mounted to the engine, each of the plural closure channels having a third end terminating in a conduit inlet port and a fourth end communicating with a respective outlet port of the air distribution tray;

(v) each of the plural closed air conduits being configured to draw air from a common air region above the conduit inlet ports when the air distribution system is mounted to the engine, with adjacent pairs of the plural closed air conduits configured to provide alternating opposing air flow paths from their respective conduit inlet ports to the respective outlet ports with which they communicate; and (vi) the air inlet flange of the air inlet component being bolted to the first rectangular intercooler mounting flange structure of the intercooler component, the air tray distribution flange of the air distribution tray being bolted to the second rectangular intercooler mounting flange structure of the intercooler component to form an air intake system assembly, the air intake system assembly being configured to provide a downward flow through the intercooler component.

12. A system for configuring with different performance characteristics an air intake system for an internal combustion piston engine having a first row of at least two cylinders inclined relative to a vertical engine plane, a second row of at least two cylinders inclined relative to the vertical engine plane, the two rows of cylinders forming a V configuration with the vertical engine plane being between the two rows, comprising:

(a) an air distribution tray configured to be mounted to the engine between the first and second row of cylinders, the air distribution tray having (i) a planar perimeter defining a horizontal plane and (ii) plural outlet ports, the plural outlet ports disposed in an alternating staggered relationship relative to a longitudinal plane perpendicular to the horizontal plane, each of the plural outlet ports configured to be connected to a respective air intake port of the cylinders of the internal combustion engine, the air distribution tray configured so that planar perimeter of the air distribution tray is above both the engine and the outlet ports when the air distribution tray is mounted to the engine and each of the plural outlet ports is connected to the respective air intake port of the cylinders;

the air distribution tray including plural air distribution channels configured to be below the planar perimeter when the air distribution tray is mounted to the engine, each of the plural air distribution channels being concavely curved relative to a longitudinal axis located in the longitudinal plane and bounded by a first end and a second end, with the first end of each of the plural air distribution channels coupled to a respective one of the plural outlet ports and the second end being longitudinally offset from the first end, and with each of the plural air distribution channels shaped to trace a serpentine path in the horizontal plane along its length between the first end and the second end;

(b) a first air passage closure tray configured to be fitted in a mating relationship with the air distribution tray, the first air passage closure tray including plural first closure channels having a first length equal to or shorter in length than, and concavely curved and shaped to engage in a mating relationship with, a respective one of the plural air distribution channels, to form plural concavely curved first closed air conduits of a first length configured to be below the planar perimeter when the air distribution system is mounted to the engine, each of the plural first closure channels having a third end terminating in a conduit inlet port and a fourth end configured to communicate with a respective outlet port of the air distribution tray;

each of the plural first closed air conduits being configured to draw air from the common air region above the conduit inlet ports when the first air passage tray is fitted in the air distribution tray to form a first air distribution system and the first air distribution system is mounted to the engine, with adjacent pairs of the plural closed air conduits configured to provide alternating opposing air flow paths from their respective conduit inlet ports to the respective outlet ports with which they communicate;

(c) a second air passage closure tray configured to be fitted in a mating relationship with the air distribution tray, the second air passage closure tray including plural second closure channels having a second length shorter in length than the first length of the plural first closure channels, and concavely curved and shaped to engage in a mating relationship with a respective one of the plural air distribution channels, to form plural concavely curved second closed air conduits of a second length, shorter than the first length of the plural first closed air conduits, the second closed air conduits configured to be positioned below the planar perimeter when the air distribution system is mounted to the engine, each of the plural second closure channels having a fifth end terminating in a conduit inlet port and a sixth end configured to communicate with a respective outlet port of the air distribution tray;

each of the plural second closed air conduits being configured to draw air from the common air region above the conduit inlet ports when the first air passage tray is fitted in the air distribution tray to form a second air distribution system and the second air distribution system is mounted to the engine, with adjacent pairs of the plural closed air conduits configured to provide alternating opposing air flow paths from their respective conduit inlet ports to the respective outlet ports with which they communicate.

* * * * *